(12) United States Patent
Shimonishi

(10) Patent No.: US 7,733,864 B2
(45) Date of Patent: *Jun. 8, 2010

(54) NODE APPARATUS

(75) Inventor: Hideyuki Shimonishi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/857,974

(22) Filed: Sep. 19, 2007

(65) Prior Publication Data

US 2009/0028152 A1 Jan. 29, 2009

Related U.S. Application Data

(63) Continuation of application No. 09/743,594, filed as application No. PCT/JP99/03785 on Jul. 14, 1999, now Pat. No. 7,289,517.

(30) Foreign Application Priority Data

Jul. 14, 1998 (JP) .................................. 10-214882
Jul. 14, 1998 (JP) .................................. 10-214883

(51) Int. Cl.
*H04L 12/28* (2006.01)
*H04J 3/24* (2006.01)
(52) U.S. Cl. .................... 370/392; 370/395.21; 370/473
(58) Field of Classification Search ................. 370/392, 370/473
See application file for complete search history.

(56) References Cited

U.S. PATENT DOCUMENTS 5,455,825 A   10/1995   Lauer et al.

(Continued)

FOREIGN PATENT DOCUMENTS

JP        6-62038        3/1994

(Continued)

OTHER PUBLICATIONS

P. Vaananen et al., "Framework for Traffic Management in MPLS Networks", Mar. 1998, XP015036369, pp. 1-55.

(Continued)

*Primary Examiner*—Andrew Lee
(74) *Attorney, Agent, or Firm*—Harrity & Harrity, LLP

(57) ABSTRACT

To satisfy a quality required for each traffic and perform switching for a packet segmented into cells without packet reassembly, there is provided a node apparatus including a header processing section (2) for determining an output destination of an incoming packet and a quality class from the header information of the packet, a route table (3), and a quality description table (4), and storing the packet in an output queue (6) determined by the determined output destination and quality class, an output control section (7) for reading out a packet from the output queue in accordance with the quality set for each output queue (6) and sending out the read packet through a VC determined by the determined output destination and quality class, and a quality description table (4) which has at least a virtual dedicated network number field, a destination address/mask length field, a source address/mask length field, a fourth-layer protocol/destination port number field, and a destination port number field and in which each field is made blank when any value can be set. In the node apparatus, a packet segmented into cells and arriving from each input VC is temporarily stored in a packet queue (26) corresponding to each input VC. When the final cell of the packet arrives, 1-packet cells are moved altogether to an output queue (27) corresponding to the destination IP address contained in the start cell and output to a corresponding output VC by an output section (28).

14 Claims, 44 Drawing Sheets

U.S. PATENT DOCUMENTS

| | | | |
|---|---|---|---|
| 5,930,259 | A | 7/1999 | Katsube et al. |
| 5,936,958 | A | 8/1999 | Soumiya et al. |
| 5,963,555 | A | 10/1999 | Takase et al. |
| 6,034,964 | A | 3/2000 | Fukushima et al. |
| 6,067,298 | A | 5/2000 | Shinohara |
| 6,091,709 | A | 7/2000 | Harrison et al. |
| 6,104,713 | A | 8/2000 | Nagami et al. |
| 6,144,635 | A | 11/2000 | Nakagawa |
| 6,188,697 | B1 | 2/2001 | Umehira et al. |
| 6,195,331 | B1 | 2/2001 | Tani |
| 6,212,163 | B1 | 4/2001 | Aida |
| 6,259,699 | B1 | 7/2001 | Opalka et al. |
| 6,262,986 | B1 * | 7/2001 | Oba et al. .................. 370/399 |
| 6,292,489 | B1 | 9/2001 | Fukushima et al. |
| 6,345,051 | B1 | 2/2002 | Gupta et al. |
| 6,381,244 | B1 * | 4/2002 | Nishimura et al. ..... 370/395.21 |
| 6,538,992 | B1 | 3/2003 | Subbiah et al. |
| 6,611,522 | B1 * | 8/2003 | Zheng et al. ........... 370/395.21 |
| 6,721,329 | B1 * | 4/2004 | Van Driel .................. 370/401 |
| 6,738,381 | B1 * | 5/2004 | Agnevik et al. .......... 370/395.7 |

FOREIGN PATENT DOCUMENTS

| | | |
|---|---|---|
| JP | 7-273801 | 10/1995 |
| JP | 8-130543 | 5/1996 |
| JP | 9-93256 | 4/1997 |
| JP | 9-98189 | 4/1997 |
| JP | 9-149035 | 6/1997 |
| JP | 9-321770 | 12/1997 |
| JP | 10-56452 | 2/1998 |
| JP | 10-56456 | 2/1998 |
| JP | 10-56459 | 2/1998 |
| JP | 10-294736 | 11/1998 |
| WO | WO 97/50276 A1 | 12/1997 |

OTHER PUBLICATIONS

D. Grossman et al., "Multiprotocol Encapsulation over ATM Adaptation Layer 5", Sep. 1999, XP015008467, pp. 1-23.

H. Shimonshi, co-pending U.S. Appl. No. 09/743,594, filed Jan. 11, 2001, "Node Apparatus".

Supplementary European Search Report corresponding to EP 99 929 821.9 dated Jun. 22, 2009, 6 pages.

* cited by examiner

FIG. 2

| DESTINATION ADDRESS | MASK LENGTH | OUTPUT DESTINATION |
|---|---|---|
| | | |
| | | |
| | | |

FIG. 3

| VIRTUAL DEDICATED NETWORK NUMBER | SOURCE | | DESTINATION | | QUALITY CLASS |
|---|---|---|---|---|---|
| | ADDRESS / MASK LENGTH | FOURTH-LAYER PROTOCOL / PORT NUMBER | ADDRESS / MASK LENGTH | FOURTH-LAYER PROTOCOL / PORT NUMBER | |
| | | | | | |
| | | | | | |
| | | | | | |

FIG. 4

| OUTPUT DESTINATION | QUALITY CLASS | OUTPUT QUEUE NUMBER | OUTPUT VC NUMBER |
|---|---|---|---|
|  |  |  |  |
|  |  |  |  |
|  |  |  |  |

FIG. 8

| VIRTUAL DEDICATED NETWORK NUMBER | SOURCE | | DESTINATION | | OUTPUT QUEUE NUMBER | OUTPUT VC NUMBER |
|---|---|---|---|---|---|---|
| | ADDRESS / MASK LENGTH | FOURTH-LAYER PROTOCOL / PORT NUMBER | ADDRESS / MASK LENGTH | FOURTH-LAYER PROTOCOL / PORT NUMBER | | |
| | | | | | | |
| | | | | | | |

FIG. 16

| DESTINATION IP ADDRESS | MASK LENGTH | OUTPUT QUEUE NUMBER |
|---|---|---|
| | | |
| | | |
| | | |

FIG. 17

| SOURCE VPI/VCI | IP IDENTIFICATION FLAG | START CELL IDENTIFICATION FLAG | OUTPUT DESTINATION QUEUE | MOVEMENT DESTINATION QUEUE | CRC1 | CRC2 | DISCARD FLAG |
|---|---|---|---|---|---|---|---|
| (ATMVC) | ATM | | (OUTPUT QUEUE NUMBER) | ✕ | ✕ | ✕ | ✕ |
| (IPVC) | IP | | (PACKET QUEUE NUMBER) | (OUTPUT QUEUE NUMBER) | | | |

FIG. 18

| OUTPUT QUEUE NUMBER | QUALITY PARAMETER | TRANSMISSION VPI / VCI | OUTPUT DESTINATION INFORMATION |
|---|---|---|---|
|  |  |  |  |
|  |  |  |  |
|  |  |  |  |

FIG. 22

| SOURCE VPI/VCI | IP IDENTIFICATION FLAG | START CELL IDENTIFICATION FLAG | OUTPUT DESTINATION QUEUE | MOVEMENT DESTINATION QUEUE | CRC1 | DISCARD FLAG |
|---|---|---|---|---|---|---|
| (ATMVC) | ATM | | (OUTPUT QUEUE NUMBER) | ✕ | ✕ | ✕ |
| (IPVC) | IP | | (PACKET QUEUE NUMBER) | (OUTPUT QUEUE NUMBER) | | |

FIG. 23

| OUTPUT QUEUE NUMBER | QUALITY PARAMETER | INTERNAL IDENTIFIER | OUTPUT DESTINATION INFORMATION |
|---|---|---|---|
| | | | |
| | | | |
| | | | |

FIG. 24

| INTERNAL IDENTIFIER | IP IDENTIFICATION FLAG | OUTPUT DESTINATION QUEUE | MOVEMENT DESTINATION QUEUE | CRC2 |
|---|---|---|---|---|
| (ATM INTERNAL IDENTIFIER) | ATM | (OUTPUT QUEUE NUMBER) | ✕ | ✕ |
| (IP INTERNAL IDENTIFIER) | IP | (PACKET QUEUE NUMBER) | (OUTPUT QUEUE NUMBER) | |

FIG. 30

| SOURCE VPI / VCI | IP IDENTIFICATION FLAG | START CELL IDENTIFICATION FLAG | OUTPUT DESTINATION QUEUE | CRC1 | DISCARD FLAG |
|---|---|---|---|---|---|
| (ATMVC) | ATM | | (OUTPUT QUEUE NUMBER) | ✕ | ✕ |
| (IPVC) | IP | | (OUTPUT QUEUE NUMBER) | | |

FIG. 35

| DESTINATION IP ADDRESS | MASK LENGTH | OUTPUT BUFFER SECTION NUMBER | INTERNAL IDENTIFIER |
|---|---|---|---|
| | | | |
| | | | |
| | | | |

FIG. 43

| SOURCE VPI/VCI | IP IDENTIFICATION FLAG | VIRTUAL DEDICATED NETWORK NUMBER | START CELL IDENTIFICATION FLAG | OUTPUT DESTINATION QUEUE | MOVEMENT DESTINATION QUEUE | CRC1 | DISCARD FLAG |
|---|---|---|---|---|---|---|---|
| (ATMVC) | ATM | | | (OUTPUT QUEUE NUMBER) | ✕ | ✕ | ✕ |
| (IPVC) | IP | | | (PACKET QUEUE NUMBER) | (OUTPUT QUEUE NUMBER) | | |

FIG. 44

| VIRTUAL DEDICATED NETWORK NUMBER | DESTINATION IP ADDRESS | MASK LENGTH | OUTPUT QUEUE NUMBER |
|---|---|---|---|
| | | | |
| | | | |
| | | | |

NODE APPARATUS

RELATED APPLICATION

This application is a continuation of U.S. patent application Ser. No. 09/743,594, filed Jan. 11, 2001, which is incorporated herein by reference.

TECHNICAL FIELD

The present invention relates to a node apparatus used to transfer an IP packet (to be simply referred to as a packet hereinafter) and, more particularly, to a node apparatus for setting a plurality of VCs (Virtual Channels) between at least two adjacent node apparatuses and transferring packets over the VCs, and a node apparatus for performing packet exchange processing on an IP (Internet Protocol) layer in an ATM (Asynchronous Transfer Mode) network.

BACKGROUND ART

The first scheme associated with packet transfer, in which a VC is set between adjacent node apparatuses and packets are transferred over the VC, uses a router incorporating an interface capable of setting an ATM (Asynchronous Transfer Mode) VC or the like. The router performs exchange processing for an incoming packet, determines the output destination of the packet, and outputs the packet over a VC corresponding to the determined output destination.

When, for example, an ATM interface is used, an ATM VC is set between adjacent routers, and capsulation processing defined by RFC 1483 (Internet Engineering Task Force (IETF) Request For Comments (RFC) 1483) is performed for a packet on the VC. The resultant packet is segmented into cells by using AAL5 (ATM Adaptation Layer Type 5), and the cells are transferred. The router reassembles the incoming packet, segmented into cells, into the original packet through the ATM interface, and performs exchange processing for the packet to determine an output destination. The router then segments the packet into cells through the ATM interface, and outputs the cells by using a VC corresponding to the determined output destination.

In the first scheme associated with packet transfer, the implementation of RSVP {Resource Reservation Protocol) (IETF RFC2205) makes it possible to perform quality control. According to RSVP, before a terminal, which demands a quality guarantee for a transmission flow starts transmission, information for identifying the flow, e.g., a combination of terminals for performing transmission to all the routers on the route of the flow, a fourth-layer protocol type, and source and destination fourth-layer port numbers, and a table that describes a quality with respect to the flow are generated. With regard to a packet transmitted from the terminal, a router on the route of the flow identifies the packet in the flow by using the table, and performs exchange processing for the packet with a proper quality by using a quality guarantee mechanism.

As the second scheme associated with packet transfer, the scheme disclosed in Japanese Unexamined Patent Publication No. 10-56452 is available. According to this scheme, a node apparatus having a packet exchange function added to an ATM switch is used. In this scheme, a packet is segmented into cells by using AAL5 to be transferred over a VC as in the first scheme. However, a characteristic feature of this scheme is that each node apparatus directly performs exchange processing for the packet segmented into cells, and hence need not reassemble the cells into the packet. When a cell of the packet arrives at the node apparatus, it is checked whether the cell is the start cell of the packet. If this cell is the start cell of the packet, an output destination for the packet formed by the cell is determined from the packet header in the cell, and all the cells from the start cell to the final cell of the packet are consecutively sent out to the output destination.

The first problem associated with packet transfer is that a node apparatus in the second scheme associated with packet transfer has no function for quality guarantees. For this reason, even if the quality of a VC serving as a transmission route is guaranteed, since the node apparatus equally handles all traffics, e.g., high-priority traffics, low-priority traffics, and traffics requiring a real-time feature, in exchange processing, no quality can be guaranteed for high-priority traffics and traffics requiring a real-time feature.

The second problem associated with packet transfer is that in the second scheme associated with packet transfer, adjacent nodes are connected through one VC, traffics requiring different qualities must be transmitted over the same VC. For this reason, a VC must be set to guarantee the qualities of all traffics. As a consequence, a VC is set in accordance with a traffic demanding the highest quality. According to these schemes, thereforee, a high quality is guaranteed for even a traffic requiring a low quality, wasting network resources.

The third problem associated with packet transfer is that the first scheme associated with packet transfer requires a large table to identify a flow, and hence is difficult to apply to a large-scale network. This is because pieces of information for uniquely identifying flows, e.g., combinations of terminals that perform communications through all the flows, fourth-layer protocol types, and source and destination fourth-layer port numbers, must be set in a table in units of flows. In the first scheme associated with packet transfer, since quality is guaranteed in units of flows', flexible quality guarantees, e.g., a quality guarantee for each terminal, a quality guarantee for each LAN (Local Area Network), and a quality guarantee for each virtual dedicated network, cannot be performed.

Recently, the IP traffic in a public. network has sharply increased. For this reason, it has become urgent to provide high-speed, broadband IP services on an ATM network widely used in the public network. As schemes of processing packets on the ATM network, the following schemes are known.

In the first scheme of handling packets on the ATM network, a high-speed IP router incorporating an ATM line is set on the ATM network, and packets are exchanged by the IP router. More specifically, a packet that is input after it is segmented into cells is temporarily reassembled into the packet, and then exchange processing is performed. After the processing, the packet is segmented into cells again and output. According to the first scheme, a VC (Virtual Channel) is set between adjacent IP routers, and capsulation processing defined by RFC 1483 (Internet Engineering Task Force IETF) Request For Comments (RFC) 1483) is performed. Thereafter, the packet is segmented into cells according to AAL5 (ATM Adaptation Layer Type 5) and transferred.

In the second scheme of handling packets on an ATM network, an IP layer processing function is added to an ATM switch itself to use the ATM switch as a node apparatus equivalent to an IP router. According to this scheme, a processing section equivalent to an IP router is added to an ATM switch, and the processing section performs IP layer switching for cells constituting a packet. A cell that has arrived at this ATM switch is identified as a cell of this packet or not. If this cell is a cell of the packet, the cell is transferred to the processing section. The processing section reassembles cells into a packet, i.e., restores packet pieces as cells into an original packet, and performs IP layer switching. A packet having undergone this processing is segmented into cells again. These cells are returned to the ATM switch section and output to the next node.

In the third scheme of handling packets on an ATM network, an IP layer processing function is added to the ATM network itself to allow the overall ATM network to implement an IP router function. As this scheme, first of all, SMDS (Switched Multi-megabit Data Services) is available (Japanese Unexamined Patent Publication No. 6-62038). SMDS is a connectionless traffic accommodation scheme developed by Bellcore in U.S.A. This scheme is effective in accommodating IP traffics in an ATM network. According to SMDS, a header and trailer are added to a packet at a node existing in a peripheral portion of an ATM network, and the packet is segmented into cells. The cells are then sent to the ATM network. A characteristic feature of SMDS is that switching is performed in each switch in the ATM network without reassembling cells into a packet, and hence apparatuses are simplified. In addition, since multiplex identifiers are added to the respective segmented cells, when cells constituting different packets are multiplexed on the same CV, no problem arises even if a cell of a packet is inserted in a cell group constituting another packet.

As another scheme associated with the third scheme of handling packets on an ATM network, the scheme disclosed in Japanese Unexamined Patent Publication No. 10-56459 is available. This scheme will be referred to as the fourth scheme. In the fourth scheme as well, switching is performed without reassembling cells into a packet. However, no multiplex identifiers are added to the cells of the packet, and the packet is segmented into cells by using AAL5. More specifically, a node apparatus has a first table holding a predetermined destination VPI/VCI (Virtual Path Identifier/Virtual Channel Identifier) and an output port number for each destination IP address, and a second table for holding a destination VPI/VCI and output port number for each VPI/VCI as needed. When the start cell of an AAL5 frame associated with a given packet is received, a destination VPI/VCI and output port number are obtained by searching the first table by using the destination IP address in the cell as a key. After the VPI/VCI in the start cell is converted into the obtained destination VPI/VCI, the cell is output from the obtained output port number. At the same time, a matching source VPI/VCI is obtained by searching the second table by using the VPI/VCI in the start cell as a key, and the destination VPL/VCI and output port number obtained from the first table are held in the second table in correspondence with this source VPI/VCI. When a cell other than the start cell of the AAL5 frame associated with the packet is received, a destination VPL/VCI and output port number corresponding to a matching source VPI/VCI are obtained by searching the second table by using the VPI/VCI in the cell as a key. After the VPI/VCI in the cell is converted into the obtained destination VPI/VCI, the cell is output from the obtained output port number.

Both node apparatuses in the first and second schemes of handling packets on an ATM network process a packet after input cells are temporarily reassembled into the packet, and output the processed packet upon segmenting it into cells again. A delay in transfer increases due to the processing time required for packet reassembly and segmentation, and the apparatus is complicated.

In the third scheme of handling packets on an ATM network, since switching for a packet segmented into cells is performed without packet reassembly, a transfer delay can be decreased, and the apparatus can be simplified accordingly. In the third scheme, however, since a packet is not transferred after it is segmented into cells by AAL5, the use efficiency of a band is poor. This is because in the third scheme, a 2-byte header and 2-byte trailer including a multiplex identifier, CRC, and the like must be set in the payload of each cell.

In contrast to this, in the fourth scheme of handling packets on an ATM network, since a packet is transmitted after it is segmented into cells by AAL5, and switching is performed without reassembling the cells into the packet, the problem in the third embodiment does not arise. In the fourth scheme, since packets arriving from different VCs cannot be multiplexed on the same VC, many VC resources are required. This point will be described in detail below.

According to the fourth scheme of handling packets on an ATM network, as described above, by searching the first table with the destination IP address contained in the start cell of an AAL5 frame associated with a given packet, a destination VPI/VCI after conversion of the VPI/VCI in each cell of the packet and a destination output port are determined. For this reason, when a plurality of packets having the same destination IP address are simultaneously received, the VPI/VCIs of the respective cells are converted into the same destination VPI/VCI, and the cells are output from the same output port. If, thereforee, the cells of the respective packets are output to the same output VC, cells of a given packet are inserted in the cell group constituting another packet. Since the VPI/VCIs in the cells of the respective packets are the same, the cells cannot be reassembled into the original packets at the output destination. For this reason, in practicing the fourth scheme, when different packets arriving from different VCs are to be output to the same path, different VCs must always be used, requiring a large amount of VC resources.

DISCLOSURE OF INVENTION

The present invention has been made in consideration of the above problems in the prior art, and has as its first object to provide flexible quality guarantees for traffics in a node apparatus which sets a VC with another node apparatus and transfers packets over the VCs.

It is the second object of the present invention to allow a node apparatus for performing switching processing for a packet segmented into cells according to AAL5 without packet reassembly to multiplex packets arriving from different VCs on the same VC in outputting the packets to the same path.

In order to achieve the first object, according to the first aspect of the present invention, there is provided a node apparatus characterized by comprising a route table, a quality description table, a plurality of output queues, and an output control section for performing read control on a packet from each output queue so as to achieve a quality set for each output queue, wherein an output destination of an incoming packet is determined by searching the route table by using header information of the packet, a quality class of the packet is determined by searching the quality description table, the packet is stored in an output queue determined by the determined output destination and quality class, and the packet is read out from the output queue in accordance with the quality set for the output queue.

According to the second aspect of the present invention, there is provided a node apparatus comprising a route table and a quality description table, wherein an output destination of an incoming packet is determined by searching the route table by using header information of the packet, a quality class of the packet is determined by searching the quality description table, the packet is sent out through a VC determined by the determined output destination and quality class, and a plurality of VCs with different qualities are set for the same output destination.

According to the third aspect of the present invention, there is provided a node apparatus in which a quality description table is configured for each third-layer protocol type or a specific third-layer protocol to have a virtual dedicated network number field, a destination address/mask length field, a source address/mask length field, a fourth-layer protocol/source port number field, and a destination port number field and write specific values in the respective fields or form a blank field so as to match any value.

Aspects of the present invention which present more specific arrangements of the node apparatuses of the present invention will be described below.

According to the fourth aspect of the present invention, there is provided a node apparatus which has a plurality of VCs with different qualities set between the node apparatus and another adjacent node apparatus and transfers a packet over the VC, comprising a plurality of output queues for which predetermined qualities are respectively set, a route table in which in correspondence with a destination address, an output destination of a packet having the destination address is defined, a quality description table in which in correspondence with predetermined information in a packet header, a quality class of the packet having the information in the packet header is defined, an output table in which in correspondence with a pair of an output destination of a packet and a quality class, an output queue in which the packet should be stored and an output VC to which the packet in the output queue should be output are defined, a header processing section for determining an output destination of an incoming packet by searching the route table by using an destination address in a header of the packet, determining a quality class of the packet by searching the quality table by using the predetermined information in the header, determining an output queue in which the packet is to be stored and an output VC by searching the output table by using a pair of the determined output destination of the packet and the determined quality class, and storing the incoming packet in the determined output queue, and an output control section for reading out a packet from each of the output queues so as to achieve a quality set for each of the output queues, and outputting the packet to the determined output VC.

In place of the route table, quality description table, and output table in the fourth aspect, the fifth aspect of the present invention uses an output table in which in correspondence with the destination address of each packet and predetermined information (e.g. a destination address, source address, fourth-layer protocol/source port number, and destination port number) in the packet header, an output queue in which the packet having the destination address and its predetermined information is to be stored and an output VC to which the packet in this output queue is to be output are defined. In this case, there is provided a node apparatus, in which a header processing section determines an output queue in which an incoming packet is to be stored and an output VC by searching the output table with the destination address and predetermined information in the header of the packet, and the incoming packet is stored in the determined output queue.

According to the sixth aspect of the present invention, there is provided a node apparatus configured to perform switching for a packet segmented into cells by AAL5 without reassembly and have a packet queue to prevent cells constituting different packets from being nested when the packets arriving from different VCs are output to the same VC. In this case, when the start cell of a packet arrives, a header processing section determines the output destination of the packet by searching the route table with the destination address in the packet header contained in the start cell, and also determines the quality class of the packet by searching the quality table with predetermined information in the header. The header processing section then determines an output queue in which the packet is to be stored and an output VC by searching the output table with the pair of the determined output destination of the packet and quality class, and stores the start cell in the packet queue corresponding to the input VC. When a cell other than the start cell of the packet arrives, the incoming cell is stored in the packet queue corresponding to the input VC. After the final cell of the packet is stored, all the cells constituting the packet stored in the packet queue are simultaneously moved to the determined output queue.

According to the seventh aspect of the present invention, there is provided a node apparatus comprising a plurality of node apparatuses as input buffer sections, each described in the sixth aspect, a plurality of output buffer sections, and a cell switch section for transferring cells constituting a packet output from an arbitrary input buffer section, to an arbitrary output buffer section. In this case, each of the output buffer sections includes packet queues prepared to be equal in number to the input buffer sections for the respective output VCs of the output buffer section, a output queue which is prepared for each output VC of the output buffer section and for which the sum of qualities set for output queues of the input buffer section which correspond to the output VC is set, a header processing section for, when a cell is input from the cell switch section, storing the cell in the packet queue corresponding to the input buffer section as a source of the cell and an output VC, and simultaneously moving all cells stored in the packet queue to the output queue corresponding to the output VC after a final cell of the packet is stored, and an output control section for reading out a cell of a packet from each of the output queues so as to achieve a quality set for each of the output queues and outputting the cell to the determined output VC.

According any one of the sixth and seventh aspects, the node apparatus comprises an ATM switch capable of performing quality control on each output queue, and a quality guarantee on a packet level is performed by using a cell-level quality guarantee mechanism of the ATM switch.

According to any one of the fourth, sixth, and seventh aspects, the quality description table has at least a virtual dedicated network number field, a destination address/mask length field, a source address/mask length field, a fourth-layer protocol/source port number field, and a destination port number field, and specific values are written in the respective fields or a blank field is formed to match any value. In addition, each field of the quality description table has a priority, any entry in which all fields other than a blank field match an incoming packet is selected from the quality description table in searching the quality description table, and if a plurality of entries are selected, an entry in which a match is obtained in a field with a higher priority is selected from the selected entries.

In order to achieve the second object, according to the eighth aspect, there is provided a node apparatus which performs switching processing for a packet segmented into cells according to AAL5 without reassembling the cells into the packet, comprising packet queues prepared in units of input VCs, output queues prepared in units of output VCs, an IP route table in which route information is written for each destination IP address, an IP processing section for sequentially storing cells constituting a packet arriving from each input VC in the packet queue corresponding to each input VC, and simultaneously moving all cells in the packet queue in which cells corresponding to one packet are stored to the output queue corresponding to route information described in the IP route table in correspondence with a destination IP address contained in a start cell, and an output section for outputting the cells in the output queue to a corresponding output VC.

In the node apparatus according to the eighth aspect having this arrangement, cells constituting a packet arriving from each input VC are temporarily stored in a packet queue corresponding a to the input VC. When the final cell of the packet arrives, the 1-packet cells stored in the queue are moved altogether to an output queue corresponding to the destination IP address contained in the start cell of the packet. For this reason, even if packets arriving from different VCs have the same destination IP address and are output to the same VC, there is no chance that cells constituting a given packet are inserted in a cell group constituting another packet on the same VC. This makes it possible to output packets arriving from different VCs to a single VC.

According to the first modification of the node apparatus of the eighth aspect, the apparatus includes means for performing a CRC check on an AAL5 frame and a CRC re-calculation accompanying IP header updating while the AAL5 frame is segmented into cells without packet reassembly. More specifically, the node apparatus comprises a VC table for storing an interim value for a CRC check on an AAL5 frame and an interim value for a CRC re-calculation, and the IP processing section is configured to calculate, when a start cell of a packet arrives, a CRC value from the incoming cell, store an interim value in the VC table, re-calculate a CRC value from the start cell upon IP header updating, store an interim value in the VC table, calculate, when a cell other than the start cell of the packet arrives, a new CRC value from the incoming cell and the interim value for a CRC check, stored in the VC table, store the interim value in the VC table, calculate a new CRC value from the incoming cell and the interim value for a CRC re-calculation, stored in the VC table, store the interim value in the VC table, and write, after a CRC value is calculated from a final cell of the packet, a re-calculated CRC value in a CRC field of the final cell, and also check a CRC error in the AAL5 frame from a calculated value for a CRC check.

According to the second modification of the node apparatus of the eighth aspect, the apparatus includes means for processing not only a cell of a packet but also a general ATM cell. More specifically, the apparatus comprises a VC table containing an IP identification flag for designating each input VC as an input VC set for ATM or IP and an output destination queue for designating an output queue when an input VC is set for ATM, and a header processing section for storing, at the time of arrival of a cell, the cell which has arrived through an input VC set for ATM in an output destination queue designated by the output destination queue in the VC table in correspondence with the input VC through which the cell has arrived, and transferring the cell which has arrived through an input VC set for IP to the IP processing section.

According to the third modification of the apparatus of the eighth aspect, when an incoming packet is a multicast packet, the IP processing section implements an IP multicast function by using a cell multicast function of an ATM switch instead of copying the packet.

According to the fourth aspect of the node apparatus of the eighth aspect, the node apparatus comprises an IP server section having necessary functions as an IP router, e.g., a function of processing a routing packet and a function of processing a packet with an IP option, and a function of managing the IP route table, and when an incoming packet cannot be processed by the IP processing section, transfers the packet to the IP server section to make the IP server section process the packet and update the IP route table if required as a result of processing.

According to the fifth aspect of the node apparatus of the eighth aspect, the IP route table holds a substantially perfect copy of part of an IP route table held in the IP server section, and when a route search with respect to a given packet fails in the IP processing section, the packet is transferred to the IP server section to make the IP server section process the packet and update the IP route table which has failed the route search, According to the fifth aspect, the IP server section process, as a substitute, a packet for which the IP processing section has failed a route search. However, the IP server section may perform, as a substitute, only a route search. More specifically, the IP processing section requests the IP server section to perform a route search with respect to the packet, and the IP server section performs a route search in accordance with the request and notifies the IP processing section of the result, and the IP processing section processes the packet in accordance with the route search result.

According to the sixth modification of the node apparatus of the eighth aspect, different VCs are set between the node apparatus and another node apparatus in units of virtual dedicated networks, route information for each virtual dedicated network is defined in the IP route table, a virtual dedicated network is specified from an input VC through which a cell has arrived, and route information of the packet is obtained by searching the IP route table by using the specified virtual dedicated network and a destination IP address, According to the seventh aspect of the node apparatus of the eighth aspect, the node apparatus has different IP addresses in units of virtual dedicated networks, and generates IP route information by executing different IP routing protocols in units of virtual dedicated networks.

In order to achieve the second object, according to the ninth aspect of the present invention, there is provided a node apparatus comprising a plurality of input buffer sections, a plurality of output buffer sections, and a cell switch section for transferring a cell output from an arbitrary input buffer section to an arbitrary output buffer section.

In the node apparatus according to the ninth aspect, each of the input buffer sections comprises a first packet queue for each input VC of the input buffer section, a first output queue for each output VC in the node apparatus, an IP route table in which route information is described for each destination IP address, a first IP processing section for sequentially storing cells constituting a packet arriving from each input VC in the first packet queue corresponding to each input VC, and simultaneously moving all cells in the first packet queue in which cells corresponding to one packet are stored to a first output queue corresponding to route information described in the IP route table in correspondence with a destination IP address contained in a start cell, and a first output section for outputting a cell in the first output queue to a corresponding output buffer section through the cell switch section upon converting a VPI/VCI in the cell into an internal identifier which can uniquely identify an output VC and self-input buffer section, and each of the output buffer sections comprises second packet queues prepared to be equal in number to the input buffer sections for the respective output VCs of the output buffer section, a second output queue for each output VC of the output buffer section, a second IP processing section for sequentially storing cells arriving from each input buffer section through the cell switch section in the second packet queue corresponding to an internal identifier in each cell, and simultaneously moving all cells in the second packet queue in which cells corresponding to one packet are stored to the second output queue corresponding to the internal identifier contained in each cell, and a second output section for outputting a cell in the second output queue to a corresponding output VC upon converting the internal identifier in the cell into an output VPI/VCI.

In this node apparatus, when each input buffer section receives different packets having the same destination IP address from different input VCs after they are segmented into cells, since they have the same destination IP address, all the cells of these packets are finally stored in the single first output queue and output to the same output buffer section after conversion to the same internal identifier. However, since the cells constituting the respective packets differ in input VCs, they are temporarily stored in different first packet queues, and 1-packet cells are moved altogether to the same first output queue. These cells are then sequentially output one by one from the start cell. There is thereforee no chance that cells constituting a given packet are inserted in a cell group constituting another packet on one logic link (single internal identifier link) to the cell switch section. This allows multiplexing. In contrast to this, when each output buffer section receives packets having internal identifiers indicating the same output VC from different input buffer sections, all the cells of these packets are stored in the same second output queue, and output to the same output VC upon conversion to the same VPI/VCI. However, since the cells constituting the respective packets differ in internal identifiers, the cells are temporarily stored in different second packets, and 1-packet cells are moved altogether to the same second output queue. These cells are then sequentially output one by one from the start cell. There is thereforee no chance that cells constituting a given packet are inserted in a cell group constituting another packet on an output VC. This allows multiplexing. That is, in this node apparatus, of the packets to be output to the same VC, the packets that have arrived at different VCs in the same input buffer section are multiplexed in the input buffer section, and the packets that have arrived at different input buffer sections are multiplexed in the output buffer section.

The above arrangement may be configured to convert the VPI/VCI in each cell into the VPI/VCI of an output VC and the number of the self-input buffer section instead of converting the VPI/VCI in each cell into an internal identifier capable of uniquely specifying an output VC and self-input buffer section.

According to the first aspect of the node apparatus of the ninth aspect, each-input buffer section has no packet queue. More specifically, each of the input buffer sections comprises first output queues prepared by the number of output VCs of the node apparatus for each input VC of the input buffer section, an IP route table in which route information is written for each destination IP address, a first IP processing section for sequentially storing cells constituting an IP packet arriving from each input VC to the first output queue determined by route information in the IP route table which corresponds to a destination IP address contained in a start cell of the packet and the input VC, and a first, output section for outputting a cell in the first output queue to the corresponding output buffer section through the cell switch section upon converting a VPI/VCI in the cell into an internal identifier which can uniquely specify an output VC and input VC, and each of the output buffer sections comprises second packet queues prepared by the number of input VCs of the node apparatus for each output VC of the output buffer section, a second output queue for each output VC of the output buffer section, a second IP processing section for sequentially storing cells arriving from each input buffer section through the cell switch section in the second packet queue corresponding to an internal identifier in each cell, and simultaneously moving all cells in the second packet queue in which cells corresponding one packet are stored to the second output queue corresponding to the internal identifier contained in each cell, and a second output section for outputting a cell in the second output queue to a corresponding output VC upon converting an internal identifier in the cell into an output VPI/VCI.

In this node apparatus, when each input buffer section receives packets having a different destination IP addresses from different input VCs after they are segmented into cells, these packets are stored in different first output queues. These packets are converted into different internal identifiers and output to the same output buffer section. In contrast to this, when each output buffer section receives packets having internal identifiers indicating the same output VC from the same input buffer section and different input buffer sections, since the internal identifiers indicate the same output VC, all the cells of these packets are finally stored in the same second output queue and output to the same output VC upon conversion to the same VPI/VCI. The cells constituting the respective packets are temporarily stored in different second packet queues because they have different internal identifiers, and 1-packet cells are moved altogether to the same second output queue. These cells are then sequentially output one by one from the start cell. There is thereforee no chance that cells constituting a given packet are inserted in a cell group constituting another packet on an output VC. This allows multiplexing, That is, in this node apparatus, of the packets output to the same VC, the packets that have arrived at different VCs in the same input buffer section are multiplexed in an output buffer section as well as the packets that have arrived at different VCs in the same input buffer section.

The second modification of the node apparatus of the ninth aspect includes means for performing a CRC check on an AAL5 frame and a CRC re-calculation accompanying IP header updating while the AAL5 frame is segmented into cells without packet reassembly.

More specifically, each of the input buffer sections comprises a VC table for storing an interim value for a CRC check on an AAL5 frame and an interim value for a CRC re-calculation, and the first IP processing section is configured to calculate, when a start cell of a packet arrives, a CRC value from the incoming cell, store an interim value in the VC table, re-calculate a CRC value from the start cell upon IP header updating, store an interim value in the VC table, calculate, when a cell other than the start cell of the packet arrives, a new CRC value from the incoming cell and the interim value for 'a CRC check, stored in the VC table, stores the interim value in the VC table, calculate a new CRC value from the incoming cell and the interim value for a CRC re-calculation, stored in the VC table, stores the interim value in the VC table, and write, after a CRC value is calculated from a final. cell of the packet, a re-calculated CRC value in a CRC field of the final cell, and also check a CRC error in the AAL5 frame from a calculated value for a CRC check.

According to the above arrangement, a CRC check on an AAL5 frame and a CRC re-calculation accompanying IP header updating are performed by the input buffer section alone. However, in order to distribute a load, the input buffer section may perform a CRC check and CRC error determination, and the output buffer section may perform CRC re-calculation. More specifically, each of the input buffer sections comprises a first VC table for storing an interim value for a CRC check on an AAL5 frame, the first IP processing section is configured to calculate, when a start cell of a packet arrives, a CRC value from the incoming cell, store the interim value in the first VC table, update an IP header, calculate, when a cell other than the start cell of the packet arrives, a new CRC value from the incoming cell and the interim value for a CRC check, stored in the first VC table, store the interim value in the first VC table, and check a CRC error in the AAL5 frame after a CRC value is calculated from a final cell of the packet, each of the output buffer sections comprises a second VC table for storing an interim value for a CRC re-calculation on an AAL5 frame, and the second IP processing section is configured to re-calculate, when a start cell of a packet arrives, a CRC value from the incoming cell, store the interim value in the second VC table, calculate, when a cell other than the start cell of the packet arrives, a new CRC value from the incoming cell and the interim value for a CRC re-calculation, stored in the second VC table, store the interim value in the second VC table, and write, after a CRC is calculated from a final cell of the packet, the re-calculated CRC value in a CRC field of the final cell.

The third aspect of the node apparatus of the ninth aspect includes means for processing not only a cell of a packet but also a general ATM cell.

More specifically, each of the input buffer sections comprises a first VC table containing an IP identification flag for designating each input VC as an input VC set for ATM or IP and an output destination queue for designating an output queue when an input VC is set for ATM, and a header processing section for storing, at the time of arrival of a cell, the cell which has arrived through an input VC set for ATM in a first output queue designated by the output destination queue in the first VC table in correspondence with the input VC through which the cell has arrived, and transferring the cell which has arrived through an input VC set for IP to the first IP processing section, and each of the output buffer sections comprises a second VC table containing an IP identification flag for designating each internal identifier or each pair of an output VPI/VCI and an input buffer section number as an internal identifier or a pair of an output VPI/VCI and an input buffer number set for ATM or IP and an output destination queue for designating an output queue when each internal identifier or each pair of an output VPI/VCI and an input buffer section number is set for ATM, and a first header processing section for storing, at the time of arrival of a cell, an ATM cell in the second output queue, designated by the output destination queue in the second VC table, and transferring an IP cell to the second IP processing section.

The fourth modification of the node apparatus of the ninth aspect comprises an IP server section having necessary functions as an IP router, e.g., a function of processing a routing packet and a function of processing a packet with an IP option, and a function of managing the IP route table, and when it is determined that the first IP processing in any input buffer section cannot process an incoming packet, transfers the packet to the IP server section to make the IP server section process the packet and update the IP route table if required as a result of processing.

In the fifth modification of the node apparatus of the ninth aspect, the IP route table of each input buffer section holds a copy of part of an IP route table held in the IP server section, and when a route search with respect to a packet fails in the first IP processing section of any input buffer section, the packet is transferred to the IP server section to make the IP server section process the packet and update the IP route table of the input buffer section which has failed the route search.

According to the fifth modification, the IP server section processes, as a substitute, a packet for which the input buffer section has failed a route search. However, the IP server section may perform, as a substitute, only a route search. More specifically, when the first IP processing section of any input buffer section fails a route search with respect to a packet, the IP server section is requested to perform a route search with respect to the packet. In accordance with this request, the IP server section performs a route search by using the IP route table held by itself, and notifies the first IP processing section of the input buffer section of the result. Upon reception of the notification, the first IP processing section processes the packet.

In the sixth modification of the node apparatus of the ninth aspect, when an incoming packet is a multicast packet, the second IP processing section implements an IP multicast function by using a cell multicast function of an ATM switch instead of copying the packet.

In the seventh modification of the node apparatus of the ninth aspect, different VCs are set between the node apparatus and another node apparatus in units of virtual dedicated networks, route information for each virtual dedicated network is defined in the IP route table, a virtual dedicated network is specified from an input VC through which a cell has arrived, and route information of the packet is obtained by searching the IP route table by using the specified virtual dedicated network and a destination IP address.

According to the eighth modification of the node apparatus of the ninth aspect, the node apparatus has different IP addresses in units of virtual dedicated networks, and generates IP route information by executing different IP routing protocols in units of virtual dedicated networks.

The present invention having the above aspects includes the following effects (advantages).

The first effect is that the node apparatus determines the output destination and quality class of an incoming packet by using the header Information of the packet, stores the packet in an output queue determined by the determined output destination and quality class, and reads out the packet from the output queue in accordance with the quality set for the output queue, thereby performing switching that satisfies the quality required for each traffic in the node apparatus.

The second effect is that the node apparatus determines the output destination and quality class of an incoming packet by using the header information of the packet, sends out the packet through a VC determined by the determined output destination and quality class, and further sets a plurality of VCs having different qualities for the same output destination, thereby transferring traffics between nodes by using different VCs for the respective qualities. This makes it possible to save network resources as compared with the case wherein all traffics are transmitted through a single VC.

The third effect is that a quality description table in the node apparatus is configured for each third-layer protocol type or a specific third-layer protocol to have a virtual dedicated network number field, a destination address/mask length field, a source address/mask length field, a fourth-layer protocol/source port number field, and a destination port number field and write specific values in the respective fields or form a blank field so as to match any value. With this arrangement, flexible quality guarantees, e.g., a quality guarantee for each flow, a quality guarantee for each terminal, a quality guarantee for each LAN, a quality guarantee for each virtual dedicated network, a quality guarantee based on port numbers, and a quality guarantee as a combination thereof, can be provided, and the table size can be reduced as the quality guarantee unit is increased.

As can be apparent from the above aspects, the present invention can obtain the following effects.

In the node apparatus for performing switching for a packet segmented into cells by AAL5 without packet reassembly, cells constituting a packet are temporarily stored in a packet queue, and 1-packet cells are then moved to an output queue altogether. When, therefoee, packets arriving from different VCs are to be output to the same path, they can be multiplexed on the same VC. This allows a reduction in VC resources required.

Since each cell need not have a multiplex identifier, and an IP packet segmented into cells by AAL5 can be processed, all cell payloads except for start and final cells can be used for user data. Therefoore, the use efficiency of the band is high.

Since cells are not reassembled into a packet, the processing time for packet reassembly and re-segmentation can be shortened. This makes it possible to keep a transfer delay short.

The node apparatus includes the means for processing ATM cells other than cells constituting a packet, and the means for discriminating whether a given cell is a cell of a packet or a general ATM cell other. With this arrangement, when an incoming cell is a general ATM cell, the cell is directly stored in an output queue instead of a packet queue. This makes it possible for a single node apparatus to handle not only an IP traffic but also a general ATM traffic.

The node apparatus having necessary functions as an IP router, e.g., the function of processing a routing packet and the function of processing a packet with an IP option and the function of managing an IP route table can also serve as an IP router.

A CRC check on an AAL5 frame and CRC re-calculation accompanying IP header updating can be performed while the AAL5 frame is segmented into cells without packet reassembly.

With the arrangement in which different VCs are set with respect to another node apparatus in units of virtual dedicated networks, route information is defined in an IP route table for each virtual dedicated network, a virtual dedicated network is specified from the input VC through which a cell has arrived, and route information of the packet is obtained by searching the IP route table with the specified virtual dedicated network and destination IP address, a virtual dedicated network with excellent quality guarantees can be constructed on an ATM network.

With the arrangement in which when an incoming packet is a multicast packet, an IP multicast function is implemented by using the cell multicast function of an ATM switch instead of copying the packet, IP multicast can be easily implemented.

The above and other objects, features, and advantages of the present invention will be apparent to a person skilled in the art from the following detailed description of the preferred embodiments based on the principle of the present invention in conjunction with the accompanying drawings.

BRIEF DESCRIPTION OF DRAWINGS

FIG. 2 is a view showing an example of the arrangement of a route table in the first embodiment of the present invention;

FIG. 3 is a view showing an example of the arrangement of a quality description table in .the first embodiment of the present invention;

FIG. 4 is a view showing an example of the arrangement of an output table in the first embodiment of the present invention;

FIG. 8 is a view showing an example of the arrangement of an output table In the second embodiment of the present invention;

FIG. 16 is a view showing an example of the arrangement of an IP route table;

FIG. 17 is a view showing an example of the arrangement of a VC table;

FIG. 18 is a view showing an example of an output table;

FIG. 22 is .a view showing an example of the arrangement of a VC table in an input buffer section used in the present invention;

FIG. 23 is a view showing an example of an output table in an input buffer section;

FIG. 24 is a view showing an example of the arrangement of a VC table in an output buffer section;

FIG. 30 is a view showing an example of the arrangement of a VC table in an input buffer section in the seventh embodiment of the present invention;

FIG. 35 is a view showing an example of the arrangement of an IP route table held by an IP server section;

FIG. 43 is a view showing an example of the arrangement of a VC table in an input buffer section in the 10th embodiment of the present invention; and FIG. 44 is view showing an example of the arrangement of an IP route table in the 10th embodiment of the present invention.

BEST MODE OF CARRYING OUT THE INVENTION

Several preferred embodiments of the present invention will be described below was the best mode of carrying out the invention with reference to the accompanying drawings.

First Embodiment

Figure 1:
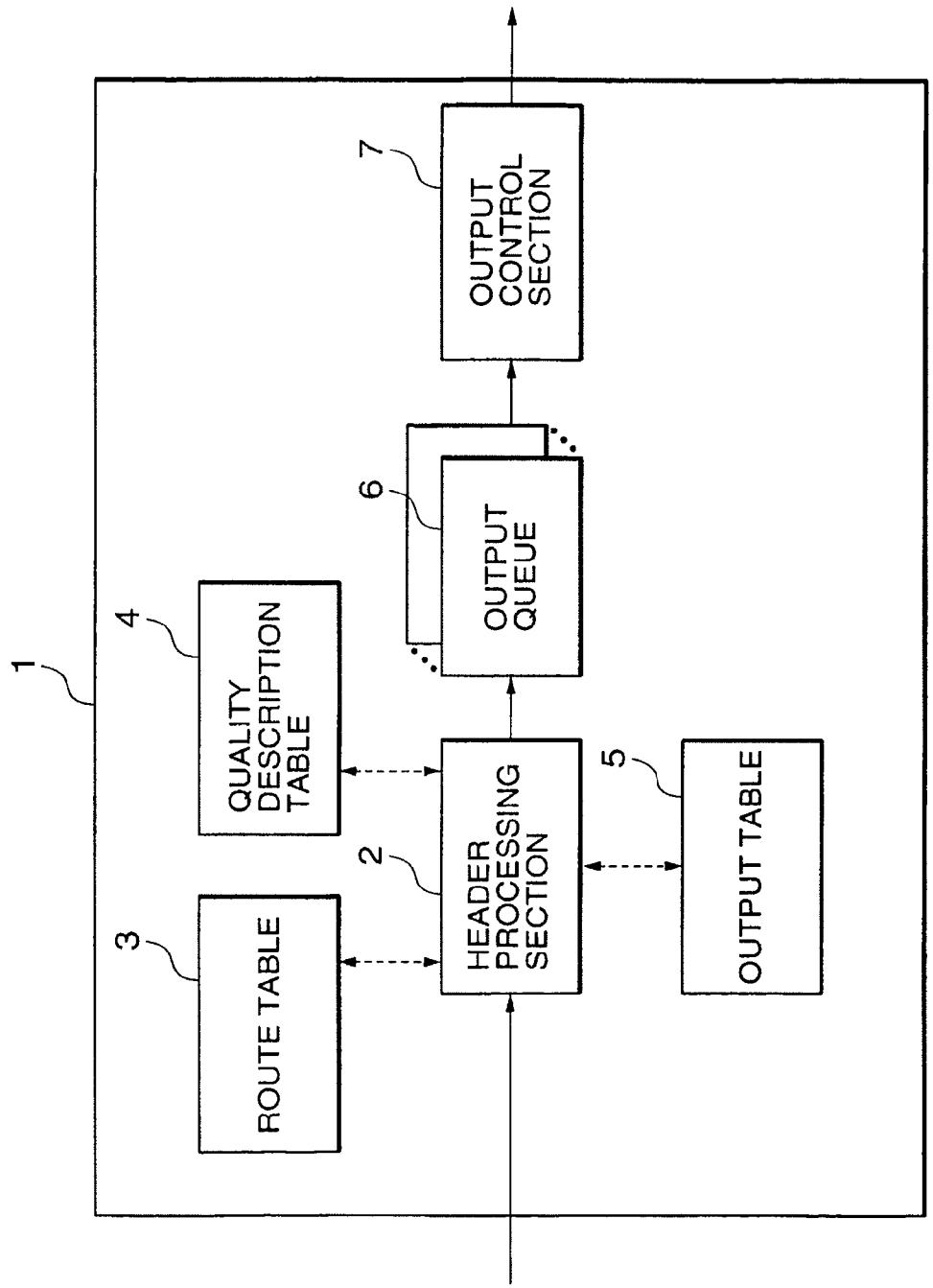
FIG. 1 is a block diagram showing the arrangement of the first embodiment of the present invention.

FIG. 1 is a block diagram showing the arrangement of a node apparatus according to the first embodiment of the present invention. A node apparatus 1 according to the first embodiment is an apparatus for setting a plurality of VCs having different qualities with respect to an adjacent node apparatus (not shown) and transmitting packets over the VCs while guaranteeing their qualities. The node apparatus 1 is comprised of a header processing section 2 for processing an incoming packet and determining an output queue and output VC, a route table 3 for determining an output destination, a quality description table 4 for determining a quality class, an output table 5 for selecting an output queue and output VC on the basis of an output destination and output VC, a plurality of output queues 6 for which appropriate qualities are respectively set, and an output control section for outputting a packet from the output queue to an output VC in accordance with the quality set in each output queue 6. In this case, the output queues 6 equal in number to at least the quality classes are prepared in units of output destinations.

As shown in, for example, FIG. 2, in the route table 3, output destinations are defined in advance in correspondence with pairs of destination addresses and their mask lengths. In this case, a mask length indicates how many bits from the start of the destination address are effective.

The quality description table 4 is configured, for example, as shown in FIG. 3 when the IPv4 (IP version 4) protocol is used as a third-layer protocol. Referring to FIG. 3, in this quality description table 4, quality classes are defined in correspondence with combinations of virtual dedicated network numbers, destination addresses/mask lengths, source addresses/mask lengths fourth-layer protocols/source port numbers, and destination port numbers. In this quality description table 4, in each entry, all the fields need not always be filled in, and a plurality of blank fields are allowed. Each blank field is interpreted as information coinciding with any value in a search in the quality description table 4. This allows flexible quality guarantees such as a quality guarantee for each flow, a quality guarantee for each terminal, a quality guarantee for each LAN, a quality guarantee for each virtual dedicated network number, a quality guarantee based on each port number, and a combination of these quality guarantees. In addition, by increasing the unit of quality guarantee, the size of the quality description table 4 can be decreased. Several examples of operation using this table will be described below.

(a) When a specific flow is to be defined, all the fields in the entry corresponding to the flow are filled in.

(b) When a quality is to be defined between specific terminals, the fourth-layer protocol/source port number field and destination port number field in the corresponding entry are left blank.

(c) When a quality is to be defined with respect to a traffic sent out from a specific terminal, the fourth-layer protocol/source port number field, destination port number field, destination address/mask length field in the corresponding entry are left blank.

(d) When a quality is to be defined between specific LANs, the fourth-layer protocol/source port number field and destination port number field in the corresponding entry are left blank, and the mask lengths of the addresses held by the respective LANs are set in the source address mask length field and destination address mask length field, respectively, (e) When a quality is to be defined with respect to a specific virtual dedicated network, all fields other than the virtual dedicated network number field in the corresponding entry are left blank.

(f) When a quality is to be defined with respect to a specific application in a specific virtual dedicated network, the source address/mask length field and destination address/mask length field in the corresponding entry are left blank, and the values to be used by the application are respectively set in the fourth-layer protocol/source port number field and destination port number field.

Priorities are assigned to the respective fields of the quality description table 4. In this embodiment, the highest priority is assigned to "virtual dedicated network number"; the second highest priority, to "destination address/mask length"; the third highest priority, to "fourth-layer protocol/destination port number"; the fourth highest priority, to "source address/mask length"; and the fifth highest priority, to "fourth-layer protocol/source port number".

FIG. 3 shows an example of the quality description table 4 using the IPv4 (IP version 4) protocol as a third-layer protocol. However, this apparatus may incorporate quality description tables having afferent arrangements in correspondence with different third-layer protocols. For example, a quality description table based on the IPv4 protocol, a quality description table based on the IPv6 protocol, and the like may be used. When quality description tables are respectively prepared for different third-layer protocols in this manner, a field indicating the type of third-layer protocol is added to each quality description table. In the case of the quality description table based on the IPv6 protocol, a flow label field in the IPv6 protocol and the like are added to the fields shown in FIG. 3.

In the output table 5, as shown in, for example, FIG. 4, the number of the output queue 6 to be used and the number (VPI/VCI) of VC to be used in output operation are defined in correspondence with each pair of an output destination and quality class.

The operation of the first embodiment will be described next.

Figure 5:
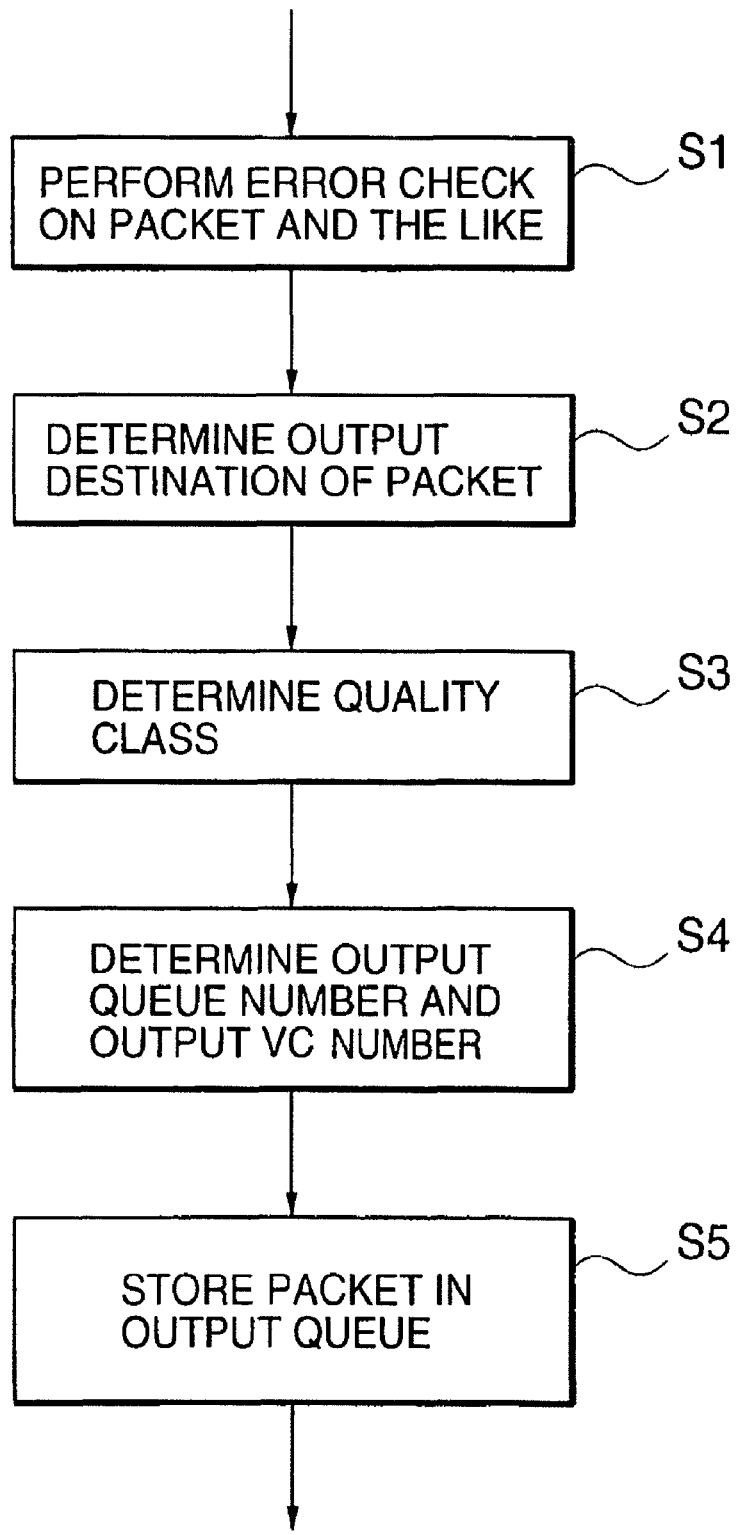
FIG. 5 is a flow chart showing an example of processing to be performed when a packet is input in the first embodiment of the present invention.

When a packet arrives at the node apparatus 1 of the first embodiment through a given input VC, the operation shown in the flow chart of FIG. 5 is performed.

0 Step S1: First of all, the header processing section 2 performs necessary processing such an error check on the packet and updating, and also discards a packet as needed. If the packet is associated with routing, the header processing section 2 performs necessary processing such as updating the route table 3. If the packet is discarded or terminated by this node, the processing in step S2 and the subsequent steps described below is not performed.

0 Step S2: The header processing section 2 then searches the route table 3 in FIG. 2 on the basis of the destination address contained in the header of the packet to determine the output destination of the packet. In this case, the destination address contained in the header is compared with destination addresses in the route table 3 within the portions indicted by the mask lengths in the route table 3. If a plurality of addresses are searched out, an output destination is obtained by selecting one of the addresses which has the greatest mask length.

0 Step S3: The header processing section 2 extracts the destination address, destination port number, source address, source port number, and fourth-layer protocol contained in the header of the packet, and determines a virtual dedicated network number, thereby searching the quality description table 4 in FIG. 3 by using these values. For example, this search is made as follows.

(a) An entry in which all the fields other than blank fields match the above values is searched out. In this case, matching of source addresses and destination addresses is performed by comparing only the portions indicated by the respective mask lengths. If only one entry is found out, the quality class in the entry is set as the quality class of the packet.

(b) Assume that a plurality of entries are found out in (a) described above. In this case, of the plurality of entries, any entry in which a match is obtained in a field with a higher priority is selected. If only one entry is selected, the quality class in the entry is set as the quality class of the packet.

(c) If a plurality of entries are selected in (b) described above, any entry in which the mask length of the destination address is the greatest is selected. If only one entry is selected, the quality class in the entry is set as the quality class of the packet.

(d) If a plurality of entries are selected in (c) described above, an entry in which the mask length of the source address is the greatest is selected. A quality class for the packet is then obtained from the selected entry.

0 Step S4: The header processing section 2 obtains an output queue number and output VC number by looking up the output table 5 in FIG. 4 on the basis of the output destination obtained in step S2 and the quality class obtained in step S3.

0 Step S5: The header processing section 2 stores the output queue number obtained in step S4 in the output queue 6.

Operation to be performed when a packet is output from the node apparatus 1 of the first embodiment will be described next.

Figure 6:
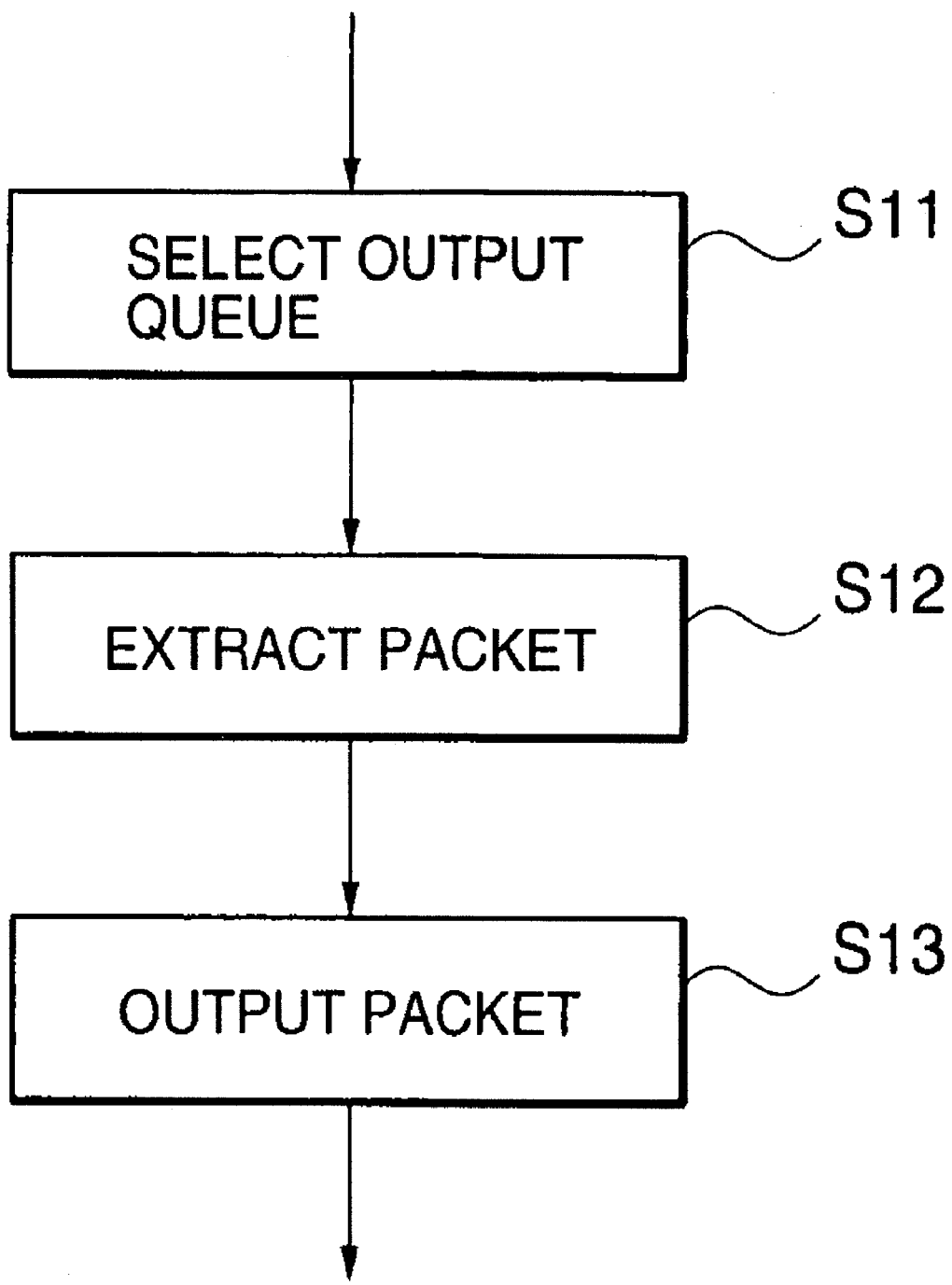
FIG. 6 is a flow chart showing an example of processing to be performed when a packet is to be output in the first embodiment of the present invention.

For example, as indicated by the flow chart of FIG. 6, in outputting a packet, the output control section 7 selects one of the plurality of output queues 6 so as to satisfy the quality set for each output queue 6 (step S11) extracts one packet from the head of the selected output queue 6 (step S12) and outputs the packet to the output VC determined in step S4 in FIG. 5 (step S13).

Second Embodiment

Figure 7:
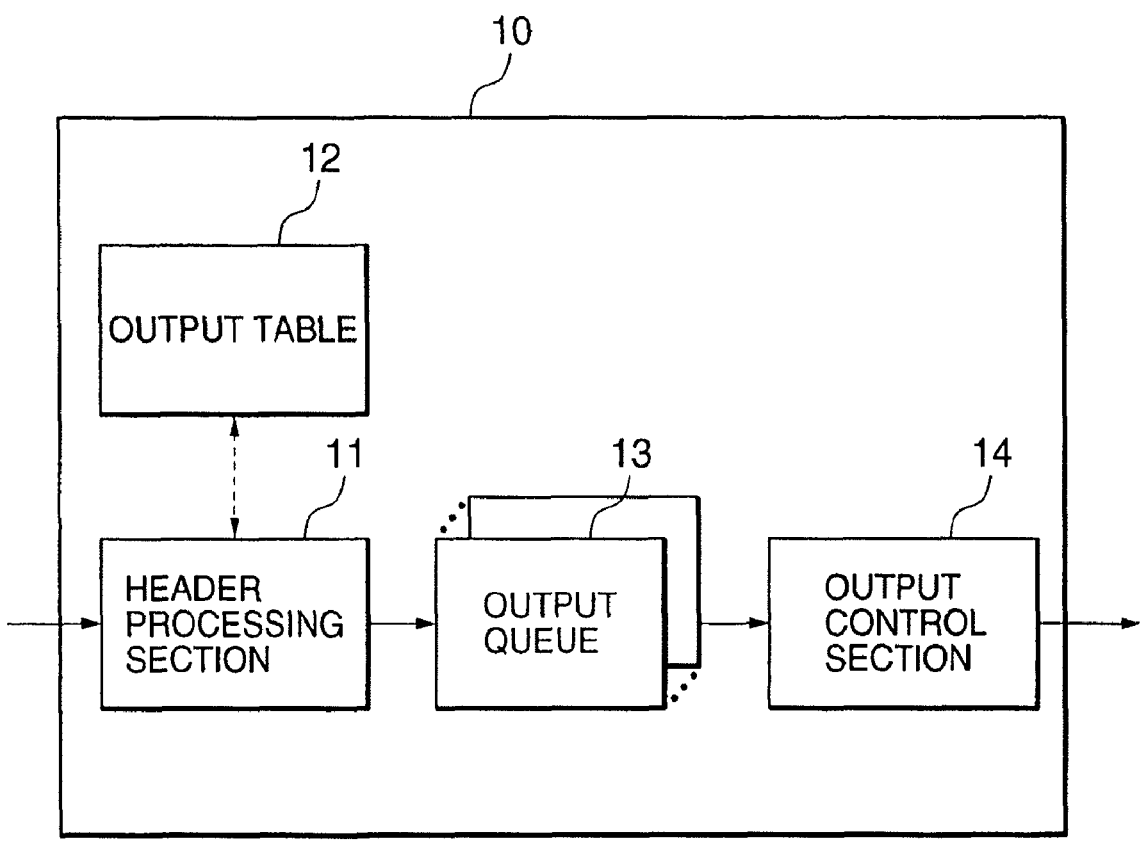
FIG. 7 is a block diagram showing the arrangement of the second embodiment of the present invention.

FIG. 7 is a block diagram showing the arrangement of a node apparatus according to the second embodiment of the present invention. A node apparatus 10 of this embodiment is the same as the node apparatus of the first embodiment except that the apparatus 10 has one output table 12 in place of the route table 3, quality description table 4, and output table 5 in FIG. 1.

FIG. 8 shows an example of the arrangement of the output table 12. The output table 12 is obtained by integrating the route table 3, quality description table 4, and output table 5 in the first embodiment. In this embodiment, output queue numbers and output VC numbers are defined in correspondence with combinations of virtual dedicated network numbers, destination, addresses/mask lengths, source addresses/mask lengths, fourth-layer protocols/source port numbers, and destination port numbers.

As in the quality description table 4 in the first embodiment, priorities are assigned to the respective fields in the output table 12. In this embodiment, however, the highest priority is assigned to the destination address/mask length field because an output destination must be determined by using the output table 12. The remaining fields are assigned priorities in the same manner as in the first embodiment. That is, the second highest priority is assigned to the virtual dedicated network number field; the third highest priority, to the fourth-layer protocol/destination port number field; the fourth highest priority, to the source address/mask length field: and the fifth highest priority, to the fourth-layer protocol/source port number field. In this output table 12 as well, all the fields need not always be filled in, and a plurality of blank fields are allowed.

The operation of the second embodiment of the present invention will be described next.

Figure 9:
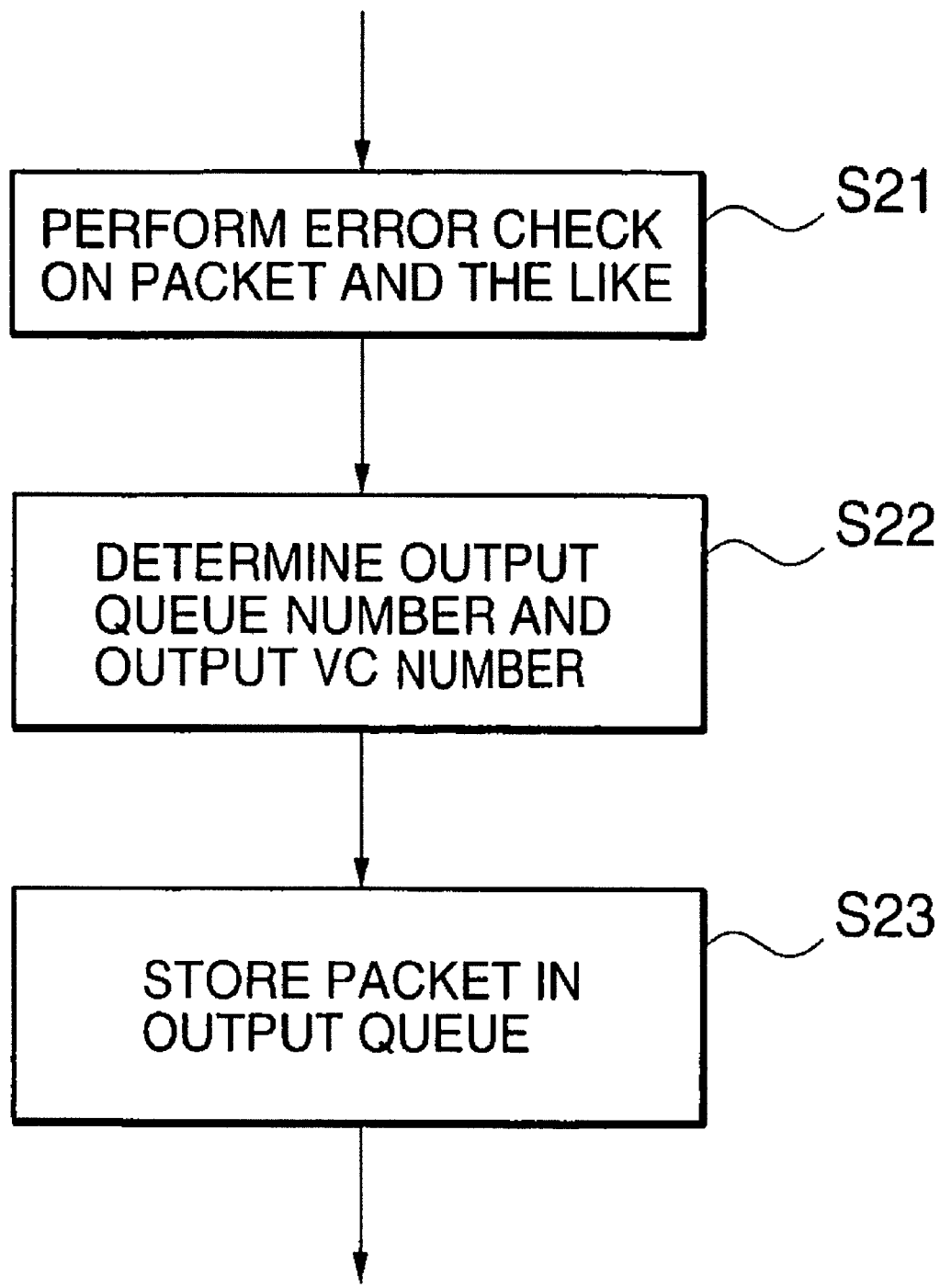
FIG. 9 is a flow chart showing an example of processing to be performed when a packet is input in the second. embodiment of the present invention.

When a packet arrives at the node apparatus 10 of the second embodiment through a given input VC, the operation shown in the flow chart of FIG. 9 is performed.

0 Step S21: First of all, the header processing section 11 performs necessary processing such an error check on the packet and updating, and also discards a packet as needed. If the packet is associated with routing, the header processing section 11 performs necessary processing such as updating the destination address, output queue number, and output VC number , in the output table 12. If the packet is discarded or terminated by this node, the processing in step S22 and the subsequent steps described below is not performed.

0 Step S22: The header processing section 11 then searches the output table 12 by using the same search scheme as that f or the quality description table 4 in the first embodiment to obtain an output queue number and output VC number. More specifically, the header processing section 11 extracts the destination address, destination port number, source address, source port number, and fourth-layer protocol contained in the header of the packet, and determines a virtual dedicated network number from the number of the VC through which the packet has arrived. The header processing section 11 then searches the output table 12 in FIG. 8 by using these values, and obtains an output queue number and output VC number from the selected entry.

0 Step S23: The header processing section 11 stores the packet in a selected output queue 13.

The operation to be performed when the node apparatus 10 outputs a packet in the second embodiment is the same as the node apparatus 1 in the first embodiment. That is, an output control section 14 outputs a packet from each output queue 13 to a corresponding output VC in accordance with a quality set for each output queue 13.

Figure 10:
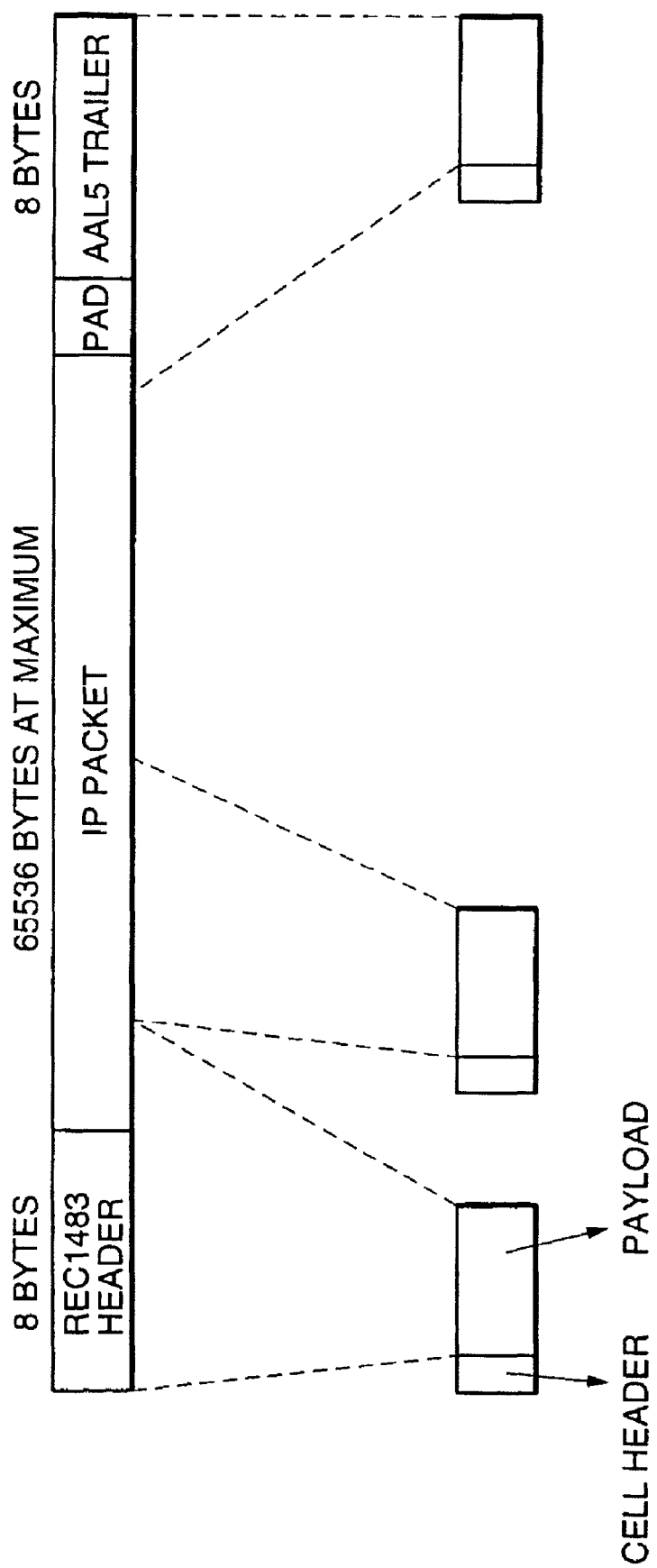
FIG. 10 is a view showing an example of the format of data used in each embodiment of the present invention.

FIG. 10 shows the format of data in each embodiment of the present invention. IP-related processing is performed for a packet segmented into cells by using AAL5, with a header identifying the packet being added thereto. More specifically, 10 an AAL5 frame consisting of an 8-byte header, a packet consisting of 65,536 bytes at maximum, a PAD, and an 8-byte AAL5 trailer is divided in units of 48 bytes. Thus, the frame is segmented into a plurality of cells with the respective divided portions being payload portions. In this case, the cell header of each cell contains a VPI/VCI. The start cell contains an 8-byte AAL5 header, and hence contains an IP header including a destination IP address. The final cell contains an 8-byte AAL5 trailer, and hence contains the CRC value of the AAL5 frame. In addition, the final cell is identified by its payload type (PT). Although the header indicated by RFC 1483 is a typical header, implementation without any header is also conceivable.

Third Embodiment

Figure 11:
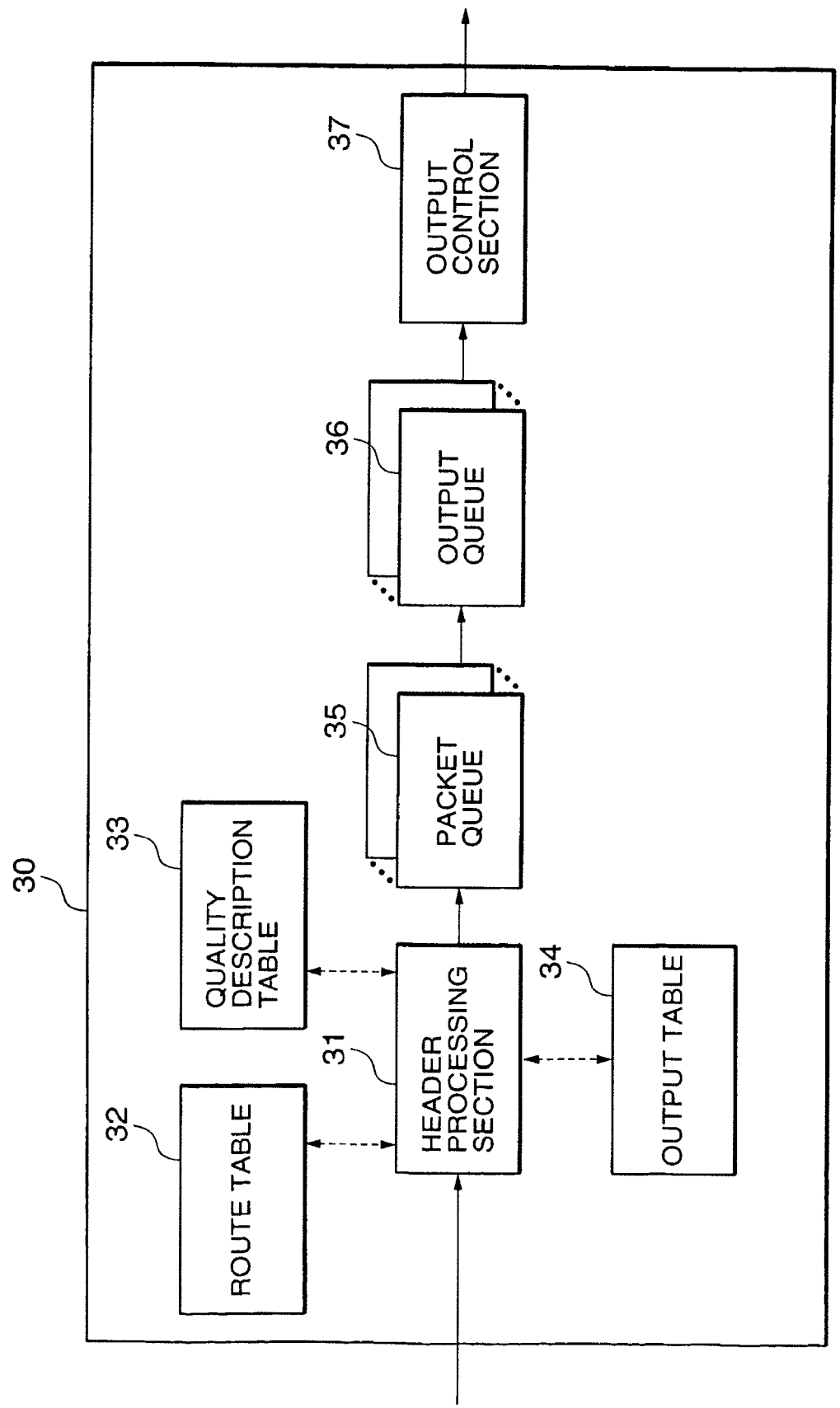
FIG. 11 is a block diagram showing the arrangement of the third embodiment of the present invention.

FIG. 11 is a block diagram showing the arrangement of a node apparatus according to the third embodiment of the present invention. A node apparatus 30 of the third embodiment is an apparatus for setting a plurality of VCs having different qualities with respect to an adjacent node apparatus (not shown) and transmitting packets segmented into cells over the VCs while guaranteeing their qualities. This apparatus is comprised of a header processing section 31 for processing an incoming packet and determining an output queue and output VC, a route table 32 for determining an output destination, a quality description table 33 for determining a quality class, an output table 34 for selecting an output queue and output VC on the basis of an output destination and quality class, a plurality of packet queues 35, a plurality of output queues 35 for which proper qualities are respectively set, and an output control section 37 for outputting cells constituting a packet from each output queue 35 in accordance with the quality set therefore. In this case, the output queues 35 equal in number to at least the quality classes are prepared in units of output destinations.

As in the second embodiment, in the node apparatus 30 of the third embodiment, the present invention is applied to an ATM switch capable of performing quality control for each output queue. A quality guarantee on the packet level is provided by using a quality guarantee mechanism on the cell level which the ATM switch has. That is, the output queues 35 and output control section 37 used in the ATM switch are used.

The node apparatus 30 of the third embodiment is configured to segment a packet into cells according to the scheme shown in FIG. 10 and transfer them between nodes. This apparatus keeps processing the packet segmented into cells without reassembling them into the packet. For this reason, a packet reassembling section 21 and packet segmenting section 26 are omitted from the third embodiment. The packet queues 35 are added as constituent elements instead. The packet queues 35 are queues each for storing cells corresponding one packet, and prepared for the respective input VCs. When packets received from different VCs are to be output to a single VC, the packet queues 35 prevent cells constituting different packets from being nested.

The route table 32, quality description table 33, and output table 34 in the third embodiment have the same arrangements as those in the first embodiment, and are respectively configured as shown in, for example, FIGS. 2, 3, and 4.

The operation of the third embodiment will be described next.

Figure 12:
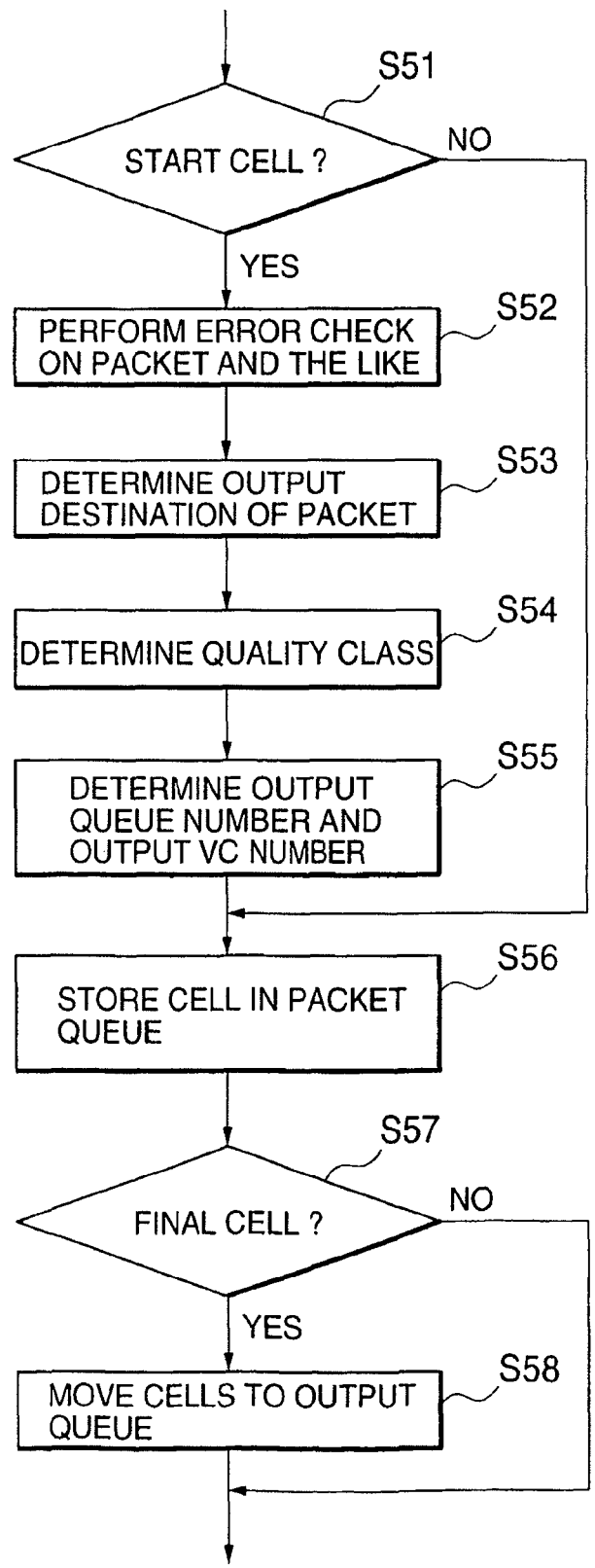
FIG. 12 is a flow chart showing an example of processing to be performed when a cell is input in the third embodiment of the present invention.

When a cell of a packet arrives at the node apparatus 30 of the third embodiment through a given input VC, the operation shown in the flow chart of FIG. 12 is performed. Note that incoming cells are directly sent to the header processing section 31 without being assembled into a packet.

0 Step S51: The header processing section 31 determines whether the incoming cell is the start cell of the packet. In this determination, since the final cell of an AAL5 frame is identified by its payload type (PT), for example, the following method can be used. Flags that are set when final cells are detected are managed for the respective input VCs. When such a flag is set, and a cell is then received from the corresponding input VC, the received cell, is determined as the start cell. If the incoming cell. is the start cell, since the cell contains the header of the packet, the processing in steps S52 to S55 is performed, and then the flow advances to step S56. If the cell is not the start cell, the flow advances to step S56.

0 Steps S52 to 2355: Processing similar to that in steps S1 to S4 in the first embodiment is performed to obtain an output queue number and output VC number.

0 Step S56: The incoming cell is stored in the packet queue 35 corresponding to the input VC through which the cell has arrived.

0 Step S57: It is checked on the basis of the payload type of the cell whether the incoming cell is the final cell.

0 Step S58: If the incoming cell is the final cell, all the cells of one packet are simultaneously moved from the packet queue 35 to the output queue 36 corresponding to the output queue number obtained in step S55.

In outputting cells constituting a packet from the node apparatus 30 of the third embodiment, the output control section 37 extracts cells from each output queue 36 in accordance with the quality set therefore, and outputs them to an output VC corresponding the output VC number obtained in step S55. In this case, the VPI/VCI of each cell is converted into an output VC number (VPI/VCI). In this case, according to the third embodiment, since data are read out from the output queue 36 in units of cells instead of packets, if cells from different output queues 36 are output to a single VC, the cells constituting different packets may be nested. For this reason, in this embodiment, the respective output queues 36 are in a one-to-one correspondence with output VCs, and cells from a plurality of output queues 36 are not output to a single output VC.

On the other hand, if the cells that have arrived at the node apparatus 30 are not cells constituting a packet but are general ATM cells, the cells are subjected to processing similar to that performed by using a general ATM switch.

Fourth Embodiment

Figure 13:
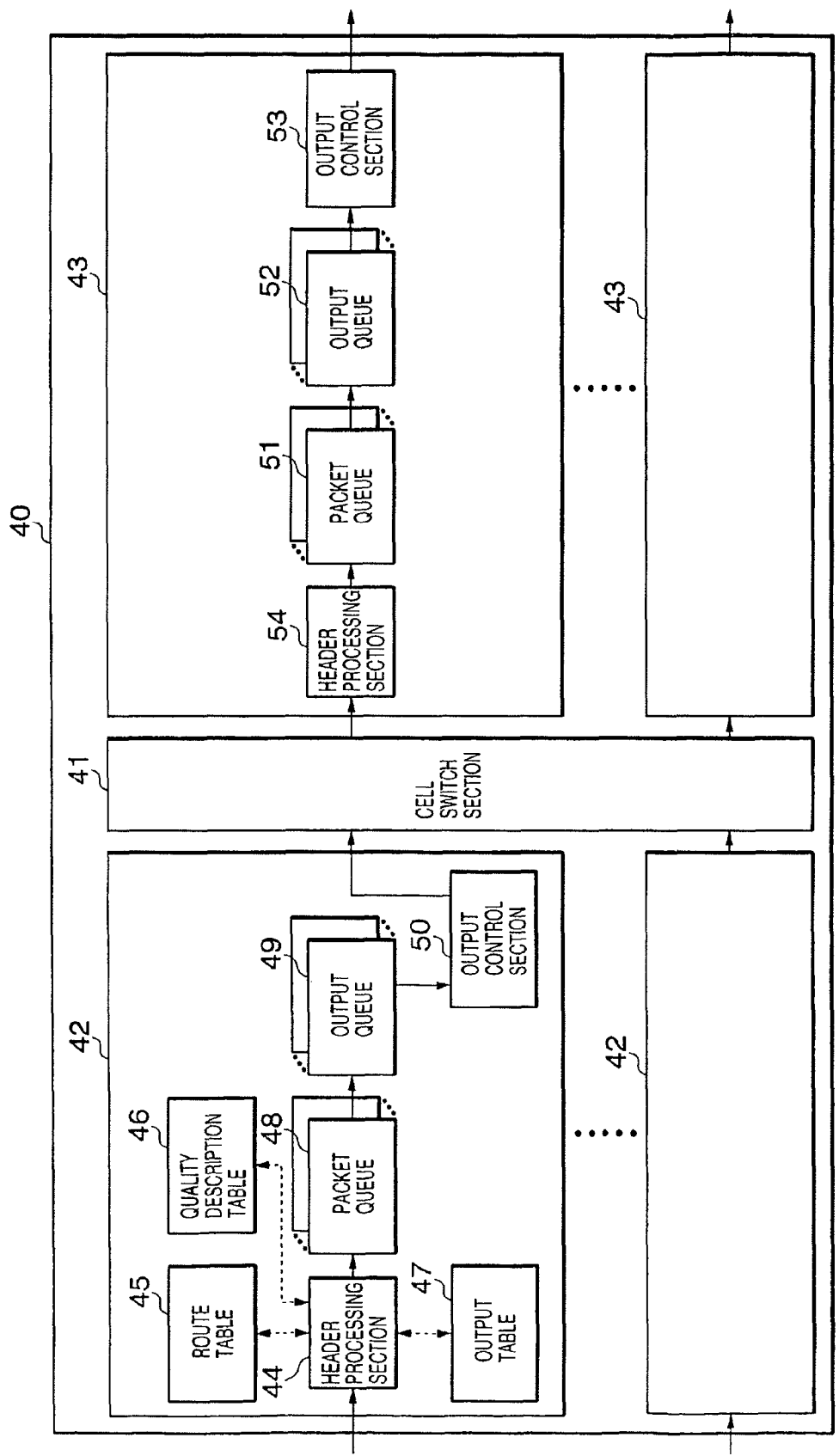
FIG. 13 is a block diagram showing the arrangement of the fourth embodiment of the present invention.

FIG. 13 is a block diagram showing the arrangement of a node apparatus according to the fourth embodiment of the present invention. A node apparatus 40 of this embodiment is comprised of a plurality of input buffer sections 42, a cell switch section 41, and a plurality of output buffer sections 43, each of which has the same arrangement as that in the node apparatus 30 of the fourth embodiment shown in FIG. 11. Each output buffer section 43 is comprised of a plurality of packet queues 51, a plurality of output queues 52, an output control, section 53, and a header processing section 54. The input buffer sections 42 and output buffer sections 43 are prepared in units of physical lines.

In the fourth embodiment, packet queues 48 in each input buffer section 42 are used to multiplex packets that have arrived from different VCs on a single physical line to a single output VC, and the packet queues 51 in each output buffer section 43 are used to multiplex packets that have arrived at VCs on different physical lines to a single output VC.

The packet queues 48 in each input buffer section 42 are prepared by the number of input VCs of the input buffer section 42, and output queues 49 are prepared by the number of output VCs of the node apparatus 40. The packet queues 51 in each output buffer section 43 are prepared by the number of input buffer sections 42 for each output VC of the output buffer section 43. The output queues 52 are prepared for the respective output VCs of the output buffer section 43.

In the node apparatus 40 of this embodiment as well, the present invention is applied to an ATM switch capable of performing quality control for each output queue. A quality guarantee on the packet level is provided by using a quality guarantee mechanism on the cell level which the ATM switch has. That is, the output queues 49 and 52, output control sections 49 and 53, and cell switch section 41 used in the ATM switch are used.

A route table 45, quality description table 46, and output table 47 in this fourth embodiment have the same arrangements as those in the first embodiment, and are respectively configured as shown in, for example, FIGS. 2, 3, and 4. In this embodiment as well, a packet is segmented into cells according to the scheme shown in FIG. 10, and the cells are transferred between nodes.

The operation of the fourth embodiment will be described next.

The operation of the input buffer section 42 is the same as that of the node apparatus 30 in the fourth embodiment except that cells are not output to an output VC but are output to the cell switch section 41. In outputting a cell, the output control section 50 outputs it upon adding the input buffer number (uniquely specifying the input buffer section) of the cell source.

The cell switch section 41 switches the cell output from each input buffer section 42 to the proper output buffer section 43 in accordance with the output destination of the cell.

Figure 14:
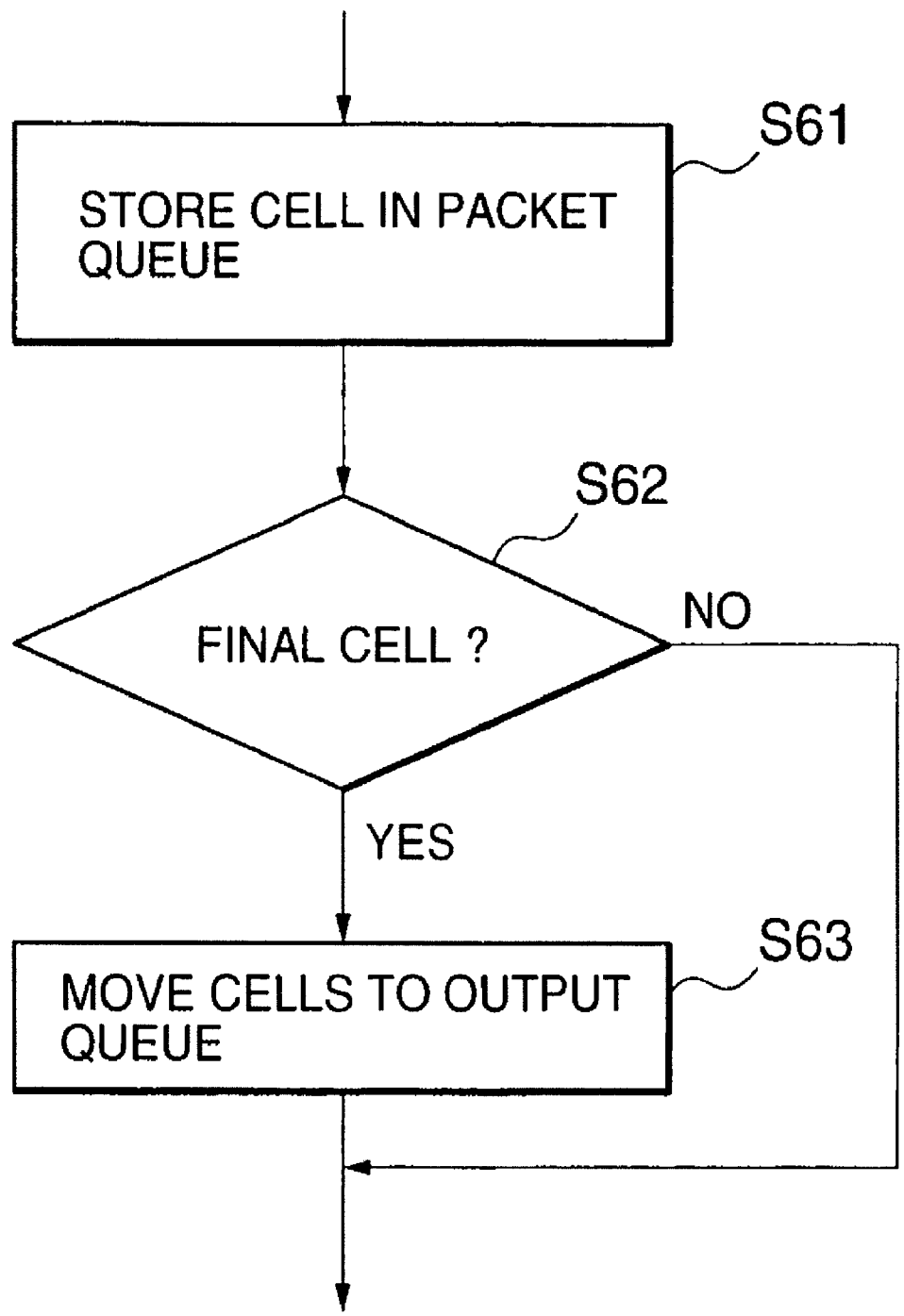
FIG. 14 is a flow chart showing an example of processing to be performed when a cell is input in the fourth embodiment of the present invention.

The operation of the output buffer section 43 will be described next. When a cell arrives from any one of the input buffer sections 42 through the cell switch section 41, the header processing section 54 of the output buffer section 43 temporarily stores the incoming cell in the packet queue 51 corresponding to the output VC specified by the VPI/VCI in the cell and the source input buffer section 42 added to the cell, as shown in the flow chart of FIG. 14 (step S6I). More specifically, cells that have arrived from the same input buffer section 42 and constitute packets having the same output destination and the same quality class are stored in the same packet queue 51 corresponding to that output destination and input buffer section, whereas cells that have arrived from the different input buffer sections 42 and constitute packets having the same output destination and the same quality class are stored in the different packet queues 51 in units of input buffer sections 42. If the currently stored cell is the final cell of the corresponding packet (step S62), the cells of all the packets in the packet queue 51 are moved to the corresponding output queue 52 (step S63). In this case, the corresponding output queue 52 is an output queue corresponding to the output VC specified by the VPI/VCI in the cell of the packet. With this operation, packets that have arrived from the different input buffer sections 42 and have the same output destination and the same quality class are multiplexed to the same output queue 52.

The output control section 53 extracts cells from each output queue 52 in accordance with the quality set therefore, and outputs them to an output VC corresponding to the output queue.

As described above, in the fourth embodiment, in a sense, a pair of each output queue 52 of each output buffer section 43 and a corresponding output queue 49 of a corresponding input buffer section 42 constitute one virtual output queue. The sum of qualities of the corresponding output queues 49 of each input buffer section 42, i.e., a quality required to satisfy all the qualities set for the corresponding output queues 49 of each input buffer section 42, is set for the output queue 52 of the output buffer section 43, In the fourth embodiment as well, the respective output queues are in a one-to-one correspondence with output VCs, and cells are not output from a plurality of output queues to a signal output VC. If the cells that have arrived at the node apparatus 40 are not cells constituting a packet but are general ATM cells, the cells are subjected to processing similar to that performed by using a general ATM switch.

The present invention is not limited by the above embodiment alone, and various changes can be made. For example, when priorities are assigned to the respective entries of the above quality description table, and the table is to be searched, any entry in which all the fields other than blank fields match an incoming packet is selected. If a plurality of entries are selected, an entry with the highest priority may be selected.

Fifth Embodiment

Figure 15:
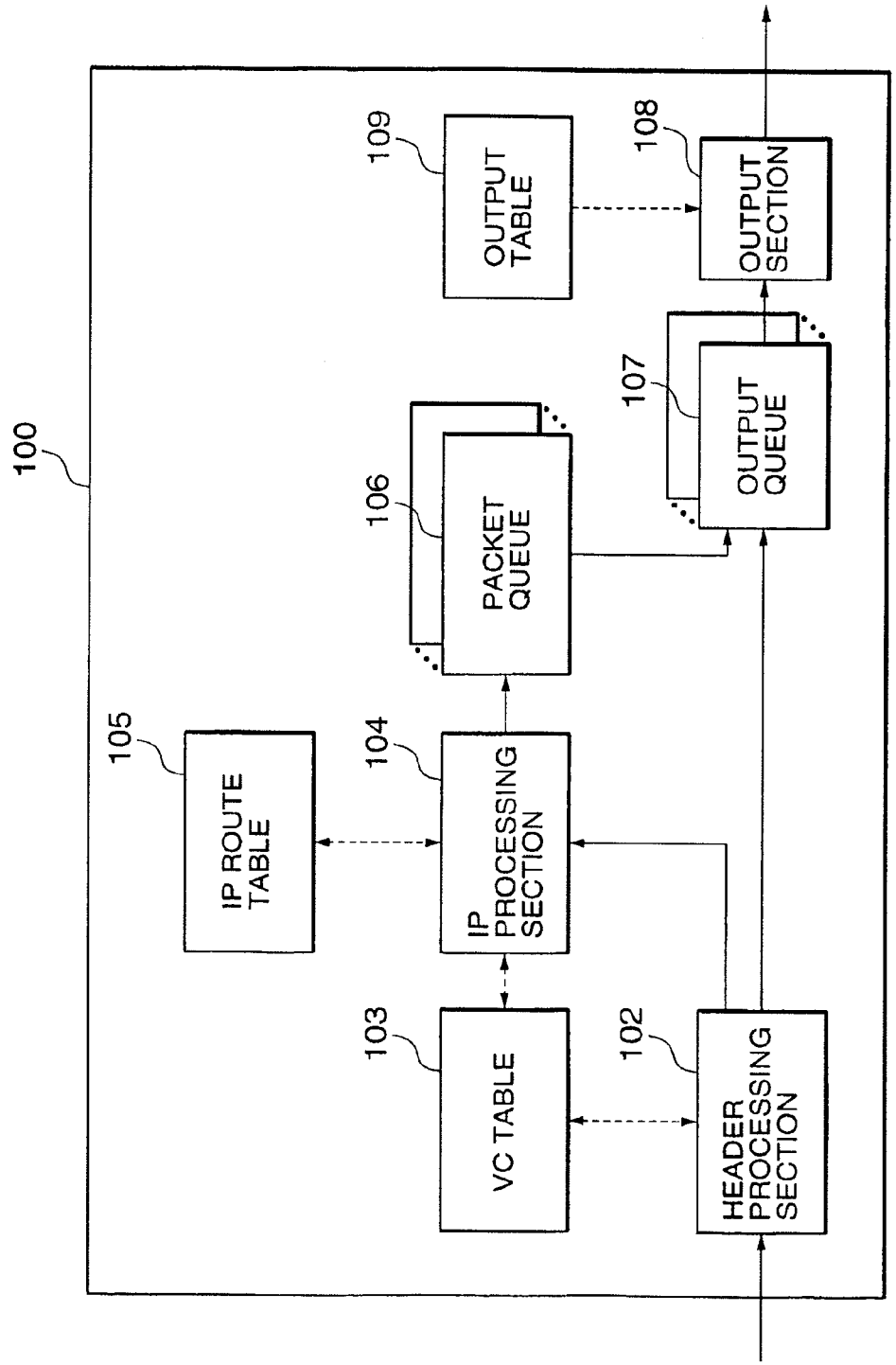
FIG. 15 is a block diagram showing the arrangement of the fifth embodiment of the present invention.

FIG. 15 is a block diagram showing the arrangement of a node apparatus according to the fifth embodiment of the present invention. A node apparatus 100 of this embodiment is comprised of a header processing section 102 for performing ATM header processing for input cells, sorting the cells into ATM and IP cells, and storing them in queues, a VC table 103, an IP processing section 104 for processing packets, an IP route table 105, packet queues 106 each for holding cells constituting a packet until cells corresponding to one packet are stored, output queues 107 for holding cells to be output to output VCs, an output section 108 for outputting cells to an output VC, and an output table 109. In this case, the packet queues 106 are prepared by at least the number of input VCs set for IP of the input VCs of the node apparatus 1. The output queues 107 are prepared by at least the number of output VCs of the node apparatus 100.

In the IP route table 105, for example, as shown in FIG. 16, the number of the output queue 107 is defined as route information in advance in correspondence with each pair of a source IP address and its mask length. The mask length indicates how many bits from the start of the destination IP address are effective.

For example, as shown in FIG. 17, the VC table 3 contains, for each input VC (i.e., each VPI/VCI), an IP identification flag for identifying the corresponding input VC as a VC set for IP or ATM, a start cell identification flag indicating whether the input cell is the start cell of the packet or not, an output destination queue indicating the first storage location of the input cell, a movement destination queue indicating the destination of the packet after IP processing, CRC1 for storing an interim value for a CRC check, CRC2 for storing an interim value for CRC re-calculation, and a discard flag indicating that the packet is being discarded. For an input VC set for ATM, however, the output queue number of a predetermined output queue 107 is written in "output destination queue", and "movement destination queue", "CRC1", and "CRC2" are not used. For an input VC set for IP, the number of a packet queue 106 corresponding to the input VC is written, and the number of a predetermined output queue 107 is written in "movement destination queue". In this case, in the VC table 103, necessary values are set in all the source VPI/VCI, IP identification flag, and movement destination queue fields in all the entries before the table is used, while the start cell identification flag field is initialized to true; the movement destination queue field, to the NULL value, the CRC1 and CRC2 fields, to 0, and the discard flag field, to false.

For example, as shown in FIG. 18, in the output table 109, for each output queue number (i.e., each output queue 7), a quality parameter for the output queue, a transmission VPI/VCI, and output destination information are defined in advance.

The operation of the node apparatus 1 according to the fifth embodiment will be described. Operation to be performed when a cell has arrived at the node apparatus 100 from a given input VC will be described first.

Figure 19:
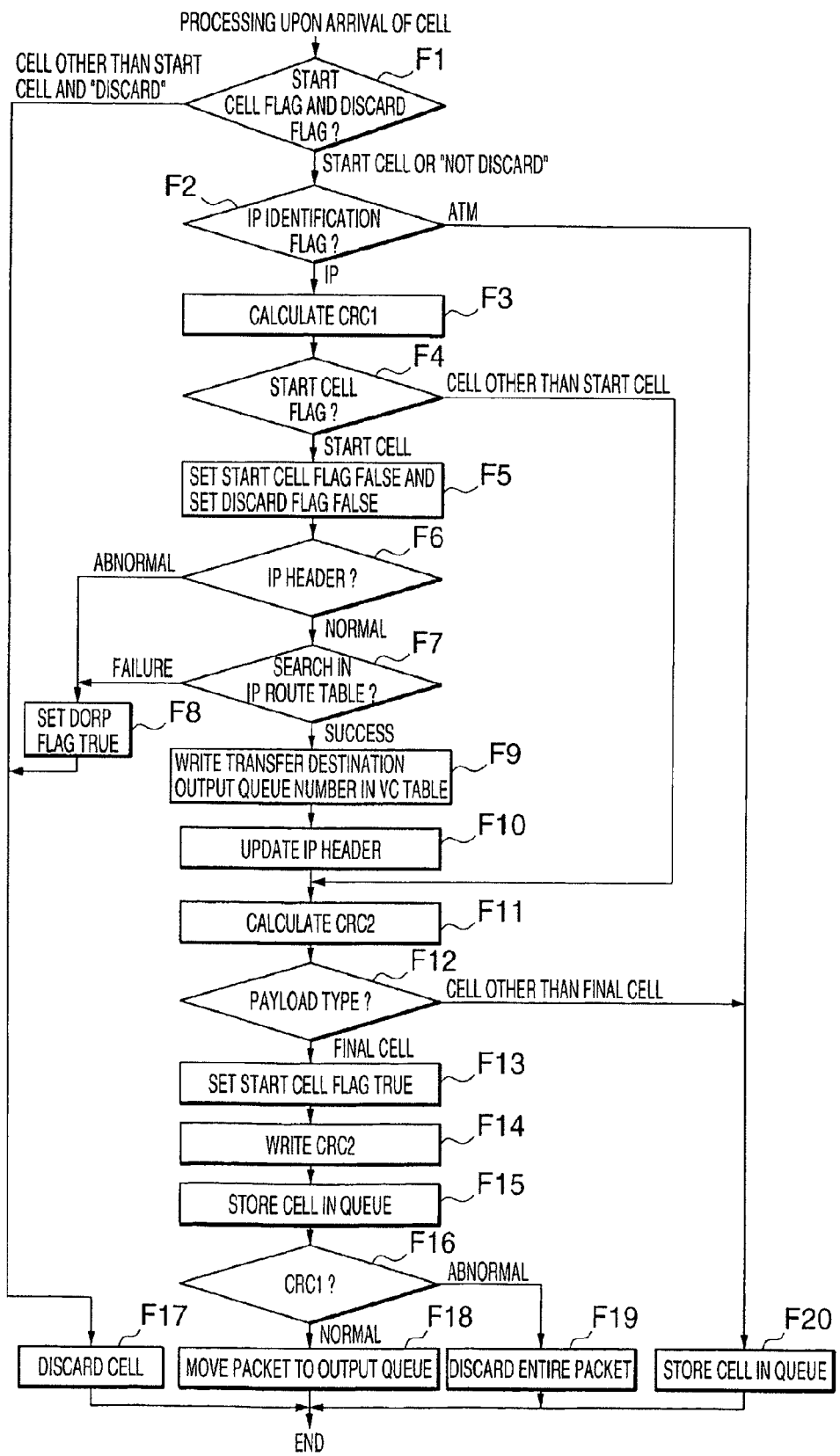
FIG. 19 is a flow chart showing an example of processing to be performed when a cell is input in the fifth embodiment of the present invention.

As shown in the flow chart of FIG. 19, when a cell arrives, the header processing section 102 searches the header processing section 102 with the VPI/VCI contained in the input cell, and checks the discard flag and start cell identification flag in an entry having the same VPI/VCI (step F1). Note that all the discard flag, start cell identification flag, IP identification flag, output destination queue, movement destination queue, CRC1, CRC2, and discard flag to be referred to in the subsequent processing are those in the entry in the VC table 103 which has the same VPI/VCI.

As a result of the above reference, if the discard flag is true, and the cell is not the start cell (the start cell flag is false), the input cell is discarded (step F17), and the processing is terminated. If the input cell is the start cell (the start cell flag is true) or the discard flag is false, the header processing section 102 checks the IP identification flag in the VC table 103 (step F2). If the IP identification flag indicates ATM, the input cell is stored in the output queue 107 indicated by the output destination queue in the VC table 103 (step F20). If the IP identification flag indicates IP, the input cell is sent to the IP processing section 104, and the subsequent processing is performed.

First of all, CRC1, i.e., a check CRC interim value, is updated on the basis of the input cell (step F3). More specifically, the initial value of CRC1 in the VC table 3 is updated with the remainder of the quotient obtained by dividing the bit string, formed by adding the value (initial value: 0) of CRC1 of the VC table 103 to the head of the payload of the current cell, by a predetermined value. The header processing section 102 checks the start cell identification flag of the VC table 103 again (step F4). If this flag is true, since the current cell is the start cell, the header processing section 102 executes processing to be performed for the start cell alone (steps F5 to F10). The flow then advances to step F11. If the start cell identification flag is false, since the current cell is not the start cell, the flow skips steps F5 to F10 and advances to step F11.

In processing the start cell, the header processing section 102 resets the start cell identification flag in the VC table 103 to false, and also resets the discard flag to false temporarily (step F5). The header processing section 102 checks the IP header contained in the start cell (step F6). If an error is detected, the discard flag is changed to true to discard cells that will arrive afterward (step F8), and the current start cell is discarded (step F17), thus terminating the processing. If no error is detected, the header processing section 102 searches the IP route table 105 by using the destination IP address contained in the start cell as a key to acquire an output queue number (step F7), and writes the output queue number in the movement destination queue in the VC table 103 (step F9). The header processing section 102 then performs necessary IP header updating (step F10). In this case, necessary IP header updating is to decrease TTL (Time To Live) by one and update the checksum of the IP header in, for example, IP version 4. In searching the IP route table 105 in step F7, the destination IP address contained in the start cell is compared with the destination IP address in the IP route table 105 within the portion indicated by the mask length in the IP route table 105. If the destination IP address matches a plurality of destination IP addresses, a destination IP address having the greatest mask length is selected to obtain an output queue number. In this embodiment, if there is no match of the destination IP address, the discard flag is changed to true (step F8), and the start cell is discarded (step F17), thus terminating the processing.

The IP processing section 104 updates CRC2 for all the cells including the start cell, i.e., the CRC interim value for re-calculation. More specifically, the initial value of CRC2 in the VC table 103 is updated with the remainder of the quotient obtained by dividing the bit sting, formed by adding the value of CRC2 in the VC table 103 to the head of the payload (after IP header updating in the start cell) of the current cell, by a predetermined value. The reason why the CRC value is re-calculated in this manner is that the IP header was updated in step F10, and TTL and the checksum of the IP header were changed.

If the payload type of the current cell does not indicate that the cell is the final cell of an AAL5 frame (step F12), the current cell is stored in the packet queue 106 indicated by the output destination queue in the VC table 103 (step F20).

If the current cell is the final cell, the start cell identification flag in the VC table 103 is changed to true to indicate that the cell that will arrive next is the start cell (step F13). The calculated value CRC2 (stored in CRC2 in the VC table 103) is written back to the CRC field of the final cell of the AAL5 frame (step F14) and stored in the packet queue 106 indicated by the output destination queue in the VC table 103 (step F15). If checked CRC1 (stored in CRC1 in the VC table 3) indicates a CRC error in the AAL5 frame (step F16), the overall packet output to the packet queue 106 is discarded (step F 19). Otherwise, the overall packet is moved to the output queue 107 in accordance with the designation by the movement destination queue in the VC table 103 (step F18).

Figure 20:
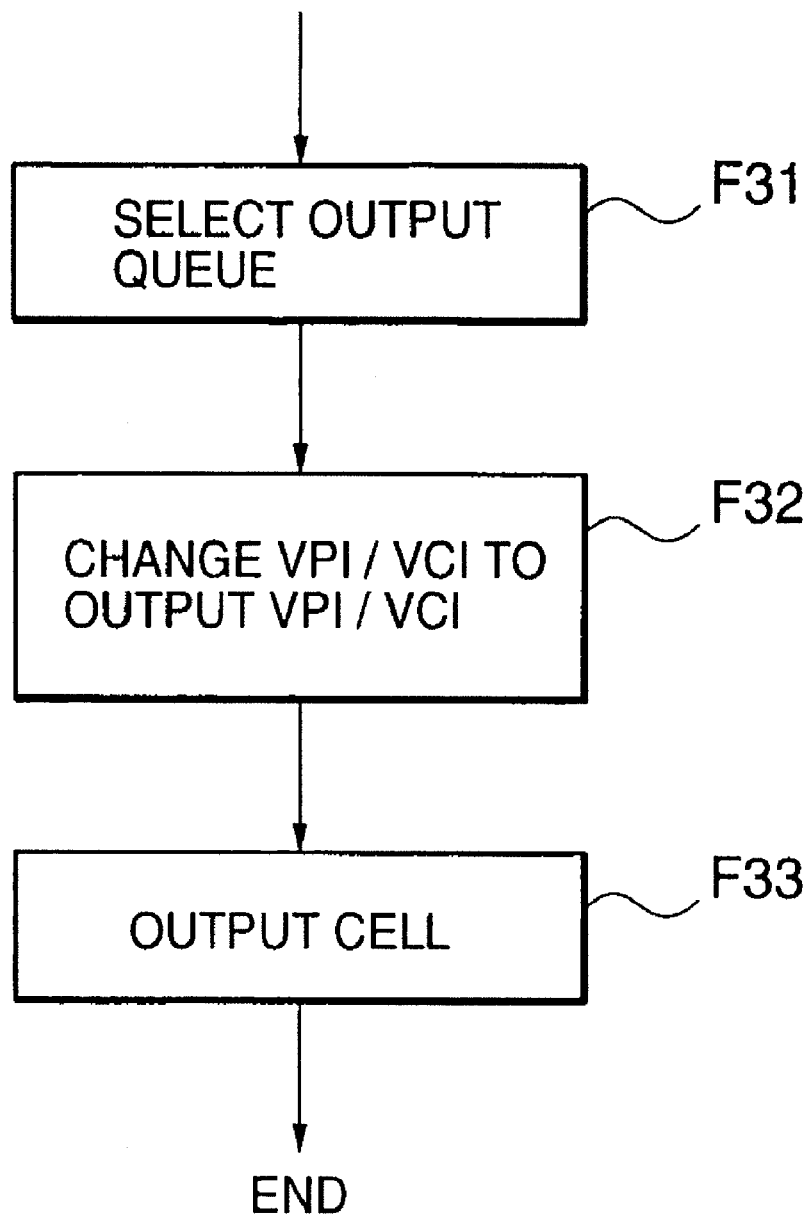
FIG. 20 is a flow chart showing an example of processing to be performed when a cell is to be output in the fifth embodiment of the present invention.

Operation to be performed when cells are output from the node apparatus 100 in the fifth embodiment will be described below. As shown in the flow chart of FIG. 20, in outputting a cell, the output section 108 selects a proper output queue from the plurality of output queues 107 (step F31). The node apparatus 100 extracts one cell from the head of this output queue and changes the VPI/VCI of the cell (step F32). and then outputs the cell to an output VC set for the output queue (step F33). More specifically, in selecting a proper queue from the plurality of output queues 107 in step F31, the output section 108 refers to a quality parameter for each output queue 107 in the output table 9 in FIG. 18 and selects an output queue that satisfies the defined quality. In addition, in changing the VPI/VCI in step F32, the output section 108 converts it to a transmission VPI/VCI corresponding to the output queue defined in the output table 109. In outputting a cell in step F33, the output section 108 outputs the cell the output VC indicated by the output information in the output table 109.

In the fifth embodiment, when different packets having the same destination IP address are input from different input VCs after they are segmented into cells, since they have the same destination IP address, the same output queue number is obtained in searching the IP route table 105 in FIG. 16, and these packets are finally stored in the same output queue 107. Since the same output queue number is obtained, the cells are converted into the same VPI/VCI in the output table 109 in FIG. 18, and this VPI/VCI is output to the same output VC. However, since the cells constituting the respective IP packets are received through different input VCs, they are temporarily stored in different packet queues 106, respectively. and cell corresponding to one packet are moved together to the same output queue 107 to be sequentially output in units of cells from the start cell. For this reason, there is no chance that cells constituting a given packet are inserted in a cell group forming another packet on the same output VC. Even if, thereforee, packets that have arrived from different input VCs are output to a single output VC, the packets segmented into cells can be easily reassembled on the receiving side. As described above, in the node apparatus 100 of the fifth embodiment, when packets that have arrived from different input VCs are to be output to the same route, they can be multiplexed on the same VC.

According to the fifth embodiment, the IP processing section 104 incorporates a means (equivalent to steps F3 and F16 in FIG. 19) for performing a CRC check on an AAL5 frame while the cells are kept segmented without forming packets from the AAL5 frame, a means (equivalent to step F10 in FIG. 19) for updating necessary information such as the TTL field and IP checksum field in a packet, and a means (equivalent to steps F11 and F14 in FIG. 19) for re-calculating and setting a CRC value for the AAL5 frame without forming packets from the frame. With this arrangement, in addition to destination determination processing, the IP processing section 104 can perform a packet check and IP-related processing for a TTL field and IP checksum field without reassembling cells into a packet.

According to the fifth embodiment, with the use of the header processing section 2, not only an IP traffic but also a general ATM traffic can be handled.

The IP multicast function of the node apparatus 100 of the fifth embodiment will be described next. In the node apparatus 100 of the fifth embodiment, if a destination IP address in the IP route table 105 is an IP multicast address, an output queue for ATM cell multicast is set in the output queue number, and a transmission VPI/VCI and output destination information are set for a plurality of routes in correspondence with the corresponding output queue number in the output table 109 in FIG. 18. For this reason, after the cells of a packet having a destination IP address which is an IP multicast address are moved to the output queue 107 for multicast, converted cells having different VPI/VCIs are multicast to the respective routes in steps F32 and F33 in FIG. 20 when they are output from the output queue 7. That is, this embodiment uses the cell copy function of the ATM switch instead of copying a packet in implementing an IP multicast function.

Sixth Embodiment

Figure 21:
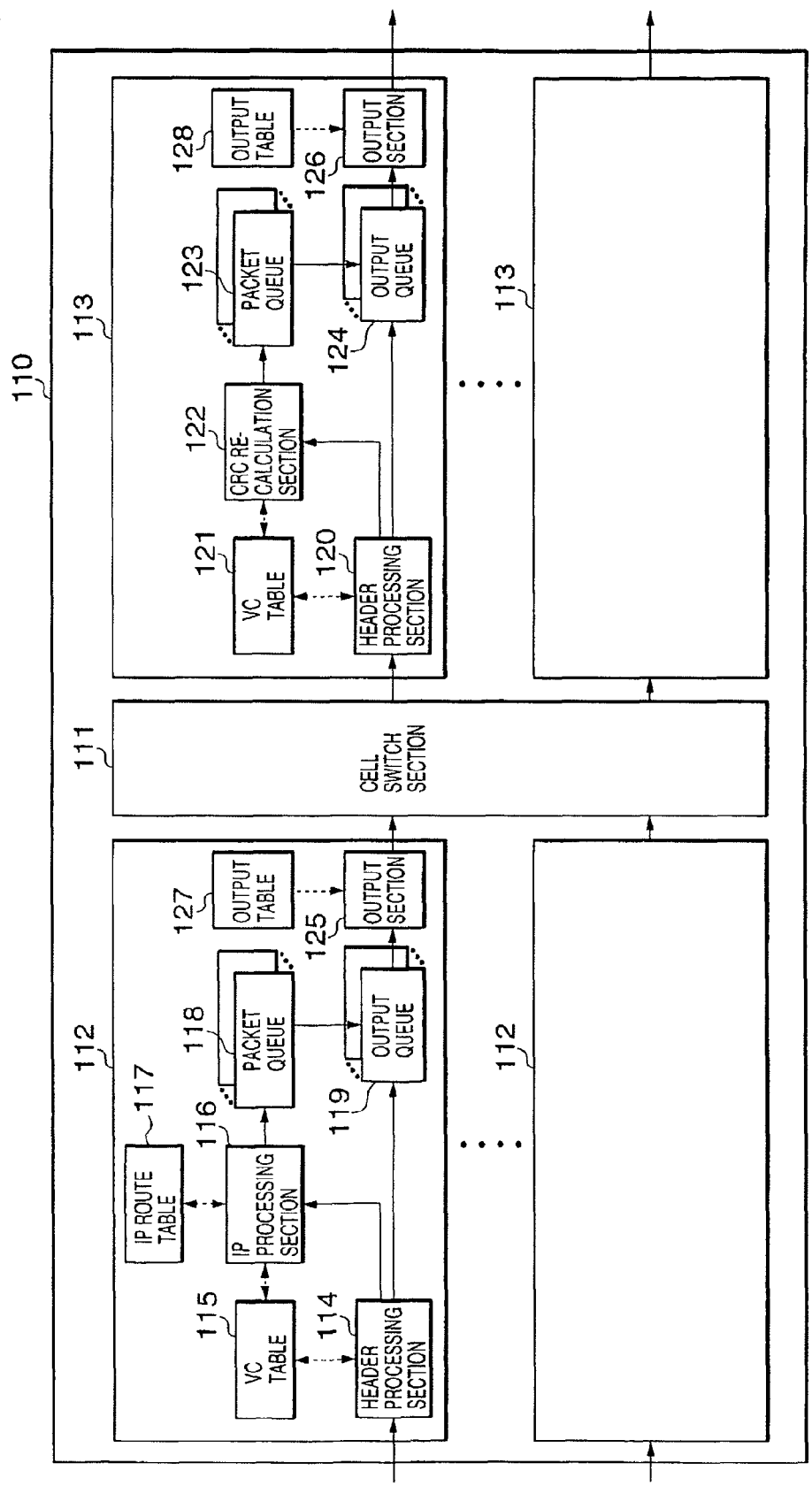
FIG. 21 is a block diagram showing the arrangement of the sixth embodiment of the present invention.

FIG. 21 is a block diagram showing the arrangement of a node apparatus according to the sixth embodiment of the present invention. A node apparatus 110 of this embodiment includes a plurality of input buffer sections 112, a plurality of output buffer sections 113, and a cell switch section 111 for transferring a cell output from an arbitrary input buffer section 112 to an arbitrary output buffer section 113.

All the input buffer sections 112 have the same arrangement and are prepared in units of physical lines. Each input buffer section 112 is comprised of a header processing section 114 for performing ATM header processing for input cells, sorting the cells into ATM and IP cells, and storing them in queues, a VC table 115, an IP processing section 116 for processing packets, an IP route table 117, packet queues 118 each for holding cells constituting a packet until cells corresponding to one packet are stored, output queues 119 for holding cells to be output, an output section 125 for outputting cells to the output buffer section 113 through the cell switch section 111, and an output table 127. In this case, the packet queues 118 are prepared by at least the number of input VCs set for IP of the input VCs of the input buffer section 112. The output queues 119 are prepared by at least the number of output VCs of the node apparatus 100.

For example, as shown in FIG. 16, in the IP route table 117, the number of the output queue 119 is defined as route information in correspondence with each pair of a destination IP address and its mask length.

For example, as shown in FIG. 22, the VC table 115 contains, for each input VC (i.e., each VPI/VCI), an IP identification flag for identifying the corresponding input VC as an input VC set for IP or ATM, a start cell identification flag indicating whether the input cell is the start cell of the packet or not, an output destination queue indicating the first storage location of the input cell, a movement destination queue indicating the movement destination of the packet after IP processing is complete, CRC1 for storing an interim value for a CRC check, and a discard flag indicating that the packet is being discarded. Note that in an input VC entry set for ATM, the output queue number of a predetermined output queue 119 is written in the output destination queue field, and the movement destination queue and CRC1 fields are not used. In an input VC entry set for IP, the number of the packet queue 118 corresponding to the input VC is written in the output destination queue field, and the number of a predetermined output queue is written in the movement destination queue field. This VC table 115 is identical to the VC table 103 in the fifth embodiment except that no CRC2 is prepared. This is because in this embodiment, CRC re-calculation is performed by using the output buffer 113 instead of the input buffer section 112 to realize load distribution. Before operation, all necessary values are set in the source VPI/VCI, IP identification flag, and output destination queue fields in. all the entries, while the start cell identification flag is initialized to true; the movement destination queue, to a NULL value, CRC1, to 0; and the discard flag, to false.

For example, as shown in FIG. 23, for each output queue number (i.e., each logic link to the cell switch section 111), a quality parameter for the output queue, internal identifier, and output destination information are defined. In general, with regards to VCs set for ATM, the internal identifier can uniquely specify an output VC set for ATM. With regards to VCs set for IP, in the sixth embodiment, the internal identifier can uniquely specify a pair of an output VC and the input buffer section 112 to which a cell is output.

All the output buffers 113 have the same arrangement, and are prepared for, for example, the respective physical lines. Each output buffer 113 is comprised of a header processing section 120 for performing ATM header processing for an input cell, sorting the cells into ATM and IP cells, and storing them in queues, a VC table 121, a CRC re-calculation section 122 serving as an IP processing section on the output buffer section side, packet queues 123, output queues 124, an output section 126, and an output table 128. In this case, the packet queues 123 are prepared by at least the number of input buffer sections 112 for the respective output VCs for IP in the corresponding output buffer 113. The output queues 124 are prepared by the number of output VCs of the corresponding output buffer 113.

For example, as shown in FIG. 24, in the VC table 121, for each internal identifier (each internal identifier for ATM and each internal identifier for IP), an IP identification flag for identifying the internal identifier as an internal identifier set for IP or ATM, an output destination queue indicating the first storage location of the input cell, a movement destination queue indicating the movement destination of the packet upon completion of IP processing, and CRC2 for storing an interim value for CRC re-calculation. The output queue number of a predetermined output queue 124 is written in the output destination queue field corresponding to the internal identifier set for ATM, and the movement destination queue and CRC2 fields are not used. In the output destination queue field corresponding to the internal identifier set for IP, the number of the packet queue 123 corresponding to the output VC and input buffer section uniquely specified by the internal identifier is written, and the number of a predetermined output queue 24 is written in the movement destination queue field. This VC table 121 is identical to the VC table 103 in the fifth embodiment except that the table 121 has no start cell identification flag, CRC1, and discard flag fields, and uses an internal identifier in place of a source VPI/VCI. Before operation, all necessary values are set in the internal identifier, IP identification flag, output destination queue, and movement destination queue fields in all entries, and CRC2 is initialized to 0. The movement destination queue, in particular, is not changed for each packet but is fixed in accordance with the output VC uniquely specified by an internal identifier set for IP.

For example, as shown in FIG. 18, in the output table 128, for each output queue number (i.e., each output queue 24), a quality parameter for the output queue, a transmission VPI/VCI, and output destination information are defined in advance.

Figure 25:
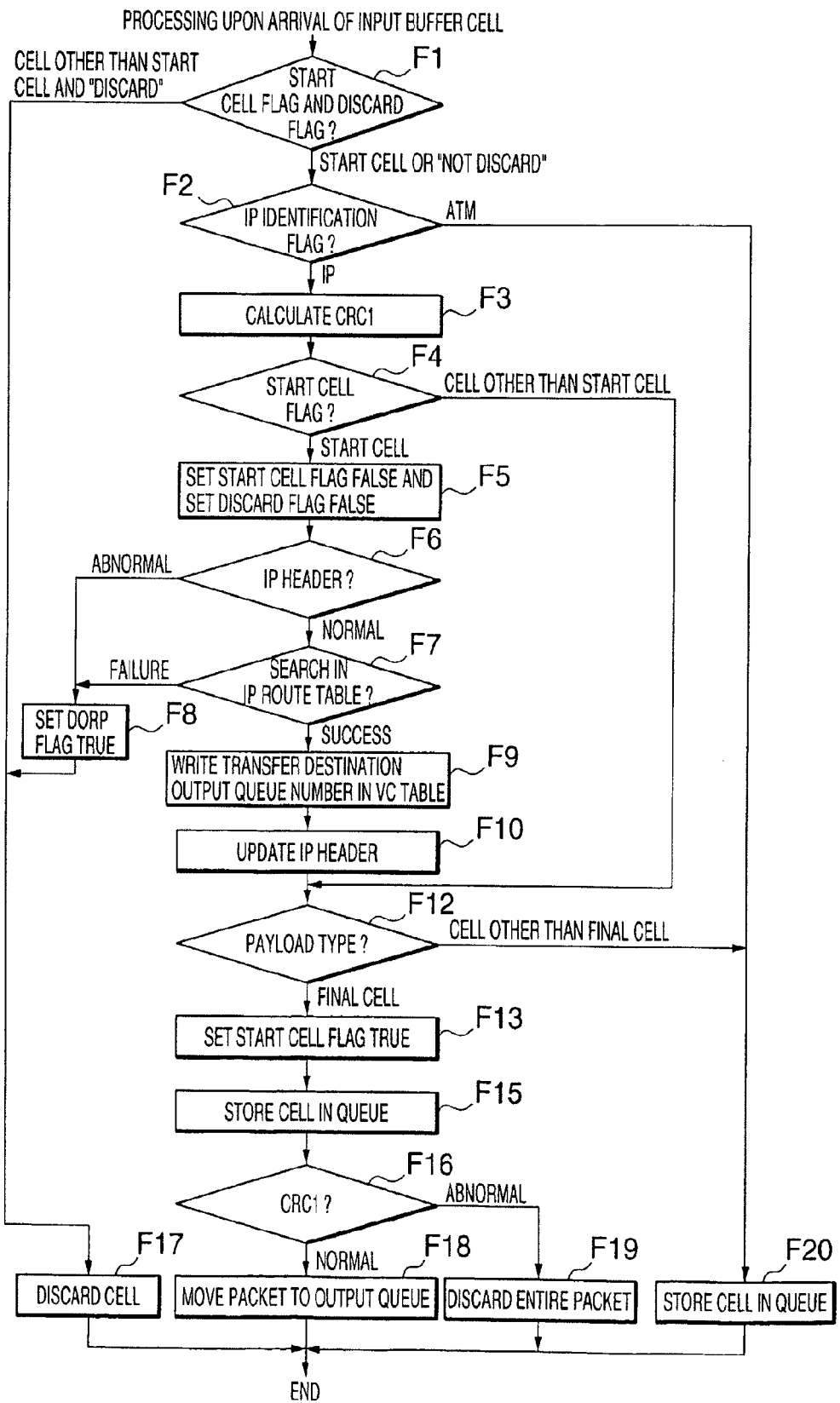
FIG. 25 is a flow chart showing an example of operation to be performed by an input buffer section when a cell is input from an input VC in the sixth embodiment of the present invention.

The operation of the sixth embodiment will be described next. Operation to be performed when a cell arrives at the input buffer section 112 will be described first. At the time of arrival of a cell, for example, the processing shown in the flow chart of FIG. '25 is executed. The same reference numerals as in FIG. 19, which is the flow chart for processing at the time of arrival of a cell in the first embodiment, denote the same processes in the flow chart of FIG. 25. As is obvious from FIGS. 25 and 19, the operation of the input buffer section 112 at the time of arrival of a cell is the same as the node apparatus of the first embodiment except that CRC2 calculation and write are not performed. That is, if the input cell is an ATM cell, the cell is directly stored in a predetermined output queue 119. If the input cell is a cell of a packet, the cell is stored in the packet queue 118 preset for each input VC, while CRC1 calculation, an IP header check on a start cell, determination of an output queue by a search in the IP route table 117, IP header updating, a CRC1 check at the time of processing of a final cell, transfer of all cells from the packet queue 118 to the output queue 119 in normal processing, and the like are performed. Note that since CRC2 calculation and write are not performed, the CRC field of the final cell of an AAL5 frame transferred to the output queue 119 remains unchanged.

The operation to be performed when an cell is to be output from the input buffer section 112 will be described next. For example, as shown in the flow. chart of FIG. 26, in outputting a cell, the output section 25 selects a proper queue from the output queues 119 (step F51), extracts one cell from the head of the output queue, and changes the VPI/VCI of the cell into the internal identifier (step F5). The output section then outputs the cell to the output buffer 113 set for the output queue via the cell switch section 111 (step F53). More specifically, in selecting a proper queue from the output queues 119 in step F51, the output section refers to a quality parameter for each output queue in the output table 127 to select an output queue that satisfies the defined quality. In addition, in changing a VPI/VCI into an internal identifier in step F52, the VPI/VCI is converted into the internal identifier defined in the output table 127. In outputting a cell in the step F53, the output section outputs the cell to the output buffer 113 indicated by the output destination information in the output table 127 via the cell switch section 111.

Figure 27:
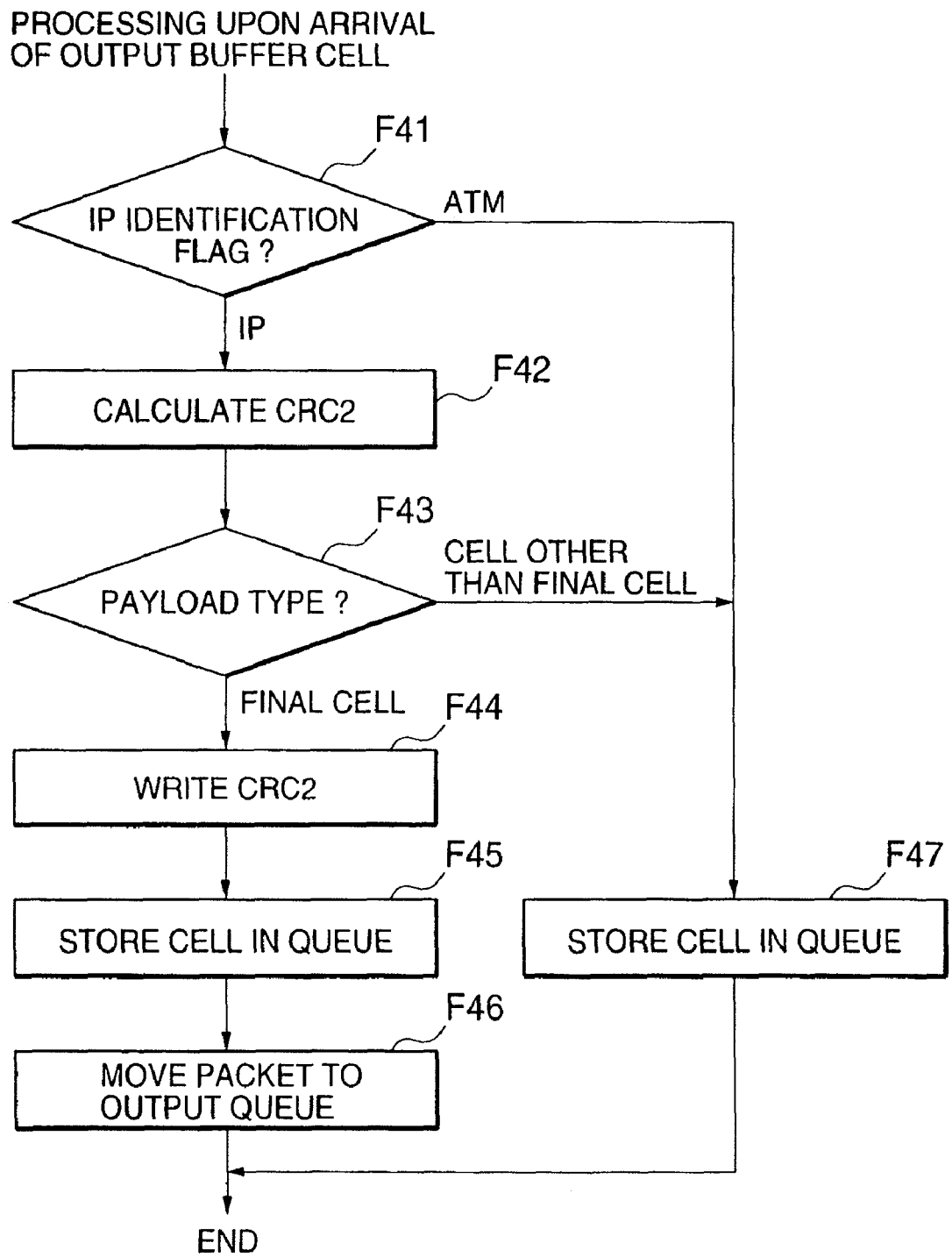
FIG. 27 is a flow chart showing an example of operation to be performed by an output buffer section when a cell is input in the sixth embodiment of the present invention.

In each input buffer section 112 in the sixth embodiment, when packets having different destination IP addresses are segmented into cells and input from different input VCs, since they have the same destination IP address, the same output queue number is obtained when the IP route table 117 in FIG. 16 is searched, and all the cells of these packets are stored in the same output queue 119. In addition, since the same output queue number is obtained, each VPI/VCI is converted into the same internal identifier on the basis of the output table 127 in FIG. 23, and the cells are output to the same output buffer 113. In addition, since cells constituting the respective packets are input through different input VCs, the cells are temporarily stored in different packet queues 118 in accordance with the VC table 115 in FIG. 22. These cells are transferred to the same output queue 119 in units of packets, and are sequentially output from the head of the output queue. There is thereforee no chance that in a cell group forming a given packet on the same logic link to the cell switch section 111, cells constituting another packet are inserted. This makes it possible to perform multiplexing, The operation to be performed when a cell arrives at the output buffer section 113 will be described next. As shown in the flow chart of FIG. 27, at the time of arrival of a cell, in the output buffer section 13, the header processing section 120 searches the VC table 121 in FIG. 24 by using the internal identifier written in the cell as a key to check the corresponding IP identification flag (step F41). If the IP identification flag indicates ATM, the cell is directly stored in the output queue 124 of the output queue number indicated by the output destination queue in the VC table 121 (step F47).

If the IP identification flag indicates IP, the cell is sent to the CRC re-calculation section 122, and CRC2 in the VC table 121 is updated (step F42). That is, the CRC re-calculation section 122 updates the original value of CRC2 in the VC table 121 with the remainder of the quotient obtained by dividing the bit string, formed by adding the value (initial value: 0) of CRC2 of the VC table 121 to the head of the payload of the current cell, by a predetermined value. It is then checked on the basis of the payload type whether the cell is the final cell of the packet (step F43). If it is determined that the cell is not the final cell, the cell is stored in the packet queue 123 of the queue number indicated by the output destination queue in the VC table 121 (step F47), and the processing is terminated. If it is determined that the cell is the final cell of the packet, re-calculated CRC2 (stored in the VC table 121) is written in the CRC field of the AAL5 frame, and CRC2 on the VC table 121 is reset (step F44). The cell is stored in the packet queue 123 in accordance with the output destination queue in the VC table 221 (step F45). One entire packet in the packet queue 123 is moved to the output queue 124 of the queue number indicated by the movement destination queue in the VC table 121 (step F46). Note that since the movement destination queue in the VC table 121 is fixed in accordance with the output VC uniquely specified by the internal identifier set for IP, even cells that have arrived from different input buffer sections 112 (i.e., cells with different internal identifiers) are stored in the same output queue 124 as long as the same output VC is set.

The operation to be performed when a cell is to be output from the output buffer section 13 will be described next. This operation is basically the same as that of the node apparatus of the fifth embodiment, and is executed according to, for example, the procedure indicated by the flow chart of FIG. 20. In a step similar to the step F32 in FIG. 20, the internal identifier is converted into the transmission VPI/VCI defined in the output table 128.

Note that as another implementation of this embodiment, an implementation using the VPI/VCI of an output VC instead of an internal identifier is conceivable. In this case, when a cell is to be output from the input buffer section 112, the VPI/VCI of the cell to be output is converted into the VPI/VCI of an output VC, and an input buffer number (uniquely identifying an input buffer section) is added to the cell. The resultant cell is then output to the output buffer section 113 via the cell switch section 111. The VC table 121 of the output buffer section 113 is referred to by using a combination of the VPI/VCI of the incoming cell and the input buffer number written in the cell instead of an internal identifier. In addition, when the output buffer section 113 outputs a cell, no conversion to a VPI/VCI is performed.

Figure 28:
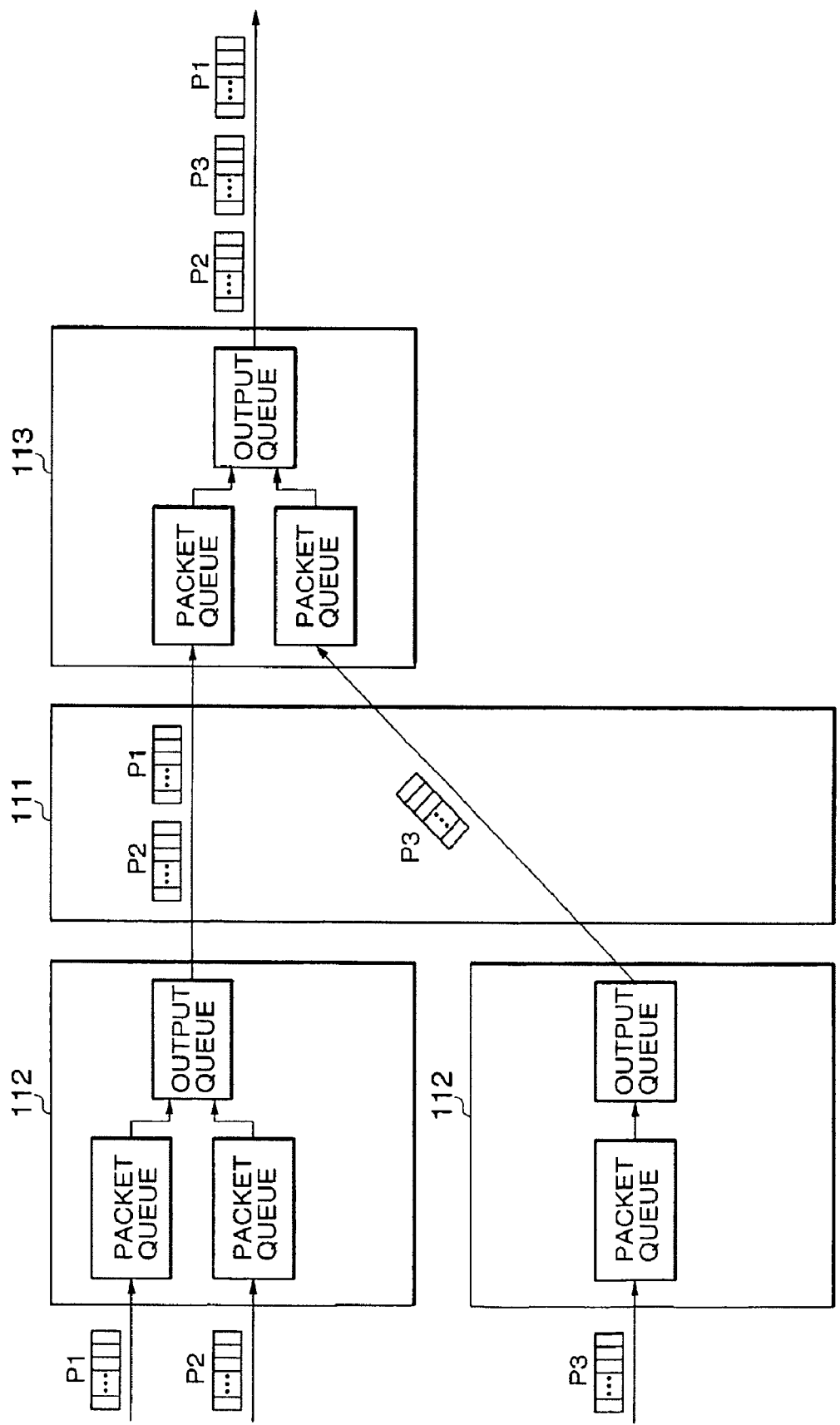
FIG. 28 is a schematic view showing how packets are multiplexed in the sixth embodiment of the present invention.

As described above, in the node apparatus 110 of the sixth embodiment, of packets output to the same VC, packets that have arrived at different VCs of the same input buffer section 112 are multiplexed by the input buffer section 112, and packets that have arrived at different input buffer sections 112 are multiplexed by the output buffer section 113. FIG. 28 is a schematic view showing this state. Of packets P1, P2, and P3 output to the same VC, the packets P1 and P2 that have arrived at different VCs of the same input buffer section 112 are multiplexed by the input buffer section 112, and the packets P1, P2, and P3 that have arrived at the different input buffer sections 112 are multiplexed by the output buffer section 113.

In this embodiment, RC re-calculation is executed by the output buffer section 113. However, this calculation may be executed by the input buffer section 112. In this case, for example, the VC table 115 is configured as shown in FIG. 17, and the VC table 121 has a CRC2 field.

Seventh Embodiment

Figure 29:
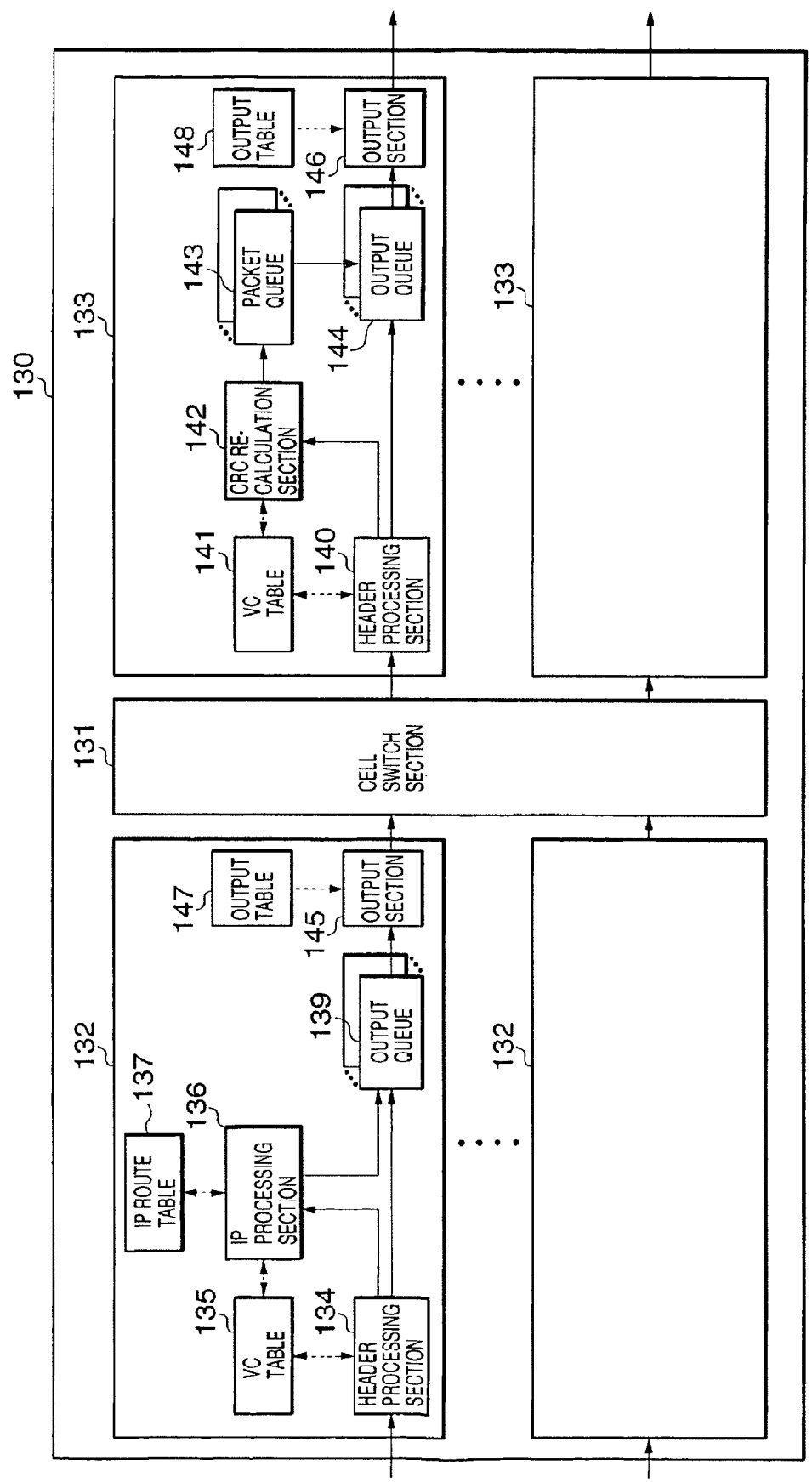
FIG. 29 is a block diagram showing the arrangement of the seventh embodiment of the present invention.

FIG. 29 is a block diagram showing the arrangement of a node apparatus according to the seventh embodiment of the present invention. A node apparatus 130 of the seventh embodiment includes a plurality of input buffer sections 132 and a plurality of output buffer sections 133. The node apparatus 130 also includes a cell switch section 131 for transferring a cell output from an arbitrary input buffer section 132 to an arbitrary output buffer section 133.

The plurality of input buffer sections 132 have the same arrangement and are prepared in units of physical lines. Each input buffer section 132 is comprised of a header processing section 134 for performing ATM header processing for input cells, sorting the cells into ATM and IP cells, and storing them in queues, a VC table 135, an IP processing section 136 for processing packets, an IP route table 137, output queues 139 for holding cells to be output, an output section 145 for outputting a cell to the output buffer section 133 via the cell switch section 131, and an output table 147. Unlike in the input buffer section 112 in FIG. 21 in the sixth embodiment, there is no packet queue. In this case, the output queues 139 are prepared by at least the number of output VCs of the node apparatus 130 for input VC of the input buffer section 132.

For example, as shown in FIG. 16, in the IP route table 137, the number of the output queue 139 is defined as route information in advance in correspondence with each pair of a destination IP address and its mask length.

Since there is no packet queue, the VC table 135 has, for example, an arrangement like the one shown in FIG. 17, which is obtained by omitting the movement destination queue portion from the arrangement shown in FIG. 22. More specifically, this table contains, for each input VC (i.e., each VPI/VCI), an IP identification flag for identifying the input VC as an input VC set for IP or ATM, a start cell identification flag indicating whether the input cell is the start cell of the packet, an output destination queue indicating the storage location of the input cell, CRC1 for storing an interim value for a CRC check, and a discard flag indicating that the packet is being discarded. For an input VC set for ATM, the output queue number of a predetermined output queue 119 is written in the output destination queue field, and the CRC1 and discard flag fields are not used. For an input VC set for IP, the number of a predetermined output queue is written in the output destination queue field. Before operation, all necessary values are set in the source VPI/VCI, IP identification flag, and output destination queue fields in all entries, while the start cell identification flag is initialized to true; CRC1, to 0, and the discard flag, to false.

For example, as shown in FIG. 23, like the output table 127 in the sixth embodiment, in the output table 147, for each output queue number, a quality parameter for the output queue, internal identifier, and output destination information are defined. In this case, with regards to VCs set for ATM, the internal identifier can uniquely specify an output VC as in the sixth embodiment. With regards to VCs set for IP, a pair of an output VC and an input VC can be uniquely specified in the seventh embodiment. The reason why a VC set for IP is an identifier for uniquely specifying a pair of an input VC and an output VC is that no packet queue is prepared for the input buffer section 132 in the seventh embodiment, and multiplexing is not performed.

The plurality of output buffer sections 113 have the same arrangement and are prepared, for example, in units of physical lines. Each buffer section is comprised of a header processing section 140 for performing ATM header processing for input cells, sorting the cell into ATM and IP cells, and storing them in queues, a VC table 141, a CRC re-calculation section 142 serving as an IP processing section on the output buffer section side, a packet queue 143, an output queue 144, an output section 146, and an output table 148.

In this case, the packet queues 143 are prepared by at least the number of input VCs set for IP of the input VCs of the node apparatus 130 for each output VC of the output buffer section 133. The output queues 144 are prepared by the number of output VCs of the output buffer section 133.

For example, as shown in FIG. 24, like the VC table 121 in the sixth embodiment, the VC table 141 contains, for each internal identifier (internal identifier for ATM, internal identifier for IP), an IP identification flag for identifying the internal identifier as an internal identifier set for IP or ATM, an output destination queue indicating the first storage location of the input cell, a movement destination queue indicating the movement destination of the packet having undergone IP processing, and CRC2 for storing an interim value for CRC re-calculation. The output queue number of a predetermined output queue 44 is written in an output destination queue field corresponding to the internal identifier set for ATM, and the movement destination queue and CRC2 fields are not used. In the output destination queue field corresponding to the internal identifier set for IP, the number of the packet queue 143 corresponding to the input VC and output VC specified by the internal identifier is written. In the movement destination queue field, the number of a predetermined output queue 144 is written. Before operation, all necessary values are set in the internal identifier, IP identification flag, output destination queue, and movement queue fields in all entries, and the CRC2 field is initialized to 0. The movement destination queue, in particular, is not changed for each packet but is fixed in accordance with the output VC uniquely specified by an internal identifier set for IP.

For example, as shown In FIG. 18, as in the output table 109 in the fifth embodiment, in the output table 148, for each output queue number (i.e., each output queue 144), a quality parameter for the output queue, a transmission VPI/VCI, and output destination information are defined in advance.

Figure 31:
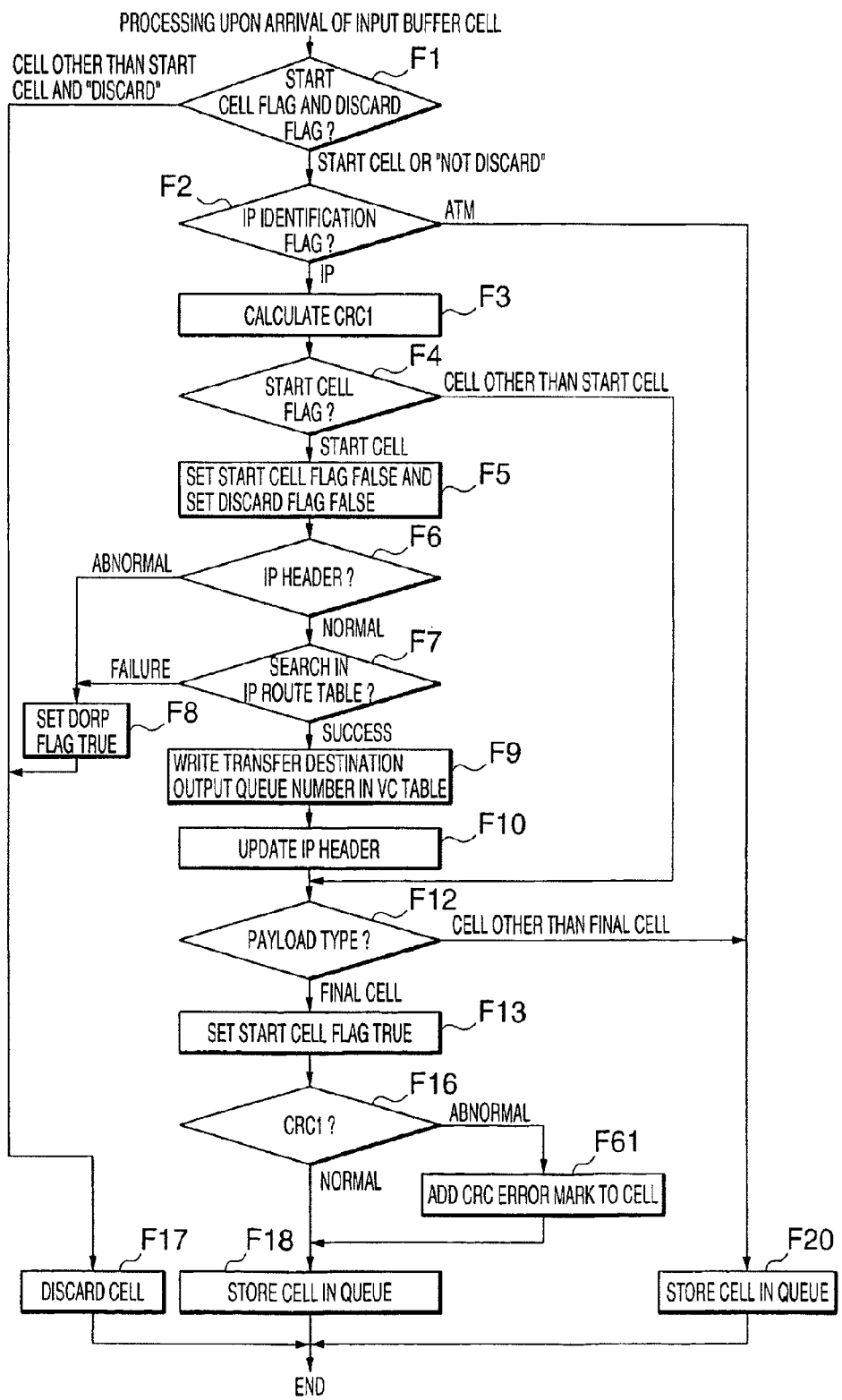
FIG. 31 is a flow chart showing an example of operation to be performed by an input buffer section when a cell is input in the seventh embodiment of the present invention.

The operation of the seventh embodiment will be described next. The operation to be performed when a cell arrives at the input buffer section 132 will be described first. At the time of arrival of a cell, the input buffer section 132 executes, for example, the processing shown in the flow chart of FIG. 31. The same reference numerals as in FIG. 25, which is the flow chart for processing at the time of arrival of a cell in the sixth embodiment, denote the same processes in the flow chart of FIG. 31. As is obvious from FIGS. 31 and 25, the seventh embodiment is the same as the sixth embodiment except for operation for the final cell of a packet. In this embodiment, the input buffer section 132 has no packet queue, and incoming cells from VCs set f or IP are also stored in different output queues 139 for the respective input VCs. In this embodiment, a CRC check is performed before the final cell is stored in the queue (step F16). If a CRC error is detected, a CRC error mark is added to the final cell and stored in the output queue 139 (step F61). Otherwise, the cell is directly stored in the output queue 139 {step F18).

Figure 26:
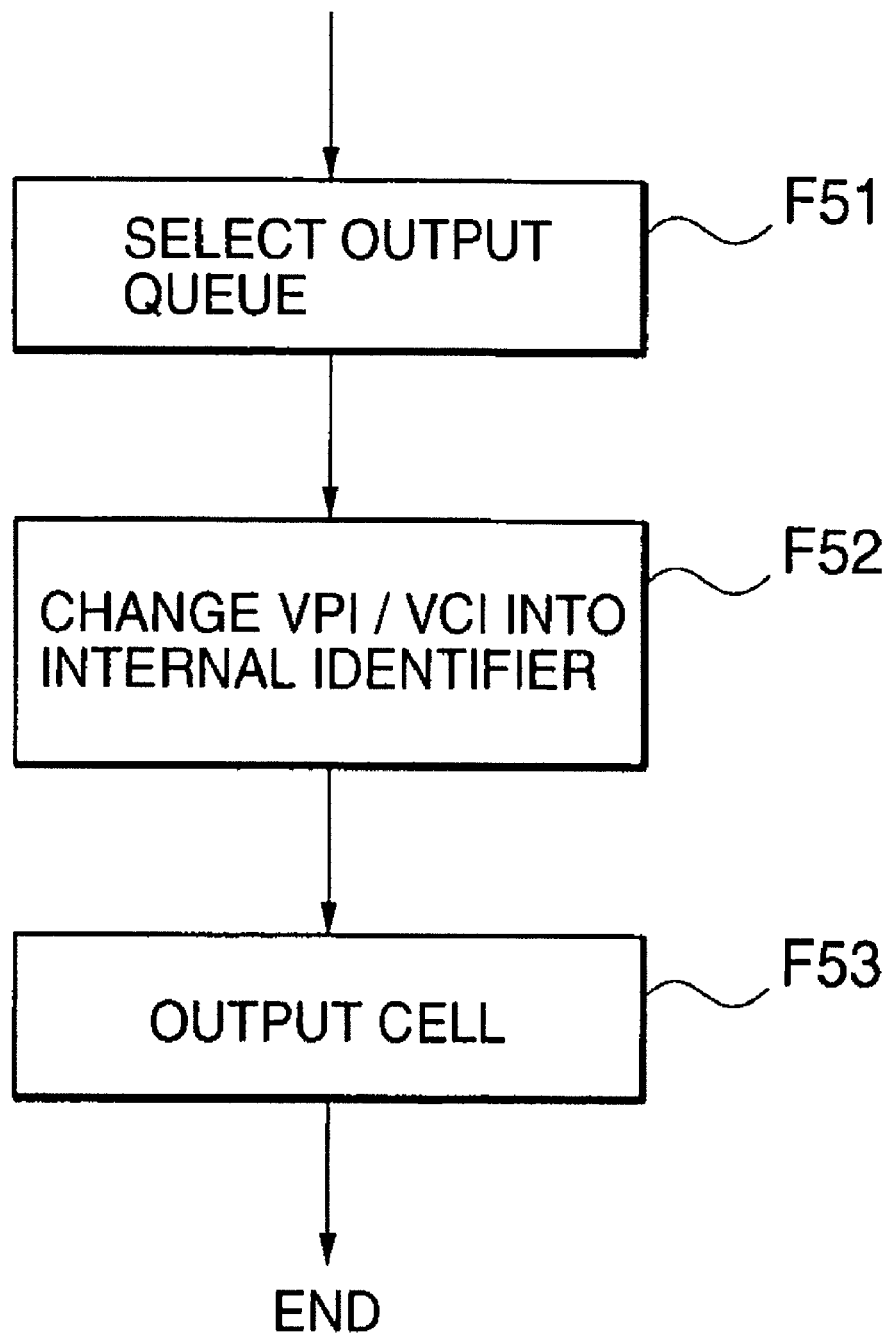
FIG. 26 is a flow chart showing an example of operation to be performed by an input buffer section when a cell is to be output in the sixth embodiment of the present invention.

The cell output operation of the input buffer section 132 is performed as indicated by FIG. 26 as in the sixth embodiment. However, this embodiment differs from the sixth embodiment in that with regards to VCs set for IP, the VPI/VCI in a cell is converted into an internal identifier which can uniquely specifies a pair of an input VC and an output VC, In the input buffer section 132 having no packet queue, when different packets having the same destination IP address are input from different input VCs after segmented into cells, these packets are stored in the different output queues 139, and are converted into different internal identifiers and output to the output buffer section 133.

Figure 32:
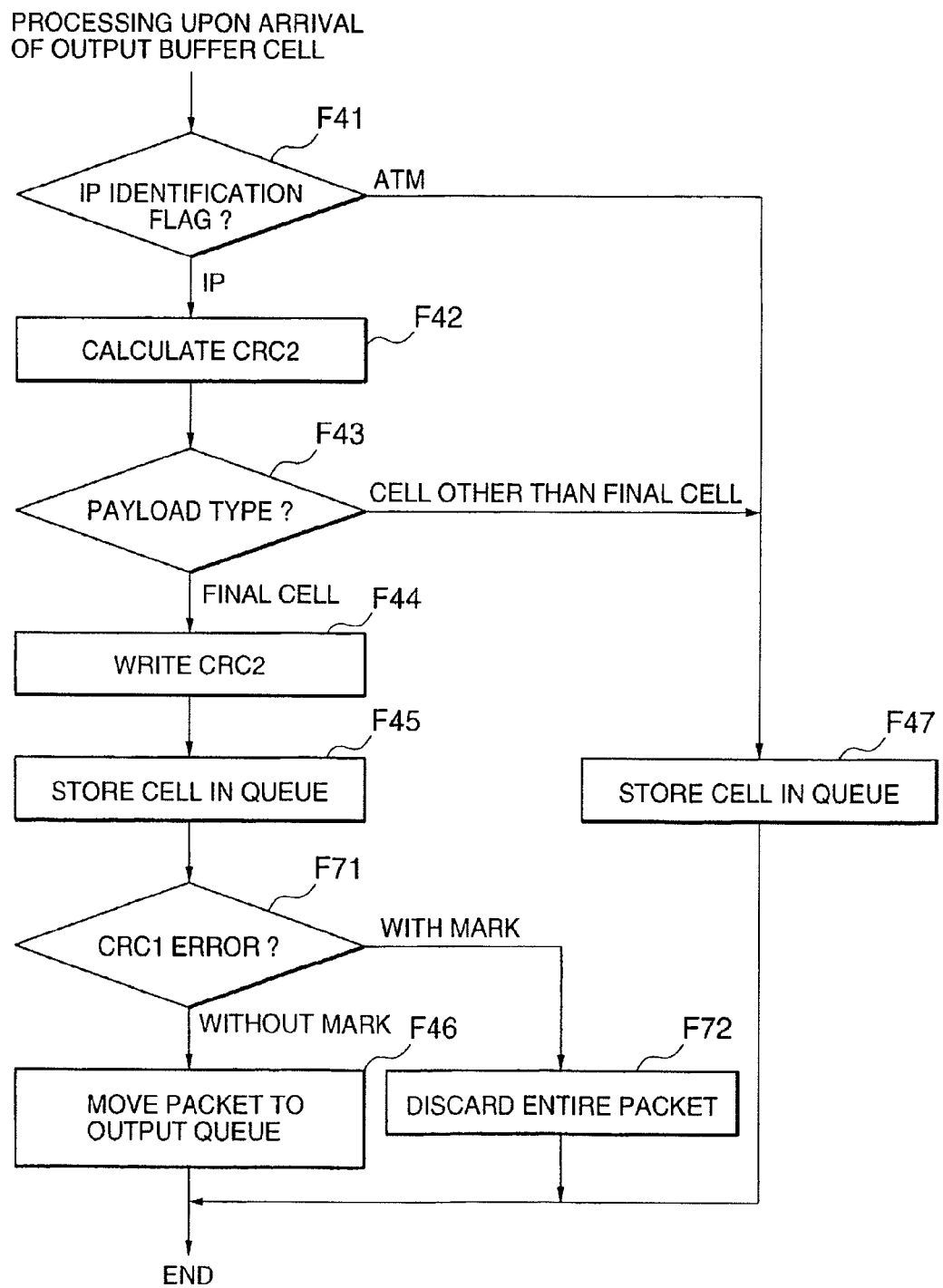
FIG. 32 is a flow chart showing an example of operation to be performed by an output buffer section when a cell is input in the seventh embodiment of the present invention.

The operation to be performed when a cell arrives at the output buffer section 133 will be described next. As shown in the flow chart of FIG. 32, at the time of arrival of a cell, in the output buffer section 133, the header processing section 140 searches the VC table 141 in FIG. 24 by using the internal identifier written in the cell as a key and checks the corresponding IP identification flag (step F41). If the IP identification flag indicates ATM, the cell is directly stored in the output queue 144 of the output queue number indicated by the output destination queue in the VC table 141 (step F47). If the IP identification flag indicates IP, the cell is sent to the CRC re-calculation section 42, and CRC2 in the VC table 141 is updated (step F42). It is then checked on the basis of the payload type whether the cell is the final cell of the packet (step F43). If it is determined that the cell is not the final cell, the cell is stored in the packet queue 143 of the queue number indicated by the output destination queue in the VC table 141 (step F47), thus terminating the processing. If the cell is the final cell of the packet, re-calculated CRC2 is written in the CRC field of the AAL5 frame, and CRC2 on the VC table 141 is reset (step F44). The cell is then stored in the packet queue 143 in accordance with the output destination queue in the VC table 141 (step F45). In the sixth embodiment, when the final cell of a packet arrives, the packet is unconditionally moved to an output queue (step F46 in FIG. 27). In the seventh embodiment, it is checked whether a CRC error mark is added to the final cell (step F71). If a mark is added to the cell, the overall packet is discarded (step F72). Otherwise, the packet is moved to the output queue 144 (step F46).

The cell output operation of the output buffer section 133 is the same as in the sixth embodiment.

Figure 33:
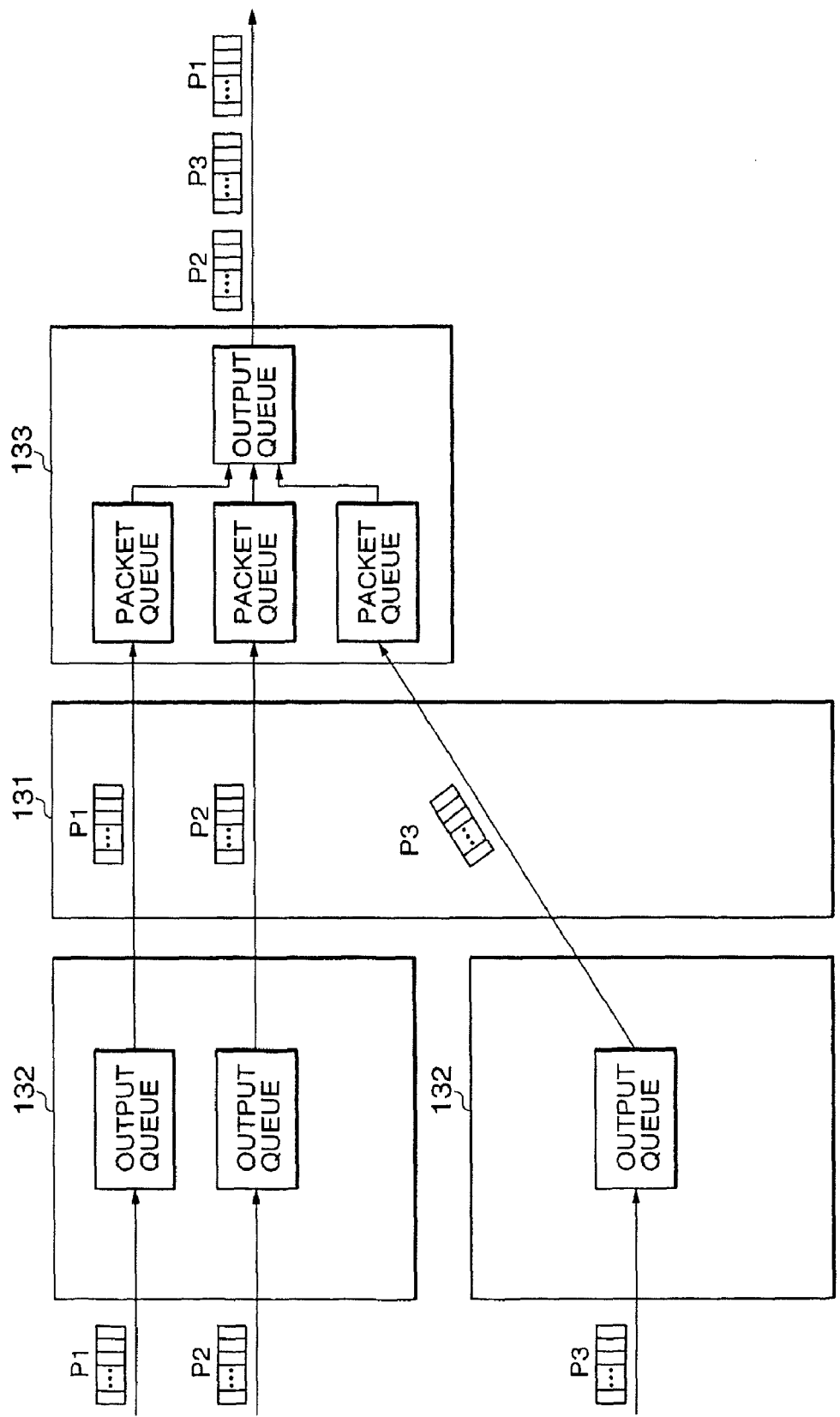
FIG. 33 is a schematic view showing how packets are multiplexed in the seventh embodiment of the present invention.

In the seventh embodiment, since the input buffer section 132 has no packet queue, with regards to packets output to the same VC, packets that have arrived at difference VCs of the same input buffer section 132 and packets that have arrived at different input buffer sections 132 are multiplexed by the output buffer section 133. FIG. 33 is a schematic view showing this state. With regards to packets P1, P2, and P3 output to the same VC, the packets P1 and P2 that have arrived at different VCs of the same input buffer section 132 and the packets P1, P2, and P3 that have arrived at different input buffer sections 132 are multiplexed by the output buffer section 133.

Eighth Embodiment

FIG. 35 is a block diagram showing the arrangement of a node apparatus according to the eighth embodiment of the present invention. A node apparatus 150 of this embodiment has an arrangement obtained by adding an IP server section 165 having all necessary functions as an IP router, e.g., the function of processing a routing packet and the function of processing a packet with an IP option, and the function of managing an IP route table to the node apparatus 110 of the sixth embodiment in FIG. 21.

The IP server section 165 is comprised of a packet reassembling section 167 for reassembling cells sent from an input buffer section 112 via a cell switch section 111 into a packet, a packet memory 168 for storing a packet waiting for processing, a processor 169 for processing the packet, a processor memory 170 storing table information such as an IP route table, a program for IP routing, and the like, and a packet segmenting section 166 for segmenting a packet having undergone processing into cells and outputting them to an output buffer section 113 via the cell switch section 111. In this case, an almost perfect IP route table is held in the processor memory 170, and a copy of a portion of the table is held in an IP route table 117 in each input buffer section 112.

FIG. 35 shows an example of an IP route table held in the processor memory 170. In this example, the number of an output buffer section and the internal identifier are defined in correspondence with a pair of a destination IP address and its mask length. The meaning of the internal identifier is the same as that in the sixth embodiment.

Each input buffer section 112 basically has the same arrangement as that in FIG. 21 except that the number of output queues 119 is increased to store cells destined to the IP server section 165. In addition, the processing performed by an IP processing section 116 is partly changed. Each output buffer section 113 basically has the same arrangement as that in FIG. 21 except that the number of packet queues 123 is increased to store cells from the IP server section 165.

The operation of the eighth embodiment will be described below with particular emphasis on the difference between the eighth embodiment and the sixth embodiment.

Figure 36:
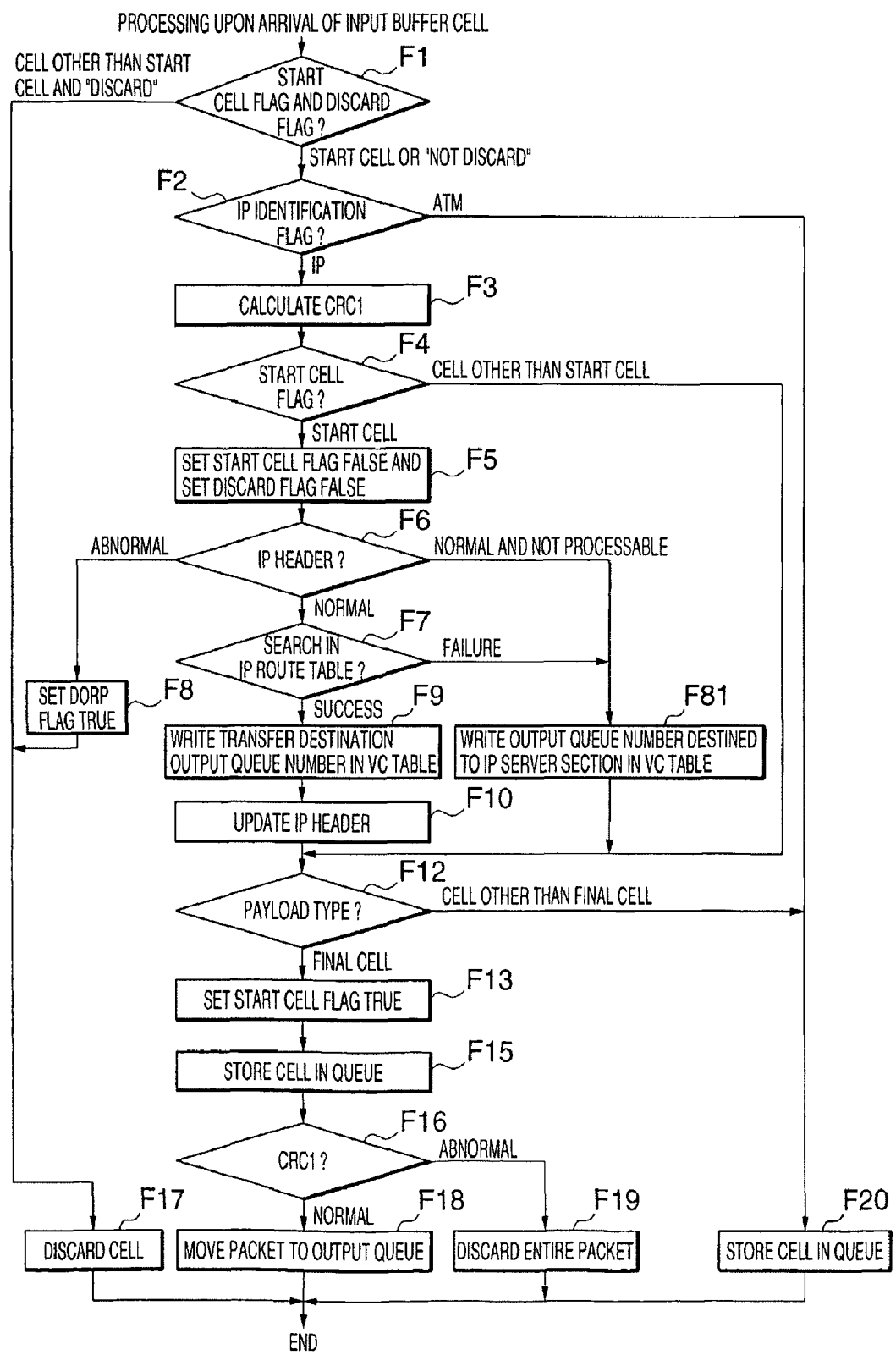
FIG. 36 is a flow chart showing an example of operation to be performed by an input buffer section when a cell is input in the eighth embodiment of the present invention.

The operation to be performed when a cell arrives at the input buffer section 112 is shown in the flow chart of FIG. 36. This operation is almost the same as that shown in FIG. 25 in the sixth embodiment except for the following points.

Assume that when the IP processing section 116 performs an IP header check (step F6 in FIG. 36), it is determined that the incoming packet cannot be processed by the IP processing section 116 because, for example, the packet is a routing Packet or includes an IP option. In this case, the number of a predetermined output queue 119 is written as a queue destined to the IP server section 165 is written in the movement destination queue field (see FIG. 22) in a VC table 115 (step F81). With this operation, when all cells constituting a routing packet or the like are stored in a packet queue 118, the cells are sent to the predetermined output queue 119 (step F18) and transferred to the IP server section 165 via the cell switch section 111. Note that for the packet, the IP header is updated by the IP server section 165 but is not updated by the IP processing section 116.

Even if the IP processing section 116 fails to search the IP route table 117 (step F7), the number of a predetermined output queue 119 is written as a queue destined to the IP server section 165 in the movement destination queue field (see FIG. 22) in the VC table 115 (step F81). With this operation, when all cells constituting a packet corresponding to a search failure in the IP route table 117 are stored in the packet queue 118, the cells are sent to the predetermined output queue 119 (step F18) and transferred to the IP server section 165. Note that for this packet as well, the IP header is updated by the IP server section 165 but is not updated by the IP processing section 116.

The operation to be performed when the input buffer section 112 is to output a cell is performed as shown in FIG. 13 as in the sixth embodiment. Note that in the output table 127 in FIG. 23, the information of the IP server section 165 is set in the output destination information field corresponding to the number of the output queue 119 destined to the IP server section 165.

Figure 37:
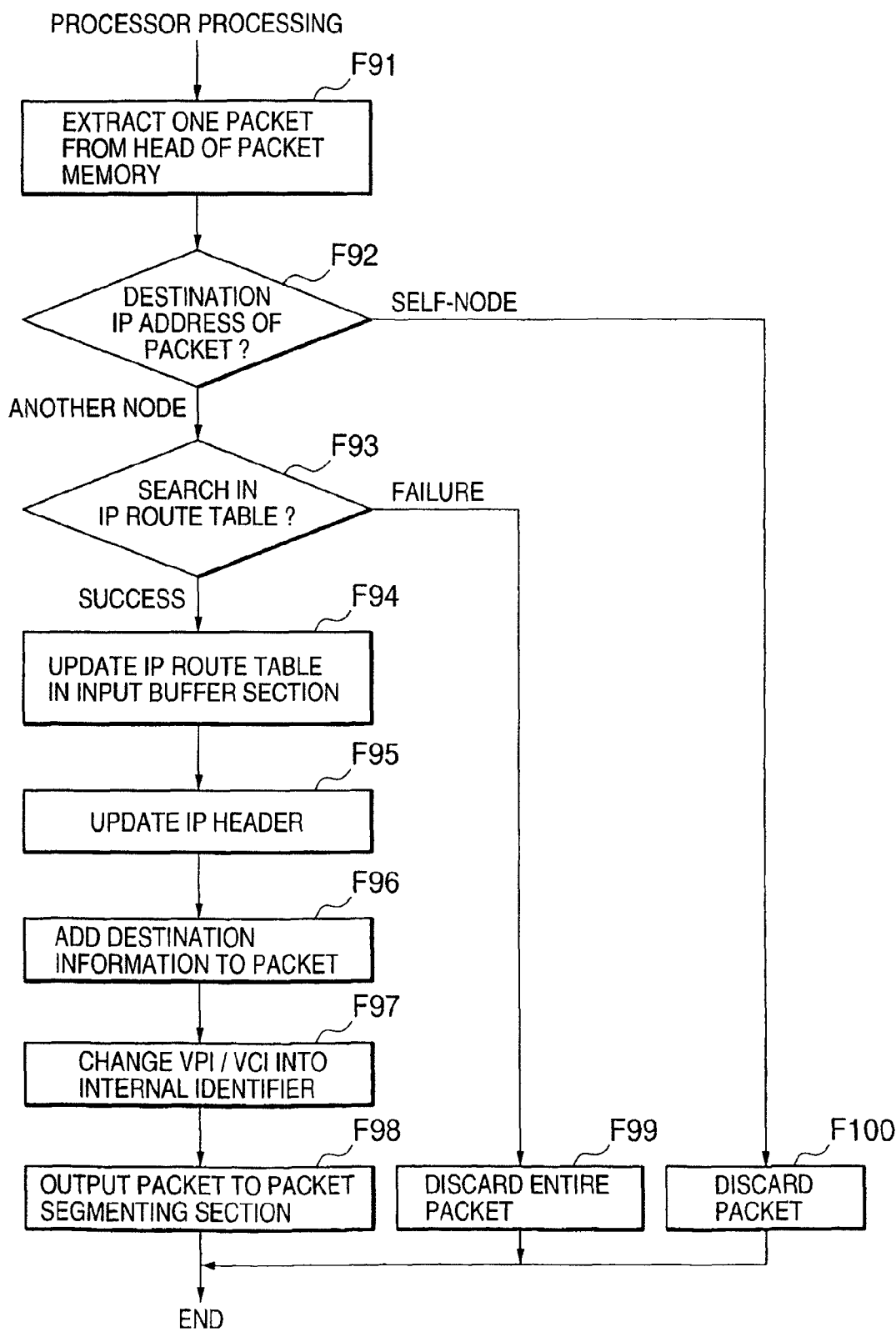
FIG. 37 is a flow chart showing an example of processing performed by a processor in an IP server section in the eighth embodiment of the present invention.

The operation of the IP server section 165 will be described next. The packet reassembling section 167 reassembles segmented cells sent from each input buffer section 112 via the cell switch section 111 into a packet and storing it in the packet memory 168. The processor 169 sequentially processes packets from the start packet in the packet memory 168 as indicated by, for example, the flow chart of FIG. 37 (step F91). If the extracted packet is a routing packet or the like addressed to the self-node (step F92), the processor 169 performs proper IP processing such as route calculation, and updates the IP route table in the processor memory 170 and the IP route table 117 in each input buffer section 112, as needed (step F100). In the eighth embodiment, the processor 169 is connected to each input buffer section 112 via a signal line. The processor 169 accesses the IP route table 117 via this signal line, thereby updating the table.

If the packet extracted from the packet memory 168 is a packet addressed to another node and corresponding to a route search failure in the input buffer section 112, the processor 169 searches the IP route table in the processor memory 170 in FIG. 35 (step F93). If a search success is achieved, the IP route table 117 in the input buffer section 112 which has failed the search is updated (step F94). In addition, after the IP header is updated (step F95), destination information, i.e., the number of the target output buffer section, is added to the packet (step F96), the VPI/VCI is converted into an internal identifier, and the resultant packet is stored in the packet memory 168 (steps F97 and F98). In this case, an internal identifier in the IP route table 117 uniquely specifies an input buffer section and output VC. If, thereforee, an internal identifier is found, the output queue number to be set in the IP route table 117 in the input buffer section 112 is uniquely specified. The packet segmenting section 166 extracts a packet having undergone processing from the packet memory 168, segments the packet into cells again in accordance with the destination information of the extracted packet, and sends the cells to the target output buffer section 113 via the cell switch section 111. If the above route search fails, the corresponding packet is discarded (step F99).

The operation to be performed by the output buffer section 113 when a cell is input is the same as in the sixth embodiment.

As described above, the node apparatus 150 includes the IP server section 165 having all the necessary functions as an IP router, e.g., the function of processing a routing packet and the function of processing a packet with an IP option, and the function of managing the IP route table. The IP processing section 116 of each input buffer section 112 includes a means (step F6 in FIG. 36) for determining whether an incoming packet can be processed by the IP processing section. If it is determined that the input packet cannot be processed by the IP processing section 116, the packet is transferred to the IP server section 165 and processed by the IP server section 165. As a consequence, the IP route table is updated, as needed. This allows the node apparatus 150 to also serve as an IP router.

In addition, an almost perfect IP route table is held in the processor memory 170 of the IP server section 165, and a copy of a portion of the table is held in the IP route table 117 of each input buffer section 112. If the IP processing section 116 fails a route search for a given packet, the packet is transferred to the IP server section 165. The IP server section 65 then processes the packet by referring to the almost perfect IP route table. This makes it possible to reduce the size of the IP route table 117 to be held in each input buffer section 112 and suppress an increase in the probability of occurrence of packet discard due to a route search failure.

Ninth Embodiment

Figure 38:
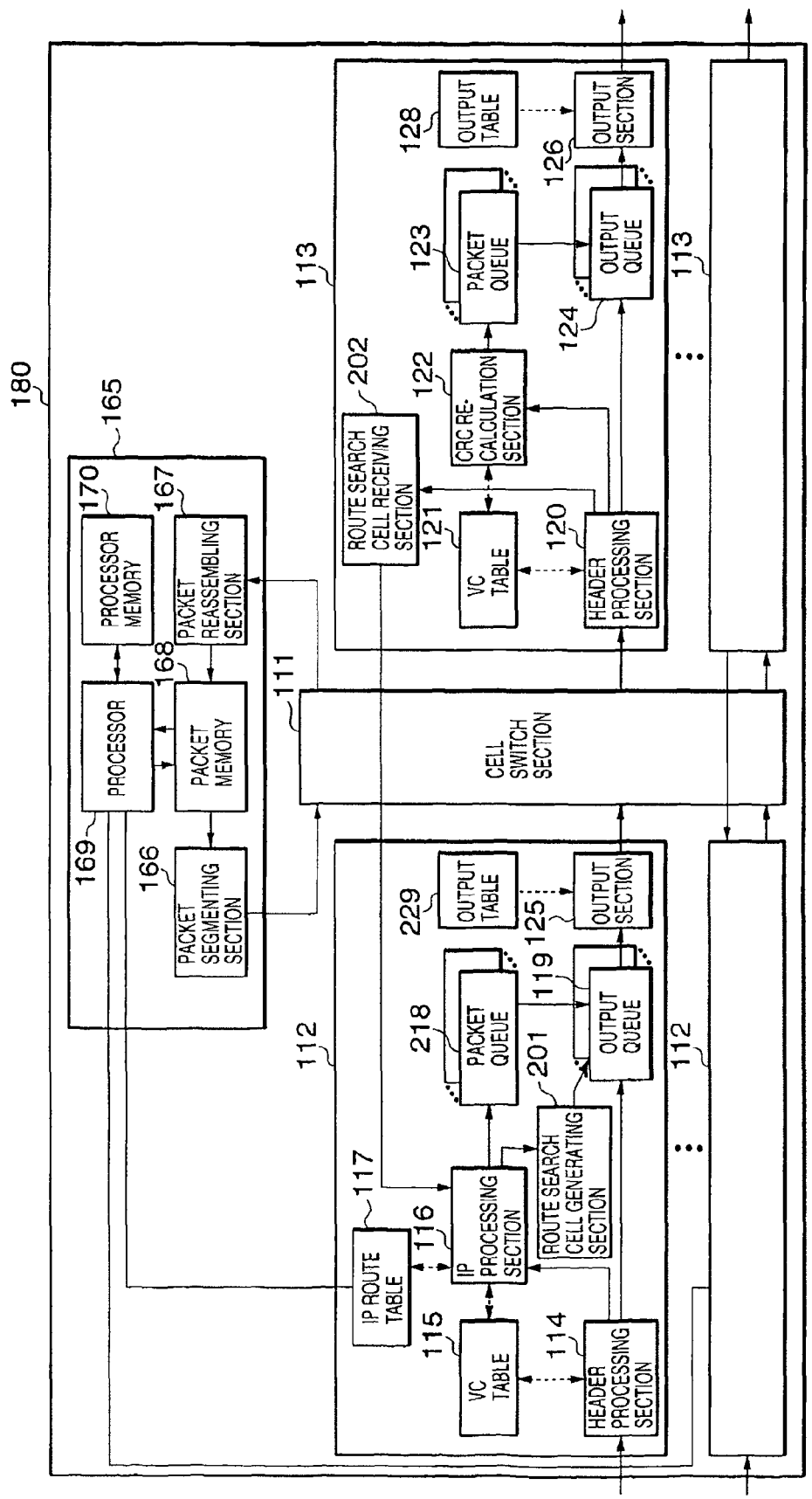
FIG. 38 is a block diagram showing the arrangement of the ninth embodiment of the present invention.

FIG. 38 is a block diagram showing the arrangement of a node apparatus according to the ninth embodiment of the present invention. A node apparatus 180 of this embodiment is obtained by partly changing the functions of the node apparatus 150 of the eighth embodiment. In the eighth embodiment, when the input buffer section 112 fails a route search, the IP server section 165 processes the packet in place of the input buffer section 112. In the ninth embodiment, an IP server section 165 only performs a route search in place of an input buffer section 112, and the input buffer section 112 executes processing for the packet again in accordance with the search result. For this purpose, in the ninth embodiment, a route search cell generating section 201 for generating a route search cell in accordance with a request from an IP processing section 116 is provided for each input buffer section 112. In addition, in the ninth embodiment, the IP server section 165 notifies, via an output buffer section 113, the corresponding input buffer section 112 of a route search cell in which a route search result is set. For this purpose, each output buffer section 113 has a route search cell receiving section 202 for receiving a route search cell from the IP server section 165 and notifying the IP processing section 116 of the corresponding input buffer section 112 of the search result.

The operation of the ninth embodiment will be described next with particular emphasis on the difference between the ninth embodiment and the eighth embodiment.

Figure 39:
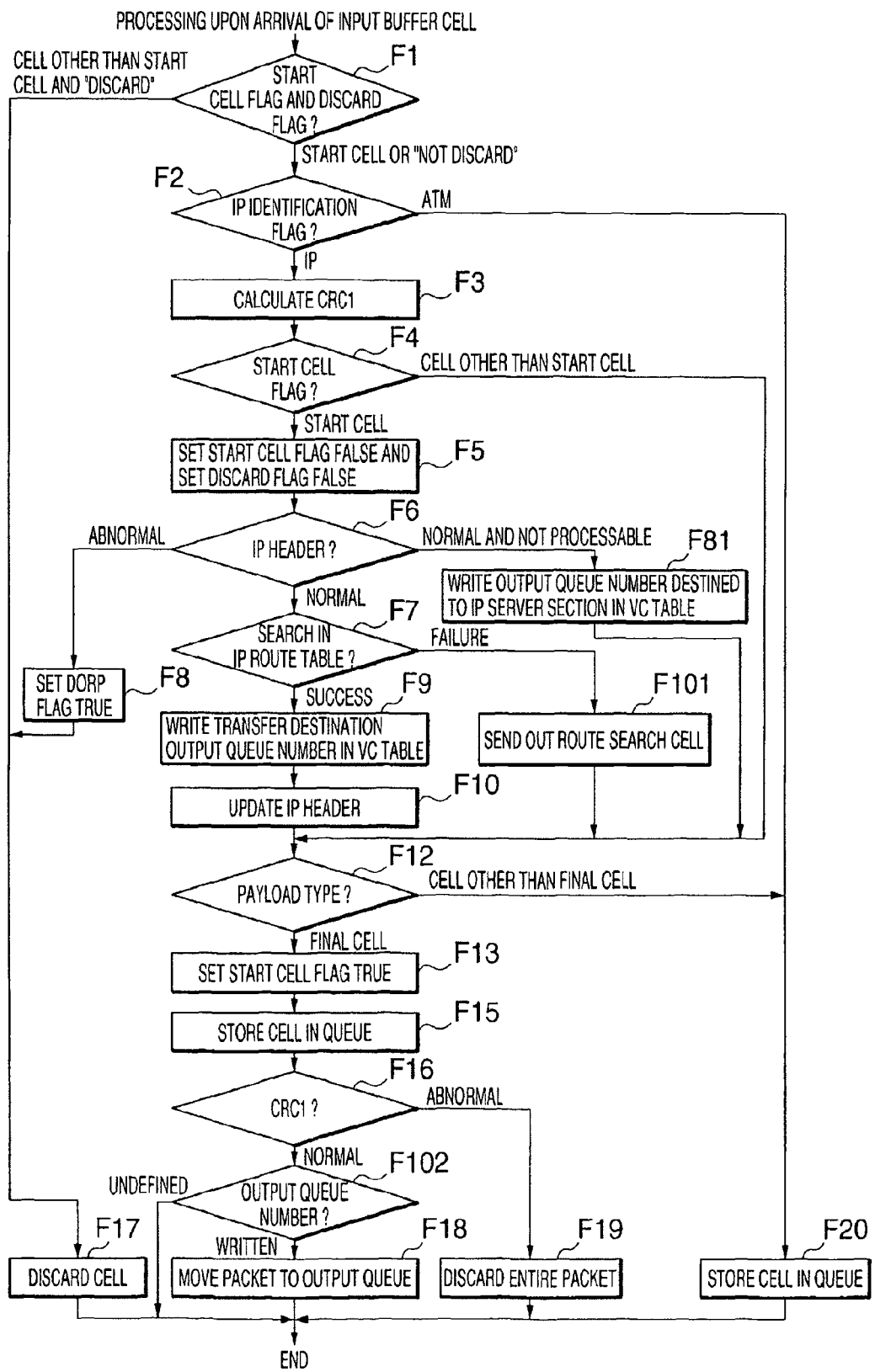
FIG. 39 is a flow chart showing an example of operation to be performed by an input buffer section when a cell is input in the ninth embodiment of the present invention.

The operation to be performed when a cell arrives at the input buffer section 112 is shown in the flow chart of FIG. 39 and is the same as in the eighth embodiment in FIG. 36 except when a search failure occurs in an IP route table 117. In the ninth embodiment, when a route search fails, the route search cell generating section 201 generates a route search cell and stores it in an output queue 119 destined to an IP server (step F101). A route search cell is a cell for requesting the IP server section 165 to perform a route search and is typically generated by adding an identifier for uniquely specifying a 15 packet corresponding to a route search failure to a copy of the start cell of a received IP packet. Note that the start cell corresponding to the route search failure is stored in a packet queue 118 corresponding to the input VC (step F20). Subsequently, cells other than the start cell of the packet are sequentially stored in the same packet queue 118 (step F20). If a route has been determined when the final cell is stored in the same packet queue 118, e.g., the corresponding output queue in the IP route table 117 is defined in advance (step F102), all the cells in the packet queue 118 are transferred to the output queue 119 (step F18). If no route has been determined when the final cell arrives, no cell is moved at this point of time.

The operation to be performed when a cell is output from the input buffer section 112 is the same as in the eighth embodiment.

Figure 40:
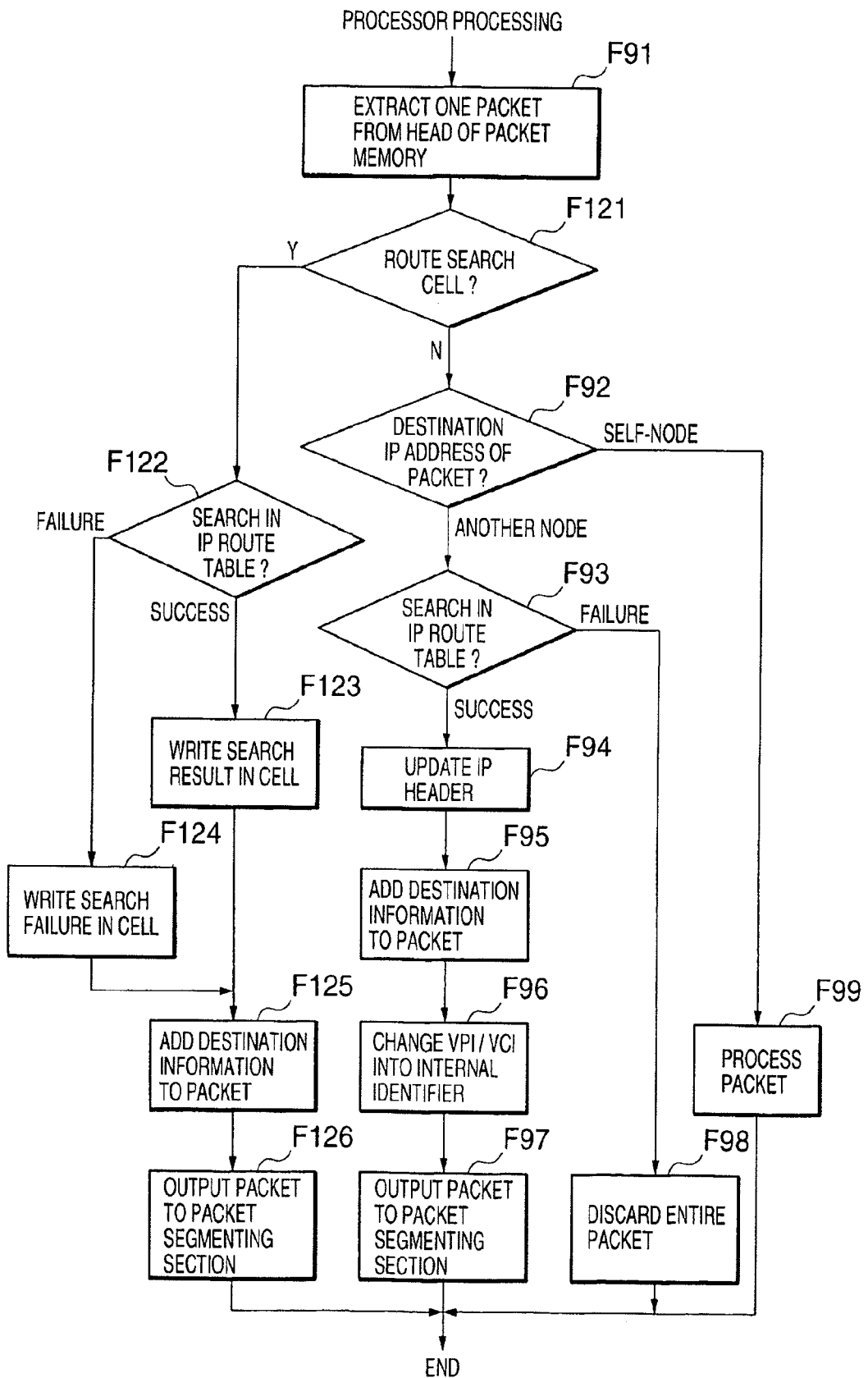
FIG. 40 is a flow chart showing an example of processing to be performed by a processor in an IP server section in the ninth embodiment of the present invention.

The operation of the IP server section 165 is shown in the flow chart of FIG. 40 and the same as in the eighth embodiment except when a route search cell arrives. When a mute search cell arrives at the IP server section 165, a packet reassembling section 167 stores this route search cell as one packet in a packet memory 168. A processor 169 extracts a packet as the corresponding route search cell from the packet memory 168 (steps F91 and F121), searches the IP route table in FIG. 35 in a processor memory 170, and performs a route search with respect to the cell (step F122). If the route search succeeds, the output queue number as the search result is written in the cell (step F123). If the route search fails, information indicating the failure is written in the cell (step F124). The number of an output buffer section to which the cell is returned is added to the cell (step F125), and a packet segmenting section 166 outputs the cell to a cell switch section 111 (step F126). In returning the route search cell, the cell is returned to the output buffer section 113 in the same direction as the input 20 buffer section 112 to which the cell is sent out.

Figure 41:
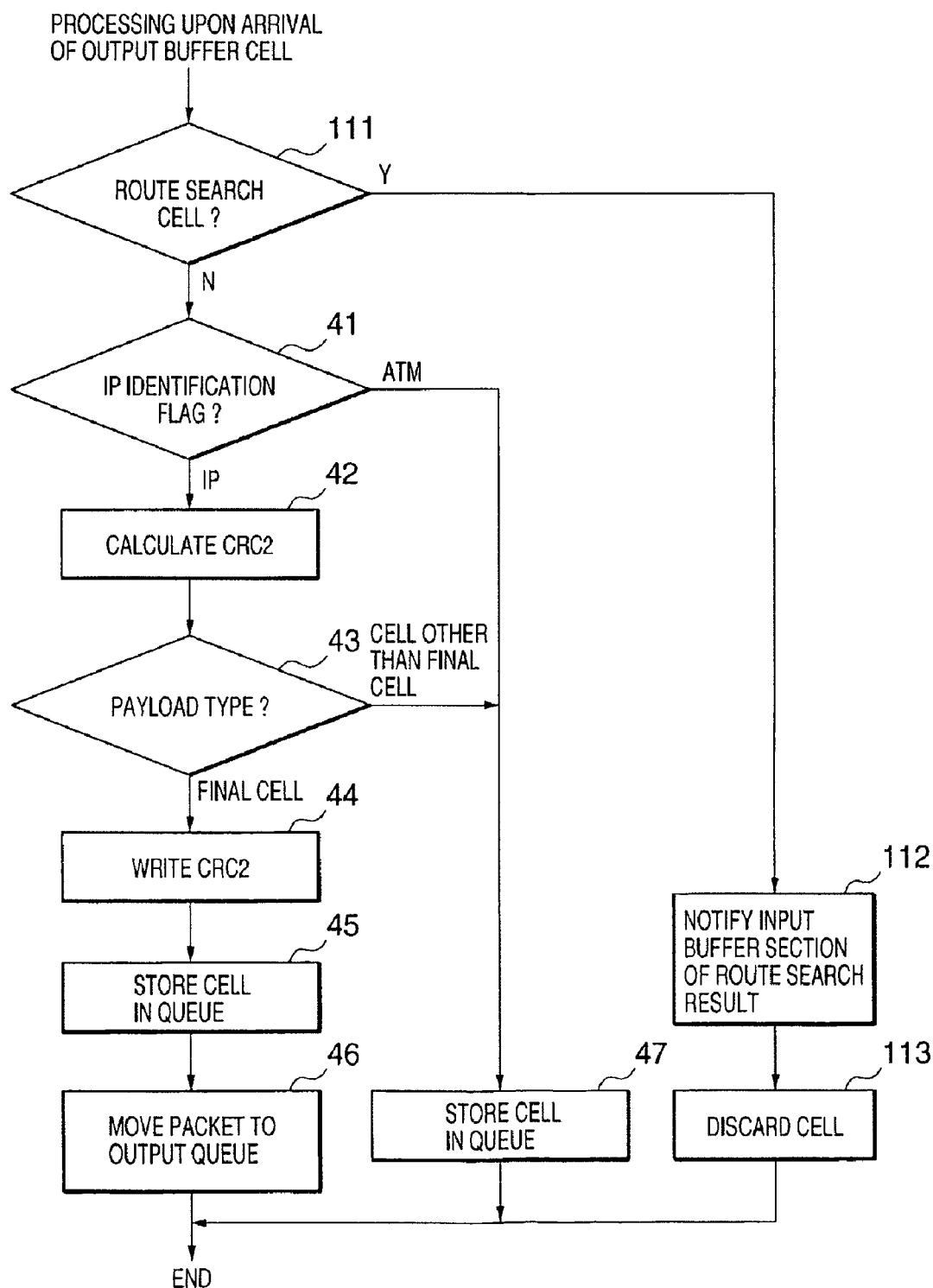
FIG. 41 is a flow chart showing an example of operation to be performed by an output buffer section when a cell is input in the ninth embodiment of the present invention.

The operation to be performed when a cell is input to the output buffer section 113 is shown in the flow chart of FIG. 41 and the same as in the eighth embodiment except when a route search cell is input. Upon reception of a route search cell (step F111), a header processing section 120 of the output buffer section 113 sends it to the route search cell receiving section 202. The route search cell receiving section 202 extracts the route search result and an identifier for specifying the packet for the route search request from the cell, and notifies the input buffer section 112 in the same direction of the extracted information (step F12). The received route search cell is then discarded (step F13).

Figure 42:
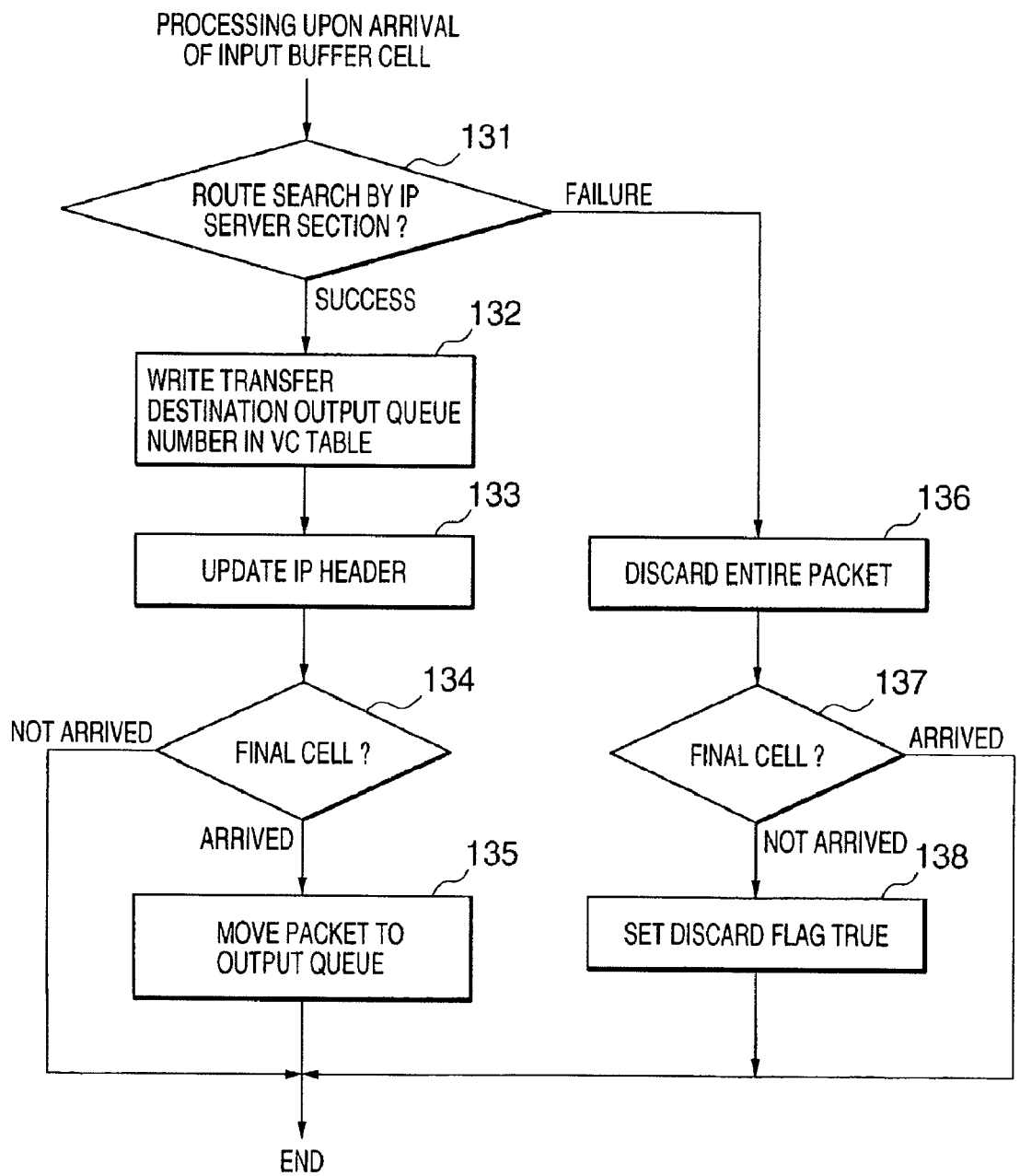
FIG. 42 is a flow chart showing an example of processing to be performed by an input buffer section when a route search result is to be notified in the ninth embodiment of the present invention.

The IP processing section 116 of the input buffer section 112 which has received the notification of. the above search result performs the operation shown in the flow chart of FIG. 42. First of all, if the route search has failed (step F131), the IP server section 165 discards the packet for the route search (step F136). If the final cell of the packet has not arrived, the discard flag is set to true (steps F137 and F138). If the route search has succeeded, an output queue number is written in the movement destination queue field in a VC table 115 in accordance with the route search result (step F132), and the IP header is updated (step F133). If the final cell has already arrived, the packet is moved from the packet queue 118 to the corresponding output queue 119 (step F135). If the final cell has not arrived yet, the processing shown in FIG. 42 is terminated. In this case, when the final cell arrives, the corresponding packet is moved to the output queue in step F18 in FIG. 39.

As described above, in the ninth embodiment, an almost perfect IP route table is held in the processor memory 170 in the IP server section 165, and a copy of a portion of the table is held in the IP route table 117 in each input buffer section 112. When the IP processing section 116 in each input buffer section 112 fails a route search using the IP route table 117 with respect to a given packet, the route search cell generating section 201 requests the IP server section 165 to make a route search with respect to the packet. In accordance with this request, the IP server section 165 performs a route search by using the IP route table in the processor memory 170, and notifies the IP processing section 116 as the request source of the result via the cell switch section 111 and the route search cell receiving section 202 of the output buffer section 113. Upon reception of the route search result the IP processing section 116 processes the corresponding packet.

10th Embodiment

A node apparatus of the 10th embodiment is a modification of the node apparatus 180 of the ninth embodiment. Each embodiment described above, including the ninth embodiment, is based on the assumption that one VC is set between node apparatuses according to the present invention. In contrast to this, in the 10th embodiment, one VC is set between node apparatuses for each virtual dedicated network, and information about each virtual dedicated network is set in the VC table and IP route table in each input buffer section.

FIG. 43 shows example of the VC table in each input buffer section in the 10th embodiment. As shown in FIG. 43, this table has a virtual dedicated network number field indicating a specific virtual dedicated network to which each input VC belongs in addition to the arrangement of the VC table shown in FIG. 22.

FIG. 44 shows an example of the IP route table in each input buffer section in the 10th embodiment. As shown in FIG. 44, an output queue number as route information is defined by adding a virtual dedicated network number to a destination IP address arid mask length.

In the 10th embodiment, in performing an IP route search with respect to the start cell of an incoming packet, an input buffer section acquires the number of a virtual dedicated network to which the packet belongs from the VC table in FIG. 43 on the basis of the input VC for the packet, and obtains an output queue number by searching the IP route table in FIG. 44 by using the virtual dedicated network number in addition to the destination IP address.

In the node apparatus of the 10th embodiment, at least one IP address is provided for each virtual dedicated network, The IP server section uses different routing protocols with different IP route tables for the respective dedicated networks.

Other arrangements and operations are the same as in the ninth embodiment,

As described above, in the 10th embodiment, one node apparatus virtually operates as different IP routers for the respective virtual dedicated networks.

Figure 34:
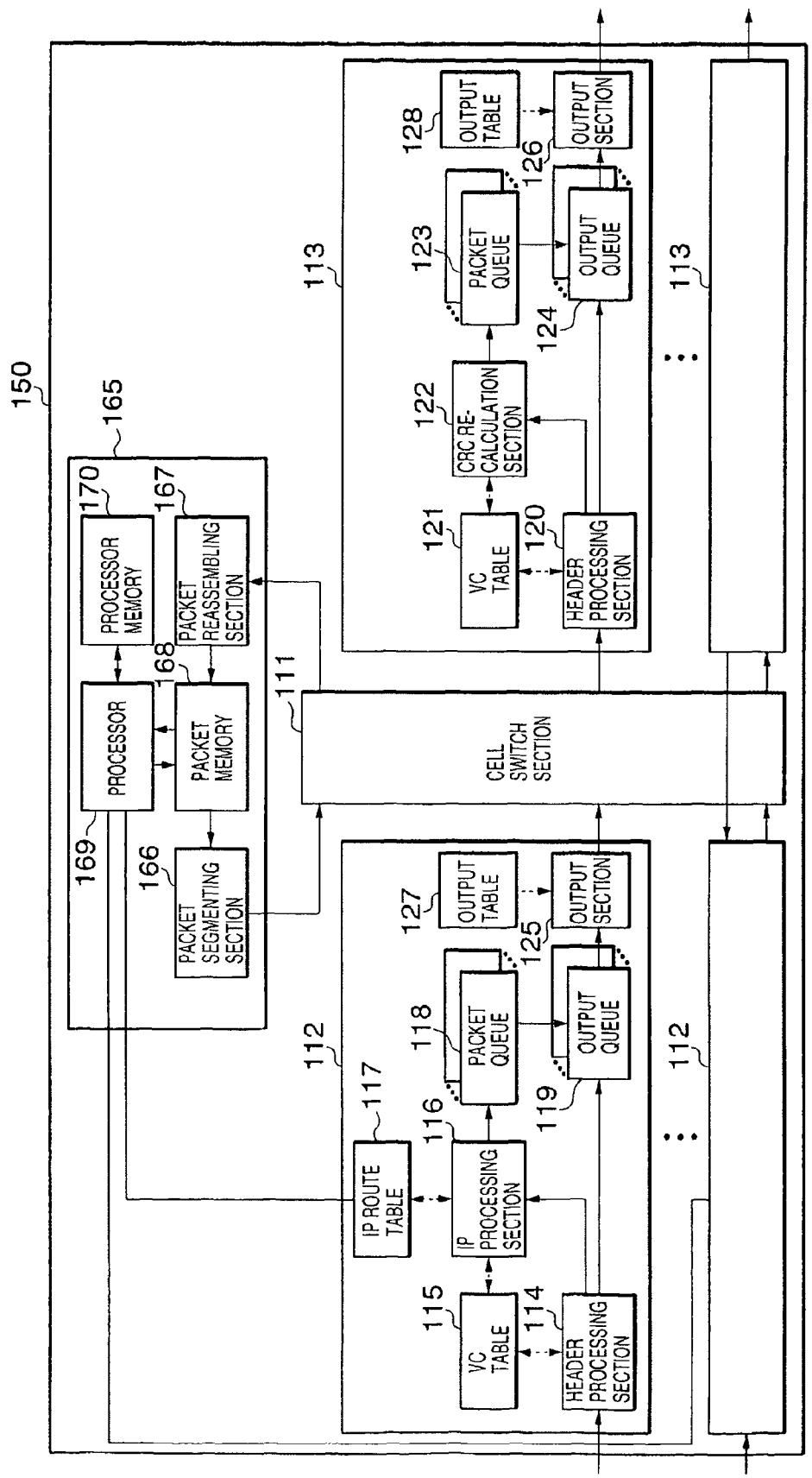
FIG. 34 is a block diagram showing the arrangement of the eighth embodiment of the present invention.

Several preferred embodiments of the present invention have been described above. The present invention is not limited to the embodiments described above, and various changes and modifications can be made. For example, the present invention incorporates an embodiment implemented by adding the function of the IP server section 165 shown in FIG. 34 or 38 to the node apparatus 101 of the first embodiment shown in FIG. 15. Furthermore, in the 10th embodiment, the present invention is applied to virtual dedicated networks in the ninth embodiment.

However, this technique can be applied to other embodiments. Moreover, the IP multicast function described in the fifth embodiment can be applied to other embodiments.

The invention claimed is:

1. A method comprising:
   receiving a packet as a plurality of cells;
   determining an output destination using a first portion of a header of the packet, where the first portion of the header includes a destination address, and where the determining the output destination includes:
      comparing the destination address in the first portion of the header to destination addresses in a route table, and
      selecting, when the comparing produces more than one matching destination address, one destination address of the more than one matching destination address that has a greatest mask length;
   determining a quality class for the packet using a second portion of the header of the packet; and
   storing the packet in an output queue based on the output destination and the quality class.

2. The method of claim 1 further comprising:
   transmitting the stored packet via a virtual channel in accordance with the quality class.

3. The method of claim 1 where the second portion of the header includes the destination address, a destination port number, a source address, and a source port number.

4. The method of claim 1 where the determining an output destination includes:
   looking up the output destination from a route table using the first portion of the header.

5. The method of claim 4 where the determining a quality class includes:
   looking up the quality class from a quality description table using the second portion of the header.

6. A network device comprising:
   a plurality of output queues;
   a route table to:
      store first destination addresses, and
      mask lengths associated with the first destination addresses;
   a quality description table to:
      store quality classes;
   an output table to:
      store output queue numbers and output virtual channel numbers; and
   a processing unit to:
      receive a packet that includes a first header portion and a second header portion, where the first header portion includes a second destination address,
      identify a first destination address of the stored first destination addresses for the packet using the first header portion, where, when identifying a first destination address, the processing unit is to:
         compare the second destination address from the first header portion to the first destination addresses in the route table, and
         select, when multiple first destination addresses in the route table match the second destination address from the first header portion, one first destination address of the multiple first destination addresses that has a greatest mask length,
      identify a quality class of the stored quality classes for the packet using the second header portion, and
      identify, using the identified first destination address and the identified quality class, one output queue of the plurality of output queues in which to store the packet and a virtual channel number associated with a virtual channel via which the stored packet is to be transmitted from the identified one output queue.

7. The network device of claim 6 further comprising:
   an output control section to:
      read the packet from the identified one output queue, and
      transmit the packet via the virtual channel in accordance with the identified quality class.

8. The network device of claim 6 where the second header portion includes the second destination address, a destination port number, a source address, and a source port number.

9. A network device comprising:
   a plurality of output queues;
   a route table to:
      store first destination addresses;
   a quality description table to:
      store quality classes,
      where the quality description table includes a virtual dedicated network number field, a source address mask length field, a source port number field, a destination address mask length field, a destination port number field, and a quality class field;
   an output table to:
      store output queue numbers and output virtual channel numbers; and
   a processing unit to:
      receive a packet that includes a first header portion and a second header portion,
      identify a first destination address of the stored first destination addresses for the packet using the first header portion,
      identify a quality class of the stored quality classes for the packet using the second header portion, and
      identify, using the identified first destination address and the identified quality class, one output queue of the plurality of output queues in which to store the packet and a virtual channel number associated with a virtual channel via which the stored packet is to be transmitted from the identified one output queue.

10. The network device of claim 9 where the processing unit is further configured to at least one of:
   store, when a specific flow is to be defined, information in the virtual dedicated network number field, the source address mask length field, the source port number field, the destination address mask length field, the destination port number field, and the quality class field, store, when a quality is to be defined between specific terminals, information in the virtual dedicated network number field, the source address mask length field, the destination address mask length field, and the quality class field, store, when a quality is to be defined with respect to traffic transmitted by a specific terminal, information in the virtual dedicated network number field, the source address mask length field, and the quality class field, store, when a quality is to be defined between specific local area networks, information in the virtual dedicated network number field, mask lengths of address held by a first local area network of the local area networks in the source address mask length field, mask lengths of address held by a second local area network of the local area networks in the destination address mask length field, and information in the quality class field, store, when a quality is to be defined with respect to a specific virtual dedicated network, information in the virtual dedicated network number field and the quality class field, or store, when a quality is to be defined with respect to a specific application in a specific virtual dedicated network, information in the virtual dedicated network number field, the source port number field, the destination port number field, and the quality class field.

11. The network device of claim 9 where the virtual dedicated network number field, the source address mask length field, the source port number field, the destination address mask length field, and the destination port number field are each assigned a different priority.

12. The network device of claim 11 where the virtual dedicated network number field is assigned a highest priority.

13. A method comprising:

receiving a packet that includes a first header portion and a second header portion, the first portion of the header including a destination address;

identifying an output destination address for the packet using the first header portion, where the identifying the output destination address includes:
  comparing the destination address in the first header portion to output destination addresses in a route table, and
  selecting, when the comparing produces multiple matching output destination addresses, one output destination address, of the multiple matching output destination addresses, that has a greatest mask length;

identifying a quality class for the packet using the second header portion;

obtaining an output queue number, associated with an output queue in which the packet is to be stored, using the identified output destination address and the identified quality class;

obtaining an output virtual channel number, associated with a virtual channel to which the packet is to be output, using the identified output destination address and the identified quality class;

storing the packet in the output queue based on the output queue number; and outputting the stored packet to the virtual channel based on the output virtual channel number.

14. The method of claim 13 where the second header portion includes the destination address, a destination port number, a source address, and a source port number.

* * * * *